(12) United States Patent
LaBean et al.

(10) Patent No.: US 12,553,054 B2
(45) Date of Patent: Feb. 17, 2026

(54) COMPOSITIONS AND METHODS RELATED TO NUCLEIC ACID ANTICOAGULANTS

(71) Applicant: North Carolina State University, Raleigh, NC (US)

(72) Inventors: Thom LaBean, Raleigh, NC (US); Abhichart Krissanaprasit, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 1333 days.

(21) Appl. No.: 17/285,371

(22) PCT Filed: Oct. 25, 2019

(86) PCT No.: PCT/US2019/058133
§ 371 (c)(1),
(2) Date: Aug. 11, 2021

(87) PCT Pub. No.: WO2020/086996
PCT Pub. Date: Apr. 30, 2020

(65) Prior Publication Data
US 2022/0025373 A1 Jan. 27, 2022

Related U.S. Application Data

(60) Provisional application No. 62/750,900, filed on Oct. 26, 2018.

(51) Int. Cl.
*C12N 15/115* (2010.01)
*A61K 31/713* (2006.01)

(52) U.S. Cl.
CPC .......... *C12N 15/115* (2013.01); *A61K 31/713* (2013.01); *C12N 2310/16* (2013.01); *C12N 2310/322* (2013.01); *C12N 2310/531* (2013.01); *C12N 2320/30* (2013.01)

(58) Field of Classification Search
CPC .............. C12N 15/115; C12N 2310/16; C12N 2310/322; C12N 2310/531; C12N 2320/30; C12N 2310/3181; C12N 2310/51; A61K 31/713
See application file for complete search history.

(56) References Cited

U.S. PATENT DOCUMENTS

| | | |
|---|---|---|
| 2007/0117109 A1 | 5/2007 | Rothemund |
| 2012/0251583 A1 | 10/2012 | Rothemund |
| 2012/0263648 A1* | 10/2012 | Shapiro .................. A61P 29/00 977/773 |
| 2015/0247147 A1 | 9/2015 | Rusconi |
| 2017/0121708 A1 | 5/2017 | Shapiro et al. |
| 2017/0274000 A1 | 9/2017 | Shapiro et al. |
| 2018/0044663 A1 | 2/2018 | Yan |

FOREIGN PATENT DOCUMENTS

| | | |
|---|---|---|
| JP | 2012100636 A | 5/2012 |
| WO | WO 2005/106042 | 11/2005 |
| WO | WO 2010/148085 A1 | 12/2010 |
| WO | WO 2012/151575 A2 | 11/2012 |
| WO | WO 2013/012921 A2 | 1/2013 |
| WO | WO 2014/019024 A1 | 2/2014 |
| WO | WO 2015/195621 A1 | 12/2015 |
| WO | WO 2018/089854 | 5/2018 |

OTHER PUBLICATIONS

Jepsen, Mette DE, et al. "Development of a genetically encodable FRET system using fluorescent RNA aptamers." Nature communications 9.1 (2018): 18. (Year: 2018).*
Rinker, Sherri, et al. "Self-assembled DNA nanostructures for distance-dependent multivalent ligand-protein binding." Nature nanotechnology 3.7 (2008): 418-422. (Year: 2008).*
Bompiani, K. M., et al. "A high affinity, antidote-controllable prothrombin and thrombin-binding RNA aptamer inhibits thrombin generation and thrombin activity.") Journal of Thrombosis and Haemostasis 10.5 (2012): 870-880. (Year: 2012).*
International Search Report and Written Opinion For PCT/US2019/058133. Mailed Jan. 21, 2020. 13 pages.
Beaudry et al., In vitro selection of a novel nuclease-resistant RNA phosphodiesterase. Chem Biol. May 2000;7(5):323-34.
Bompiani et al., A high affinity, antidote-controllable prothrombin and thrombin-binding RNA aptamer inhibits thrombin generation and thrombin activity. J Thromb Haemost. May 2012;10(5):870-80.
Chelliserrykattil et al., Evolution of a T7 RNA polymerase variant that transcribes 2'-O-methyl RNA. Nat Biotechnol. Sep. 2004;22(9):1155-60.
Coagulation Wikipedia, https://en. Wikipedia.org/wiki/Coagulation. Retreived Mar. 10, 2022. 17 pages.
Deng et al., Aptamer binding assays for proteins: the thrombin example—a review. Anal Chim Acta. Jul. 21, 2014;837:1-15.
Geary et al., A single-stranded architecture for cotranscriptional folding of RNA nanostructures. Science. Aug. 15, 2014;345(6198):799-804.
Harter et al., Anticoagulation drug therapy: a review. West J Emerg Med. Jan. 2015;16(1):11-7.
Keefe et al., SELEX with modified nucleotides. Curr Opin Chem Biol. Aug. 2008;12(4):448-56.

(Continued)

*Primary Examiner* — Ekaterina Poliakova-Georgantas
*Assistant Examiner* — John Charles Mckillop
(74) *Attorney, Agent, or Firm* — Casimir Jones, S.C.; Peter J. Schlueter; Peter Schlueter

(57) ABSTRACT

The present disclosure provides compositions and methods related to nucleic acid molecules having therapeutic aptamers. In particular, the present disclosure provides nucleic acids molecules comprising one or more aptamers having anticoagulant activity, as well as corresponding nucleic acid antidotes, for the modulation of blood coagulation in the context of disease and surgical intervention.

16 Claims, 54 Drawing Sheets
Specification includes a Sequence Listing.

(56) References Cited

OTHER PUBLICATIONS

Layzer et al., Simultaneous generation of aptamers to multiple gamma-carboxyglutamic acid proteins from a focused aptamer library using DeSELEX and convergent selection. Oligonucleotides. Spring 2007;17(1):1-11.
Long et al., Crystal structure of an RNA aptamer bound to thrombin. RNA. Dec. 2008;14(12):2504-12.
Meyer et al., Transcription yield of fully 2'-modified RNA can be increased by the addition of thermostabilizing mutations to T7 RNA polymerase mutants. Nucleic Acids Res. Sep. 3, 2015;43(15):7480-8.
Padilla et al., A Y639F/H784A T7 RNA polymerase double mutant displays superior properties for synthesizing RNAs with non-canonical NTPs. Nucleic Acids Res. Dec. 15, 2002;30(24):e138.
Pieken et al., Kinetic characterization of ribonuclease-resistant 2'-modified hammerhead ribozymes. Science. Jul. 19, 1991;253(5017):314-7.
Rangnekar et al., Increased anticoagulant activity of thrombin-binding DNA aptamers by nanoscale organization on DNA nanostructures. Nanomedicine. Jul. 2012;8(5):673-81.
Rangnekar et al., Design of Potent and Controllable Anticoagulants Using DNA Aptamers and Nanostructures. Molecules. Feb. 6, 2016;21(2):202.
Sparvath et al., Computer-Aided Design of RNA Origami Structures. Methods Mol Biol. 2017;1500:51-80.
White et al., Generation of species cross-reactive aptamers using "toggle" SELEX. Mol Ther. Dec. 2001;4(6):567-73.
Wolberg et al., Venous thrombosis. Nat Rev Dis Primers. May 7, 2015;1:15006.
Grabow et al., "RNA self-assembly and RNA nanotechnology" Acc Chem Res. Jun. 17, 2014; 47(6):1871-80.
Greary et al., "A single-stranded architecture for cotranscriptional folding of RNA nanostructures" Science, Aug. 15, 2014, 345(6198): 799-804.
Han et al., "Single-stranded DNA and RNA origami" Science, 2017, 358, eaao2648, 11 pages.
Hong et al., "DNA Origami: Scaffolds for Creating Higher Order Structures" Chem. Rev. 2017, 117(20): 12584-12640.
Jepsen et al., "Development of a genetically encodable FRET system using fluorescent RNA aptamers" Nature Communications, 2018, 9(18), 10 pages.
Krissanaprasit et al., "Multivalent Aptamer-Functionalized Single-Strand RNA Origami as Effective, Target-Specific Anticoagulants with Corresponding Reversal Agents" Adv Healthcare Mater. Jun. 2021; 10(11):e2001826.
Lee et al., "Exchange-coupled magnetic nanoparticles for efficient heat induction" Nature Nanotechnology, 2011, 6: 418-422.
Rinker et al., "Self-assembled DNA nanostructures for distance-dependent multivalent ligand-protein binding" Nat Nanotechnol. Jul. 2008;3(7):418-22.
Sakai et al., "DNA Aptamers for the Functionalisation of DNA Origami Nanostructures" Genes (Basel). Nov. 23, 2018; 9(12):571.
Yang et al., "Aptamer-Binding Directed DNA Origami Pattern for Logic Gates" ACS Appl. Mater. Interfaces 2016, 8(49): 34054-34060.
Zavyalova et al., "Development of Antithrombotic Aptamers: From Recognizing Elements to Drugs" Current Pharmaceutical Design, 2016, 22:5163-5176.

* cited by examiner

SEQ ID NO: 4

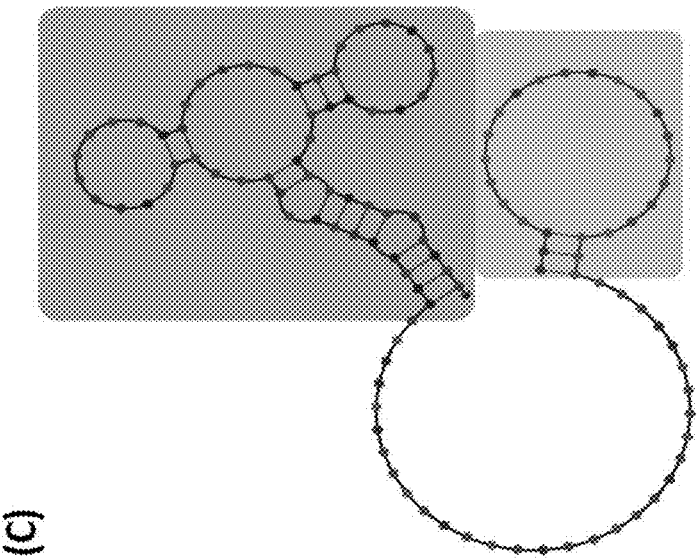
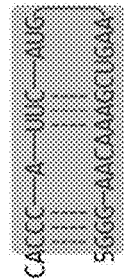
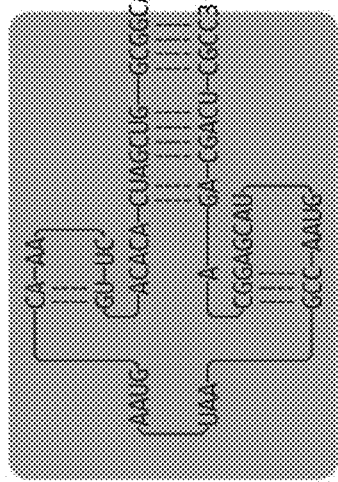
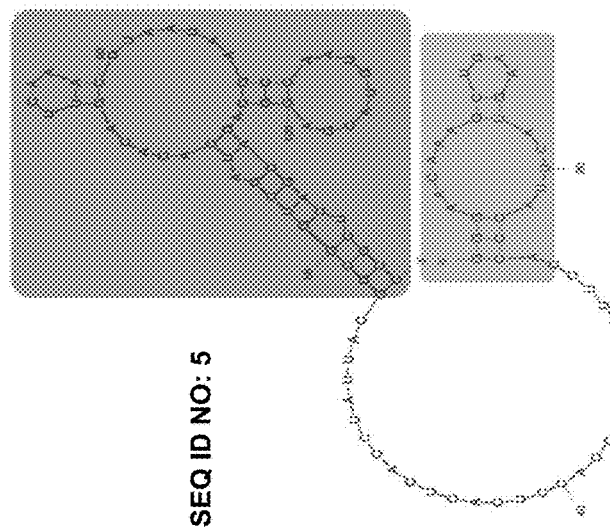
FIGS. 35A-35C

COMPOSITIONS AND METHODS RELATED TO NUCLEIC ACID ANTICOAGULANTS

CROSS REFERENCE TO RELATED APPLICATION

This application is a national phase application under 35 U.S.C. § 371 of PCT International Application No. PCT/US2019/058133, filed Oct. 25, 2019, which claims priority to and the benefit of U.S. Provisional Patent Application No. 62/750,900 filed Oct. 26, 2018, which is incorporated herein by reference in its entirety for all purposes.

GOVERNMENT FUNDING

This invention was made with government support under grant numbers 1559077, 1603179, and 1709010, awarded by the National Science Foundation (NSF). The government has certain rights in the invention.

INCORPORATION-BY-REFERENCE OF MATERIAL SUBMITTED ELECTRONICALLY

Incorporated by reference in its entirety herein is a computer-readable nucleotide/amino acid sequence listing submitted concurrently herewith and identified as follows: One 10,200 Byte ASCII (Text) file named "2021 Apr. 14_37060-252_SQL_CORRECTED_ST25," created on Jun. 19, 2025.

FIELD

The present disclosure provides compositions and methods related to nucleic acid molecules having therapeutic aptamers. In particular, the present disclosure provides nucleic acids molecules comprising one or more aptamers having anticoagulant activity, as well as corresponding nucleic acid antidotes, for the modulation of blood coagulation in the context of disease and surgical intervention.

BACKGROUND

The coagulation cascade involves a series of enzymatic reactions that ultimately produce fibrin clots on ruptured vascular and cellular surfaces. Anticoagulants disrupt the process of coagulation by blocking key players in the cascade. The regulation of fibrin clot formation by anticoagulants can consequently evade thrombosis, the formation of blood clots, in vital organs such as the heart, lungs, and brain. The life-threatening ramifications of thrombosis include strokes or transient ischemic attacks, heart attacks, deep vein thrombosis, and pulmonary embolisms.

The most commonly prescribed anticoagulant is Warfarin, which is a small molecule often used as a rodenticide. Warfarin is a vitamin K antagonist that inhibits the synthesis of clotting factors II, VII, IX, and X and endogenous anticoagulant proteins C and S. The body's sensitivity to vitamin K fluctuations requires strict and timely monitoring of its levels and adjusts dosages accordingly. Other forms of anticoagulants include Heparins, Factor Xa Inhibitors, Direct Thrombin Inhibitors, and Fibrobrinolytics. Consistent across all current methods of anticoagulation is a narrow therapeutic window for administration that effectively treats clotting without causing excessive anticoagulation, for example, during surgery if dosage of an anticoagulant is too high. Unfortunately, there is no antidote for chemical-based anticoagulants that can further mediate administration and combat the cytotoxic effects.

SUMMARY

Embodiments of the present disclosure provide a single-stranded nucleic acid molecule that includes at least one A-form double-helical structure and at least one crossover region, at least one kissing-loop region, and at least one nucleic acid aptamer having anti-coagulant activity.

In some embodiments, the nucleic acid molecule includes at least one tetra-loop region. In some embodiments, the nucleic acid molecule is an RNA molecule, or an RNA molecule that includes at least one nucleoside with a 2'-modification.

In some embodiments, the single-stranded nucleic acid molecule includes at least one tetra-loop region comprising a four-nucleotide motif. In some embodiments, the single-stranded nucleic acid molecule includes from one to six tetra-loop regions, each comprising a four-nucleotide motif. In some embodiments, the single-stranded nucleic acid molecule includes at least one kissing-loop region is a 180° kissing loop region. In some embodiments, the single-stranded nucleic acid molecule includes one 180° kissing loop region.

In some embodiments, the single-stranded nucleic acid molecule includes from one to four aptamers having anti-coagulant activity. In accordance with these embodiments, each of the from one to four aptamers replaces a tetra-loop region.

In some embodiments, the nucleic acid molecule is an RNA molecule having at least 80% sequence identity to SEQ ID NO: 1. SEQ 1.

In some embodiments, the anti-coagulation activity of the at least one nucleic acid aptamer comprises thrombin inhibition. In some embodiments, the anti-coagulation activity of the at least one nucleic acid aptamer includes the inhibition of one or more of Factor XIIa, Factor XIIIa, Factor XIa, Factor IXa, Factor Xa, and von Willebrand factor. In some embodiments, the at least one nucleic acid aptamer comprises an anti-thrombin $RNA_{R9D-14T}$ aptamer or a derivative thereof. In some embodiments, the at least one nucleic acid aptamer comprises an anti-thrombin Toggle-25t RNA aptamer or a derivative thereof.

In some embodiments, the nucleic acid molecule is an RNA molecule comprising from about 100 to about 600 nucleotides.

In some embodiments, the single-stranded nucleic acid molecule is an RNA molecule that comprises a nucleic acid aptamer capable of binding exosite 1 of thrombin that replaces tetra-loop region 1 of the RNA molecule, and a nucleic acid aptamer capable of binding exosite 2 of thrombin that replaces tetra-loop region 2 of the RNA molecule (2HO-RNA-12NN or 2HF-RNA-12NN). In some embodiments, the RNA molecule has at least 80% sequence identity to SEQ ID NO: 2.

In some embodiments, the single-stranded nucleic acid molecule is an RNA molecule that comprises a nucleic acid aptamer capable of binding exosite 1 of thrombin that replaces tetra-loop region 1 of the RNA molecule, and a nucleic acid aptamer capable of binding exosite 2 of thrombin that replaces tetra-loop region 3 of the RNA molecule (2HO-RNA-1N2N or 2HF-RNA-1N2N). In some embodiments, the RNA molecule has at least 80% sequence identity to SEQ ID NO: 3.

In some embodiments, the single-stranded nucleic acid molecule is an RNA molecule that comprises a nucleic acid aptamer capable of binding exosite 2 of thrombin that replaces tetra-loop region 1 of the RNA molecule, and a nucleic acid aptamer capable of binding exosite 1 of thrombin that replaces tetra-loop region 4 of the RNA molecule (2HO-RNA-2NN1 or 2HF-RNA-2NN1). In some embodiments, the RNA molecule has at least 80% sequence identity to SEQ ID NO: 4.

In some embodiments, the single-stranded nucleic acid molecule is an RNA molecule that comprises a nucleic acid aptamer capable of binding exosite 2 of thrombin linked to one end of a single-stranded RNA linker, and a nucleic acid aptamer capable of binding exosite 1 of thrombin linked to the other end of the single-stranded RNA linker (Fss12). In some embodiments, the RNA molecule has at least 80% sequence identity to SEQ ID NO: 5.

In some embodiments, the single-stranded nucleic acid molecule is an RNA molecule that comprises two nucleic acid aptamers capable of binding exosite 2 of thrombin, each replacing tetra-loop regions 1 and 2 of the RNA molecule, respectively, and two nucleic acid aptamers capable of binding exosite 1 of thrombin, each replacing tetra-loop regions 3 and 4 of the RNA molecule, respectively (2H-2211). In some embodiments, the RNA molecule has at least 80% sequence identity to SEQ ID NO: 6.

In some embodiments, the single-stranded nucleic acid molecule is an RNA molecule that comprises a nucleic acid aptamer capable of binding exosite 2 of thrombin that replaces tetra-loop region 1 of the RNA molecule, a nucleic acid aptamer capable of binding exosite 1 of thrombin that replaces tetra-loop region 4 of the RNA molecule, and an A-form double-helical structure separating the nucleic acid aptamer capable of binding exosite 2 of thrombin from the nucleic acid aptamer capable of binding exosite 1 of thrombin (3H-2NN1). In some embodiments, the RNA molecule has at least 80% sequence identity to SEQ ID NO: 7.

In some embodiments, the single-stranded nucleic acid molecule is an RNA molecule that comprises a nucleic acid aptamer capable of binding exosite 2 of thrombin that replaces tetra-loop region 1 of the RNA molecule, a nucleic acid aptamer capable of binding exosite 1 of thrombin that replaces tetra-loop region 4 of the RNA molecule, and two A-form double-helical structures separating the nucleic acid aptamer capable of binding exosite 2 of thrombin from the nucleic acid aptamer capable of binding exosite 1 of thrombin (4H-2NN1). In some embodiments, the RNA molecule has at least 80% sequence identity to SEQ ID NO: 8.

In some embodiments, the nucleic acid aptamer capable of binding exosite 1 of thrombin is an $RNA_{R9D-14T}$ aptamer or a derivative thereof. In some embodiments, the nucleic acid aptamer capable of binding exosite 2 of thrombin is an is a Toggle-25t RNA aptamer or a derivative thereof.

Embodiments of the present disclosure also include a DNA molecule encoding any of the single-stranded nucleic acid molecules described herein.

Embodiments of the present disclosure also include an anticoagulant composition. In accordance with these embodiments, the compositions include a single-stranded nucleic acid molecule comprising at least one A-form double-helical structure, at least one crossover region, at least one tetra-loop region, at least one kissing-loop region, and at least one nucleic acid aptamer having anti-coagulant activity, and pharmaceutically acceptable excipient, solvent, carrier, or diluent.

Embodiments of the present disclosure also include a system for modulating coagulation. In accordance with these embodiments, the system includes any of the single-stranded nucleic acid molecules described herein, and at least one single-stranded nucleic acid antidote capable of binding to at least a portion of any of the single-stranded nucleic acid molecules described herein, which counteract the anti-coagulant activity of these single-stranded nucleic acid molecules.

In some embodiments, the at least one nucleic acid antidote is a DNA molecule, a RNA molecule, an O-methyl RNA molecule, a fluoro-modified RNA molecule, a PNA molecule, an LNA molecule, or a combination or derivative thereof. In some embodiments, the at least one nucleic acid antidote binds to at least a portion of any of the single-stranded nucleic acid molecules described herein in a reverse complementary manner. In some embodiments, the at least one nucleic acid antidote binds to the least one nucleic acid aptamer of any of the single-stranded nucleic acid molecules described herein to counteract the anti-coagulant activity.

BRIEF DESCRIPTION OF THE DRAWINGS

FIG. 2A includes the tertiary structure of thrombin, including positions of exosite 1 and exosite 2. FIGS. 2B-2E include examples of DNA and RNA aptamers that are used as anticoagulants due to their specific inhibition of thrombin activity. $RNA_{R9D-14T}$ (FIG. 2B) and Toggle-25t (FIG. 2C) RNA aptamers bind to exosite 1 and exosite 2 of thrombin, respectively. DNA aptamers NU172 (FIG. 2D) and HD22 (FIG. 2E) bind to exosite 1 and exosite 2 of thrombin, respectively.

FIG. 8B includes a representative side view of RNA structure with all motifs aligned to the helices. Top left motif is the RNA thrombin aptamer.

FIG. 11A includes a representative depiction of a text file after running it through the trace script; the red box highlights the outputted code that can be submitted to NUPACK, which then provides the RNA sequence. FIG. 11B includes a representative depiction of RNA sequences output by NUPACK; the NED is also provided (generally, the sequence with the lowest NED is chosen for analysis).

FIG. 13A depicts 2HO-RNA-NNNN (SEQ ID NO: 1); FIG. 13B depicts 2HO-RNA-12NN (SEQ ID NO: 2); FIG. 13C depicts 2HO-RNA-1N2N (SEQ ID NO: 3), and FIG. 13D depicts 2HO-RNA-2NN1 (SEQ ID NO: 4).

FIGS. 35A-35C include representative 2D models of four designs of RNA origami including two aptamers on a single-stranded RNA linker of 31 nucleotides (Fss12; A). Computational analysis of RNA origami folding analyzed by mfold RNA and NUPACK software (B-C). Purple and blue rectangles represent exosite-1, and exosite-2-binding aptamers, respectively.

DETAILED DESCRIPTION

Embodiments of the present disclosure provide nucleic acid-based anticoagulants that combine RNA aptamers with an RNA origami structure, which is produced as a 2'-fluoro-modified transcript. The novel anticoagulants disclosed herein have demonstrated activity many fold higher than the free aptamers. The single-molecule constructs are advantageous for use as a surgical anticoagulant and are of sufficiently high molecular weight to greatly reduce rapid renal clearance. The nucleic acid anticoagulants disclosed herein will have less serious side-effects compare to currently used small molecule blood thinners. Additionally, embodiments of the present disclosure include nucleic acid antidotes made of complementary DNA that counteract anticoagulant activity.

Nucleic acid therapeutics represent an alternative solution to current pharmaceutical anticoagulants (FIGS. 2A-2E and FIG. 3). DNA and RNA aptamers can assume structures that bind to specific target molecules and have been developed to bind to thrombin and disrupt the coagulation cascade. Their advantages include greater biocompatibility to minimize side effects, a larger therapeutic window, and the availability of an antidote. The antidote comprises natural nucleic acids (DNA/RNA) or non-natural nucleic acids (such as PNA) complementary to the aptamer that can unfold the aptamers. This poses an advantage for clinical applications that require rapid and robust anticoagulation. However, these aptamers exhibit poor pharmacokinetics due to their small size (below 30 KDa); they were quickly removed by the kidneys after circulation and therefore required a more concentrated dosage to be effective.

Figure 1:
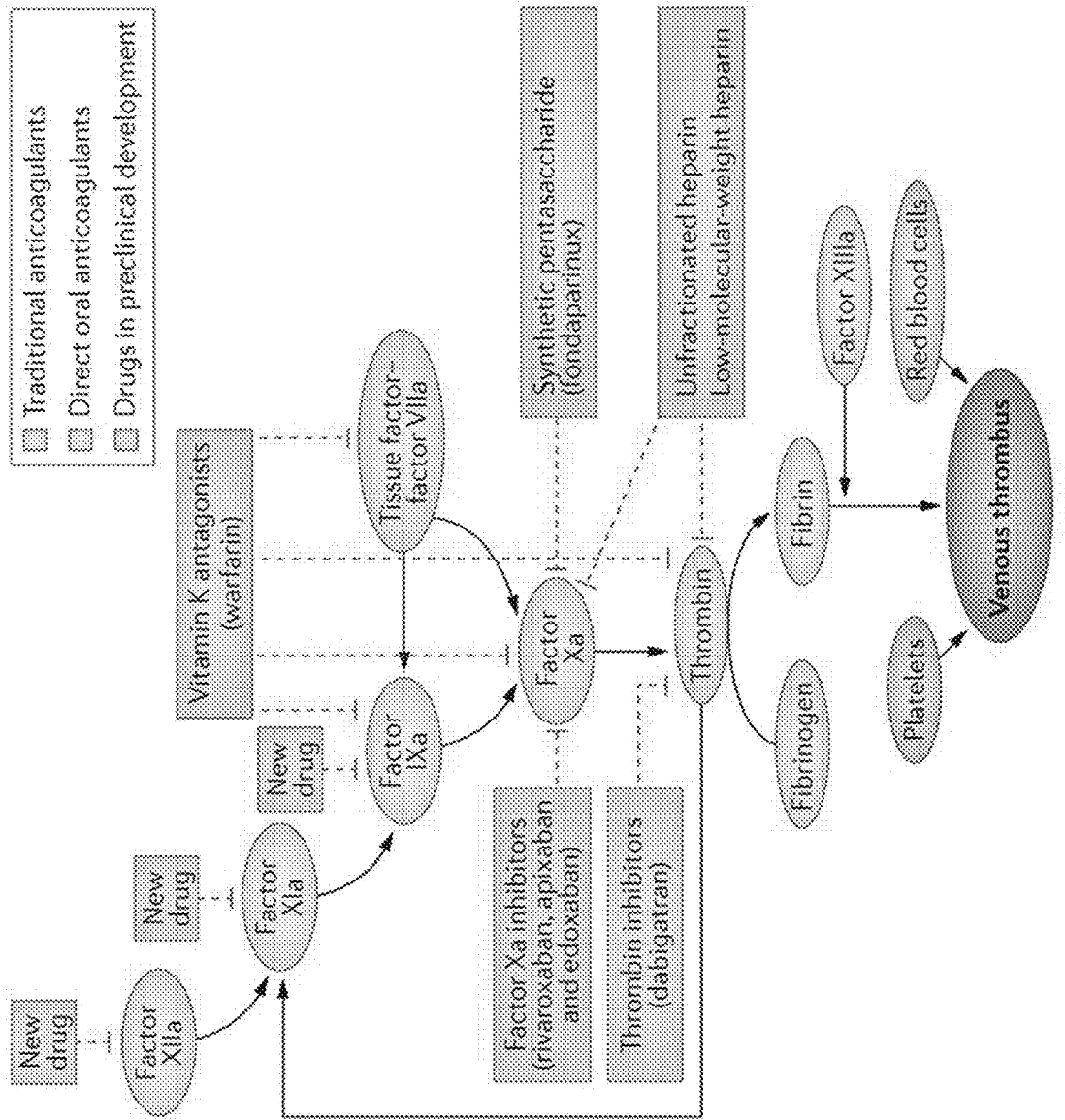
FIG. 1 includes a schematic diagram of the coagulation cascade and corresponding enzymes targeted by anticoagulant drugs. Thrombin plays an important role in coagulation by catalyzing the cleavage of fibrinogen, upstream coagulation factors, and platelet receptors. The catalytic active sites and two extended surfaces, termed exosites, of thrombin participate in macromolecular ligand binding and can be blocked using chemical and biological-based molecules to impede coagulation. Control of thrombin activities in the coagulation cascade offer therapeutic, surgical, and clinical benefits.
Figure 2A:
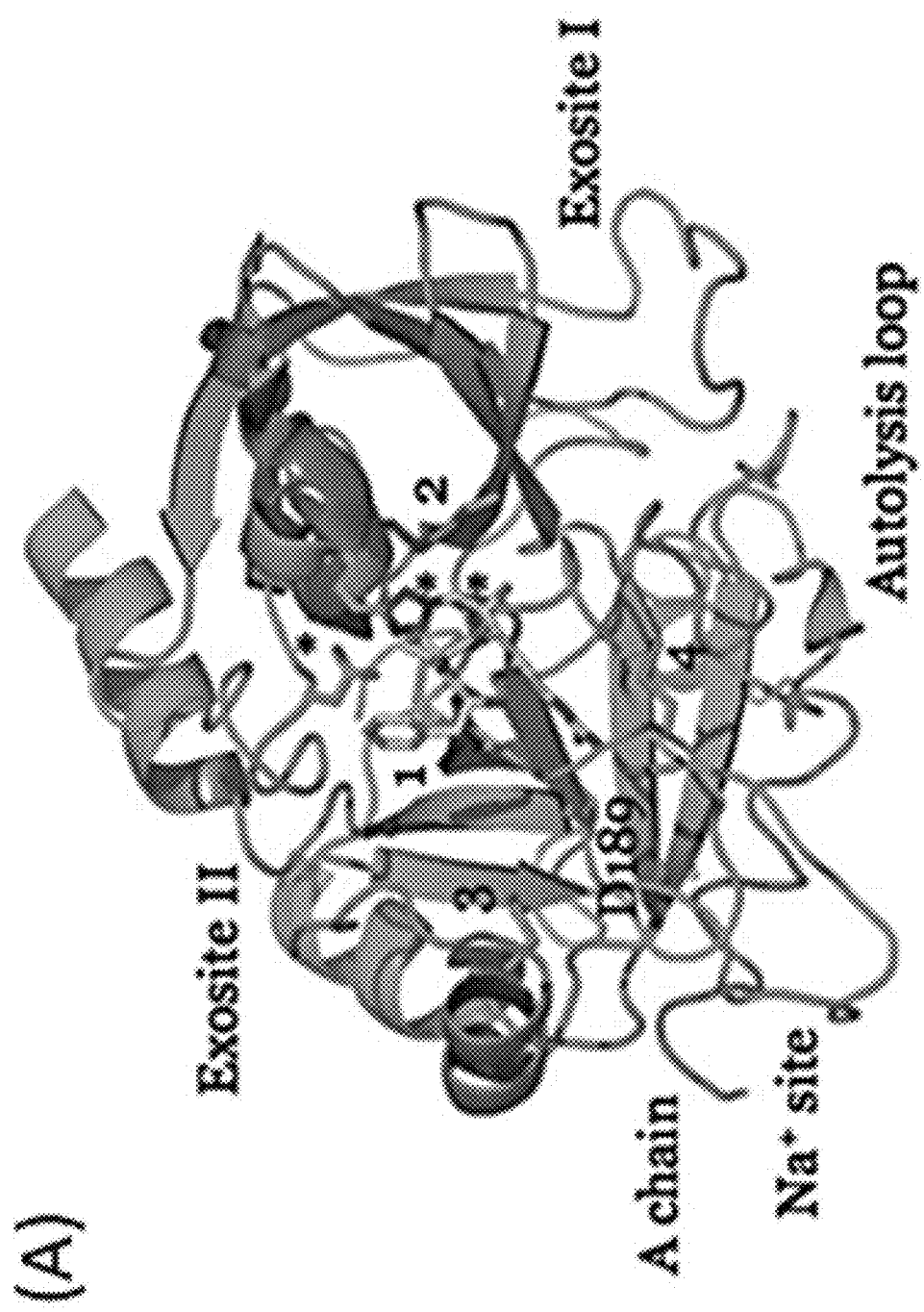
FIGS. 2A-2E include representative depictions of nucleic acid-based aptamers having anticoagulation activity.
Figures 2B, 2C, 2D, 2E:
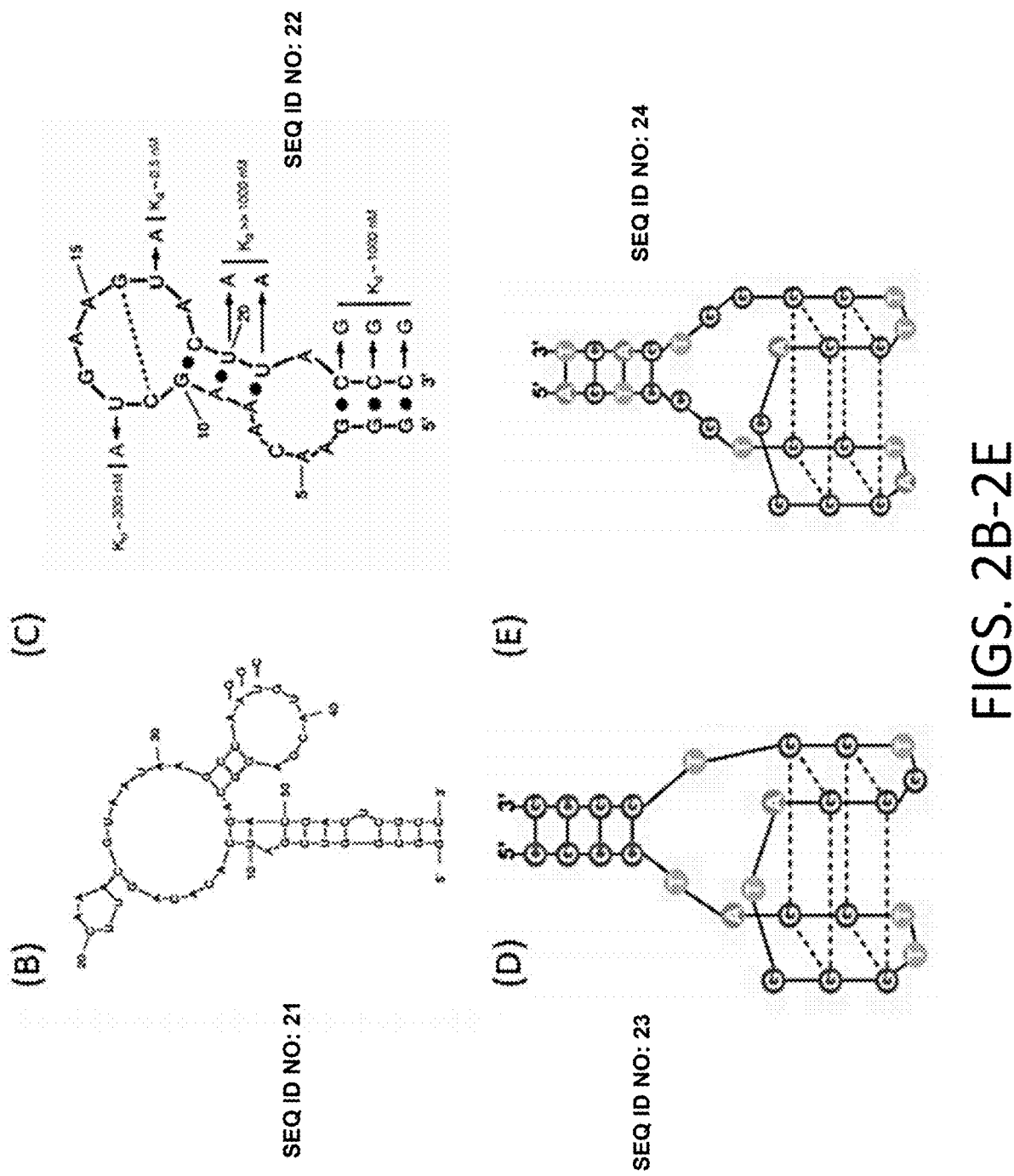
Figure 3:
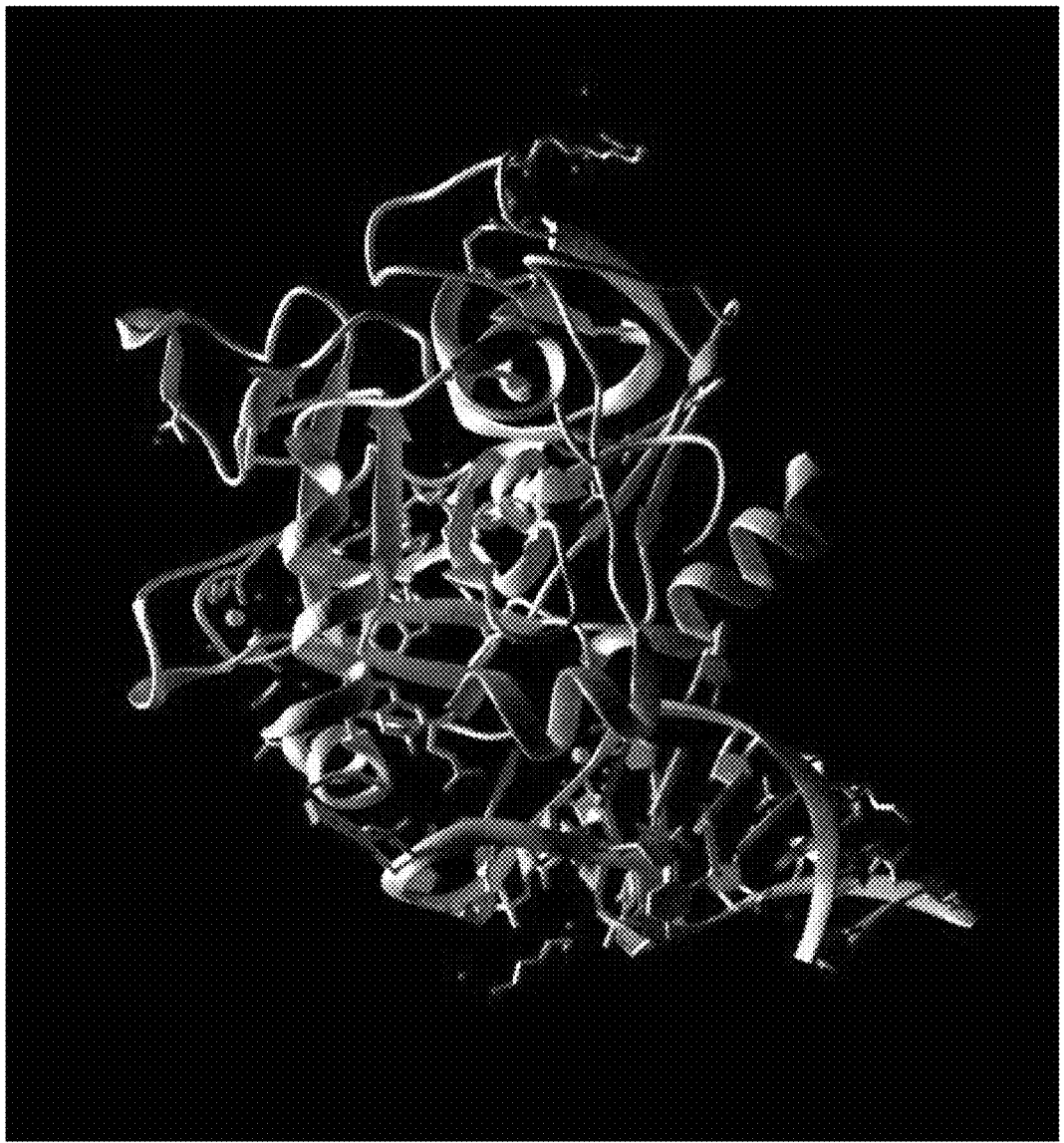
FIG. 3 depicts the crystal structure of the Toggle-25t RNA aptamer bound to exosite 2 of thrombin.
Figure 4:
FIG. 4 is an illustrative image of RNA origami bound to thrombin (not to scale). The RNA origami structure comprises a 2-helix structure.

Embodiments of the present disclosure include novel functional RNA origami that can bind to thrombin and prevent coagulation (FIG. 4). In one embodiment, two aptamers were decorated onto RNA origami in order to increase binding affinity and decrease the necessary dosage by increasing local concentration of RNA aptamers. The biocompatible nature of RNA and the availability of an antidote can similarly allow for precise treatment with a minimization of negative side effects. The circulation of RNA origami in the human body is longer than free aptamers due to a higher molecular weight (e.g., over than 80 kDa). The RNA origami anticoagulant compositions and systems of the present disclosure offer a viable alternative to current clinical anticoagulants by providing a more controllable solution with less side effects.

Section headings as used in this section and the entire disclosure herein are merely for organizational purposes and are not intended to be limiting.

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

"Correlated to" as used herein refers to compared to.

The term "aptamer" generally refers to either an oligonucleotide of a single defined sequence or a mixture of said oligonucleotides, wherein the mixture retains the properties of binding specifically to a target molecule. Thus, as used herein "aptamer" denotes both singular and plural sequences of oligonucleotides. The term "aptamer" generally refers to a single-stranded or double-stranded nucleic acid which is capable of binding to a protein or other molecule, and thereby disturbing the protein's or other molecule's function.

The term "single-stranded" oligonucleotides generally refers to those oligonucleotides that contain a single covalently linked series of nucleotide residues.

The terms "oligomers" or "oligonucleotides" include RNA or DNA sequences of more than one nucleotide in either single chain or duplex form and specifically includes short sequences such as dimers and trimers, in either single chain or duplex form, which can be intermediates in the production of the specifically binding oligonucleotides. "Modified" forms used in candidate pools contain at least one non-native residue. "Oligonucleotide" or "oligomer" is generic to polydeoxyribonucleotides (containing 2'-deoxy-D-ribose or modified forms thereof), such as DNA, to polyribonucleotides (containing D-ribose or modified forms thereof), such as RNA, and to any other type of polynucleotide which is an N-glycoside or C-glycoside of a purine or pyrimidine base, or modified purine or pyrimidine base or abasic nucleotides. Oligonucleotide" or "oligomer" can also be used to describe artificially synthesized polymers that are similar to RNA and DNA, including, but not limited to, oligos of peptide nucleic acids (PNA).

An "RNA aptamer" is an aptamer comprising ribonucleoside units. "RNA aptamer" is also meant to encompass RNA analogs as disclosed herein.

The term "coagulation factor" generally refers to a factor that acts in either or both of the intrinsic and the extrinsic coagulation cascade.

The term "RNA analog" or "RNA derivative" or "modified RNA" generally refer to a polymeric molecule, which in addition to containing ribonucleosides as its units, also contains at least one of the following: 2'-deoxy, 2'-halo (including 2'-fluoro), 2'-amino (preferably not substituted or mono- or disubstituted), 2'-mono-, di- or tri-halomethyl, 2'-O-alkyl, 2'-O-halo-substituted alkyl, 2'-alkyl, azido, phosphorothioate, sulfhydryl, methylphosphonate, fluorescein, rhodamine, pyrene, biotin, xanthine, hypoxanthine, 2,6-diamino purine, 2-hydroxy-6-mercaptopurine and pyrimidine bases substituted at the 6-position with sulfur or 5 position with halo or $C_{1-5}$ alkyl groups, a basic linkers, 3'-deoxy-adenosine as well as other available "chain terminator" or "non-extendible" analogs (at the 3'-end of the RNA), or labels such as $^{32}P$, $^{33}P$ and the like. All of the foregoing can be incorporated into an RNA using the standard synthesis techniques disclosed herein.

The terms "binding activity" and "binding affinity" generally refer to the tendency of a ligand molecule to bind or not to bind to a target. The energetics of these interactions are significant in "binding activity" and "binding affinity" because they can include definitions of the concentrations of interacting partners, the rates at which these partners are capable of associating, and the relative concentrations of bound and free molecules in a solution.

"Sequence identity" refers to the degree two polymer sequences (e.g., peptide, polypeptide, nucleic acid, etc.) have the same sequential composition of monomer subunits. The term "sequence similarity" refers to the degree with which two polymer sequences (e.g., peptide, polypeptide, nucleic acid, etc.) have similar polymer sequences. For example, similar amino acids are those that share the same biophysical characteristics and can be grouped into the families, e.g., acidic (e.g., aspartate, glutamate), basic (e.g., lysine, arginine, histidine), non-polar (e.g., alanine, valine, leucine, isoleucine, proline, phenylalanine, methionine, tryptophan) and uncharged polar (e.g., glycine, asparagine, glutamine, cysteine, serine, threonine, tyrosine). The "percent sequence identity" (or "percent sequence similarity") is calculated by: (1) comparing two optimally aligned sequences over a window of comparison (e.g., the length of the longer sequence, the length of the shorter sequence, a specified window), (2) determining the number of positions containing identical (or similar) monomers (e.g., same amino acids occurs in both sequences, similar amino acid occurs in both sequences) to yield the number of matched positions, (3) dividing the number of matched positions by the total number of positions in the comparison window (e.g., the length of the longer sequence, the length of the shorter sequence, a specified window), and (4) multiplying the result by 100 to yield the percent sequence identity or percent sequence similarity. For example, if peptides A and B are both 20 amino acids in length and have identical amino acids at all but 1 position, then peptide A and peptide B have 95% sequence identity. If the amino acids at the non-identical position shared the same biophysical characteristics (e.g., both were acidic), then peptide A and peptide B would have 100% sequence similarity. As another example, if peptide C is 20 amino acids in length and peptide D is 15 amino acids in length, and 14 out of 15 amino acids in peptide D are identical to those of a portion of peptide C, then peptides C and D have 70% sequence identity, but peptide D has 93.3% sequence identity to an optimal comparison window of peptide C. For the purpose of calculating "percent sequence identity" (or "percent sequence similarity") herein, any gaps in aligned sequences are treated as mismatches at that position.

Embodiments of the present disclosure provide single-stranded nucleic acid molecules having an A-form double-helical structure and at least one crossover region, at least one kissing-loop region, and at least one nucleic acid aptamer having anti-coagulant activity. In accordance with these embodiments, the single-stranded nucleic acid molecule can be a DNA molecule or an RNA molecule, or any derivatives or combinations thereof.

In some embodiments, the single-stranded nucleic acid molecule can be an RNA molecule that includes at least one nucleoside with a 2'-modification. In some embodiments, single-stranded RNA origami molecules of the present disclosure can include at least one 2'-fluoro-dCTP or a 2'-fluoro-dUTP or one other nucleoside with a 2'-modification such as 2'-amino or 2'-O-methyl or a chemical modification of the backbone phosphate groups such as a phosphorothioate.

In some embodiments, the single-stranded nucleic acid molecule includes at least one tetra-loop region comprising a four-nucleotide motif. In some embodiments, the single-stranded nucleic acid molecule includes from one to three tetra-loop regions, each comprising a four-nucleotide motif. In some embodiments, the single-stranded nucleic acid molecule includes from one to four aptamers having anti-coagulant activity. In accordance with these embodiments, each of the from one to four aptamers replaces one of the at least one tetra-loop regions. In some embodiments, the single-stranded nucleic acid molecule does not include a tetra-loop region.

In some embodiments, the single-stranded nucleic acid molecule includes at least one kissing-loop region is a 180° kissing loop region. In some embodiments, the single-stranded nucleic acid molecule includes one 180° kissing loop region. In some embodiments, the single-stranded nucleic acid molecule does not include a kissing loop region.

In some embodiments, the single-stranded nucleic acid molecule includes single-stranded RNA linker region. In some embodiments, nucleic acid aptamers can be linked to one end or both ends of the single stranded RNA linker region. In some embodiments, the single-stranded nucleic acid molecule does not include a kissing loop region or a tetraloop region.

In some embodiments, the single-stranded nucleic acid molecule includes at least one helical structure (e.g., an A-form double-helical structure). In some embodiments, the single-stranded nucleic acid molecule includes at least two helical structures. In some embodiments, the single-stranded nucleic acid molecule includes at least three helical structures. In some embodiments, the single-stranded nucleic acid molecule includes at least four helical structures. In some embodiments, the single-stranded nucleic acid molecule includes five or more helical structures. In some embodiments, the single-stranded nucleic acid molecule includes at least one helical structure separating two or more nucleic acid aptamers. In some embodiments, the at least one helical structure separating two or more nucleic acid aptamers includes at least one nucleic acid aptamer. In some embodiments, the at least one helical structure separating two or more nucleic acid aptamers does not include a nucleic acid aptamer.

In some embodiments, the nucleic acid molecule is an RNA molecule having at least 80% sequence identity to SEQ ID NO: 1. In some embodiments, the nucleic acid molecule is an RNA molecule having at least 85% sequence identity to SEQ ID NO: 1. In some embodiments, the nucleic acid molecule is an RNA molecule having at least 90% sequence identity to SEQ ID NO: 1. In some embodiments, the nucleic acid molecule is an RNA molecule having at least 95% sequence identity to SEQ ID NO: 1. In some embodiments, the nucleic acid molecule is an RNA molecule having at least 96% sequence identity to SEQ ID NO: 1. In some embodiments, the nucleic acid molecule is an RNA molecule having at least 97% sequence identity to SEQ ID NO: 1. In some embodiments, the nucleic acid molecule is an RNA molecule having at least 98% sequence identity to SEQ ID NO: 1. In some embodiments, the nucleic acid molecule is an RNA molecule having at least 99% sequence identity to SEQ ID NO: 1.

In some embodiments, the anti-coagulation activity of the at least one nucleic acid aptamer includes the inhibition of one or more of Factor XIIa, Factor XIIIa, Factor XIa, Factor IXa, Factor Xa, and von Willebrand factor. In some embodiments, the nucleic acid aptamers that can be included in the RNA origami molecules disclosed herein include any aptamers involved in modulating blood coagulation, including but not limited to, ARC183/HD1 (targets FIIa); HD22 (targets FIIa); HD1-22 (targets FIIa); Tog25 (targets FII); R9d14t (targets FII/FIIa); 11F7t (targets FXa); 16.3 (targets FVIIa); 7S-1/7S-2 (targets FVII); 9.3t (targets FIXa); R4cXII-1 (targets FXII/FXIIa); NU172 (targets thrombin); REG1 (targets FIX/FIXa); REG2 (targets FIX/FIXa); ARC1779 (targets von Willebrand Factor); and ARC19499 (targets TFPI).

In some embodiments, the anti-coagulation activity of the at least one nucleic acid aptamer comprises thrombin inhibition. In some embodiments, the at least one nucleic acid aptamer comprises an anti-thrombin $RNA_{R9D-14T}$ aptamer or a derivative thereof. In some embodiments, the at least one nucleic acid aptamer comprises an anti-thrombin Toggle-25t RNA aptamer or a derivative thereof. In some embodiments, the nucleic acid aptamer capable of binding exosite 1 of thrombin is an $RNA_{R9D-14T}$ aptamer or a derivative thereof. In some embodiments, the nucleic acid aptamer capable of binding exosite 2 of thrombin is a Toggle-25t RNA aptamer or a derivative thereof.

In some embodiments, the nucleic acid molecule is an RNA molecule comprising from about 100 to about 1000 nucleotides. In some embodiments, the nucleic acid molecule is an RNA molecule comprising from about 100 to about 900 nucleotides. In some embodiments, the nucleic acid molecule is an RNA molecule comprising from about 100 to about 800 nucleotides. In some embodiments, the nucleic acid molecule is an RNA molecule comprising from about 100 to about 700 nucleotides. In some embodiments, the nucleic acid molecule is an RNA molecule comprising from about 100 to about 600 nucleotides. In some embodiments, the nucleic acid molecule is an RNA molecule comprising from about 100 to about 500 nucleotides. In some embodiments, the nucleic acid molecule is an RNA molecule comprising from about 100 to about 400 nucleotides. In some embodiments, the nucleic acid molecule is an RNA molecule comprising from about 100 to about 300 nucleotides. In some embodiments, the nucleic acid molecule is an RNA molecule comprising from about 150 to about 600 nucleotides. In some embodiments, the nucleic acid molecule is an RNA molecule comprising from about 150 to about 500 nucleotides. In some embodiments, the nucleic acid molecule is an RNA molecule comprising from about 150 to about 400 nucleotides. In some embodiments, the nucleic acid molecule is an RNA molecule comprising from about 150 to about 300 nucleotides. In some embodiments, the nucleic acid molecule is an RNA molecule comprising from about 200 to about 600 nucleotides. In some embodiments, the nucleic acid molecule is an RNA molecule comprising from about 225 to about 600 nucleotides. In some embodiments, the nucleic acid molecule is an RNA molecule comprising from about 250 to about 600 nucleotides. In some embodiments, the nucleic acid molecule is an RNA molecule comprising from about 200 to about 500 nucleotides. In some embodiments, the nucleic acid molecule is an RNA molecule comprising from about 200 to about 450 nucleotides. In some embodiments, the nucleic acid molecule is an RNA molecule comprising from about 200 to about 400 nucleotides. In some embodiments, the nucleic acid molecule is an RNA molecule comprising from about 200 to about 350 nucleotides.

In some embodiments, the single-stranded nucleic acid molecule is an RNA molecule that comprises a nucleic acid aptamer that replaces tetra-loop region 1 of the RNA molecule capable of binding exosite 1 of thrombin, and a nucleic acid aptamer that replaces tetra-loop region 2 of the RNA molecule capable of binding exosite 2 of thrombin (2HO-RNA-12NN or 2HF-RNA-12NN). In some embodiments, the RNA molecule has 80% sequence identity to SEQ ID NO: 2. In some embodiments, the RNA molecule has at least 85% sequence identity to SEQ ID NO: 2. In some embodiments, the RNA molecule has at least 90% sequence identity to SEQ ID NO: 2. In some embodiments, the RNA molecule has at least 95% sequence identity to SEQ ID NO: 2. In some embodiments, the RNA molecule has at least 96% sequence identity to SEQ ID NO: 2. In some embodiments, the RNA molecule has at least 97% sequence identity to SEQ ID NO: 2. In some embodiments, the RNA molecule has at least 98% sequence identity to SEQ ID NO: 2. In some embodiments, the RNA molecule has at least 99% sequence identity to SEQ ID NO: 2.

In some embodiments, the single-stranded nucleic acid molecule is an RNA molecule that comprises a nucleic acid aptamer that replaces tetra-loop region 1 of the RNA molecule capable of binding exosite 1 of thrombin, and a nucleic acid aptamer that replaces tetra-loop region 3 of the RNA molecule capable of binding exosite 2 of thrombin (2HO-RNA-1N2N or 2HF-RNA-1N2N). In some embodiments, the RNA molecule has 80% sequence identity to SEQ ID NO: 3. In some embodiments, the RNA molecule has at least 85% sequence identity to SEQ ID NO: 3. In some embodiments, the RNA molecule has at least 90% sequence identity to SEQ ID NO: 3. In some embodiments, the RNA molecule has at least 95% sequence identity to SEQ ID NO: 3. In some embodiments, the RNA molecule has at least 96% sequence identity to SEQ ID NO: 3. In some embodiments, the RNA molecule has at least 97% sequence identity to SEQ ID NO: 3. In some embodiments, the RNA molecule has at least 98% sequence identity to SEQ ID NO: 3. In some embodiments, the RNA molecule has at least 99% sequence identity to SEQ ID NO: 3.

In some embodiments, the single-stranded nucleic acid molecule is an RNA molecule that comprises a nucleic acid aptamer that replaces tetra-loop region 1 of the RNA molecule capable of binding exosite 2 of thrombin, and a nucleic acid aptamer that replaces tetra-loop region 4 of the RNA molecule capable of binding exosite 1 of thrombin (2HO-RNA-2NN1 or 2HF-RNA-2NN1). In some embodiments, the RNA molecule has 80% sequence identity to SEQ ID NO: 4. In some embodiments, the RNA molecule has at least 85% sequence identity to SEQ ID NO: 4. In some embodiments, the RNA molecule has at least 90% sequence identity to SEQ ID NO: 4. In some embodiments, the RNA molecule has at least 95% sequence identity to SEQ ID NO: 4. In some embodiments, the RNA molecule has at least 96% sequence identity to SEQ ID NO: 4. In some embodiments, the RNA molecule has at least 97% sequence identity to SEQ ID NO: 4. In some embodiments, the RNA molecule has at least 98% sequence identity to SEQ ID NO: 4. In some embodiments, the RNA molecule has at least 99% sequence identity to SEQ ID NO: 4.

In some embodiments, the single-stranded nucleic acid molecule is an RNA molecule that comprises a nucleic acid aptamer capable of binding exosite 2 of thrombin linked to one end of a single-stranded RNA linker, and a nucleic acid aptamer capable of binding exosite 1 of thrombin linked to the other end of the single-stranded RNA linker (Fss12). In some embodiments, the RNA molecule has 80% sequence identity to SEQ ID NO: 5. In some embodiments, the RNA molecule has at least 85% sequence identity to SEQ ID NO: 5. In some embodiments, the RNA molecule has at least 90% sequence identity to SEQ ID NO: 5. In some embodiments, the RNA molecule has at least 95% sequence identity to SEQ ID NO: 5. In some embodiments, the RNA molecule has at least 96% sequence identity to SEQ ID NO: 5. In some embodiments, the RNA molecule has at least 97% sequence identity to SEQ ID NO: 5. In some embodiments, the RNA molecule has at least 98% sequence identity to SEQ ID NO: 5. In some embodiments, the RNA molecule has at least 99% sequence identity to SEQ ID NO: 5.

In some embodiments, the single-stranded nucleic acid molecule is an RNA molecule that comprises two nucleic acid aptamers capable of binding exosite 2 of thrombin, each replacing tetra-loop regions 1 and 2 of the RNA molecule, respectively, and two nucleic acid aptamers capable of binding exosite 1 of thrombin, each replacing tetra-loop regions 3 and 4 of the RNA molecule, respectively (2H-2211). In some embodiments, the RNA molecule has 80% sequence identity to SEQ ID NO: 6. In some embodiments, the RNA molecule has at least 85% sequence identity to SEQ ID NO: 6. In some embodiments, the RNA molecule has at least 90% sequence identity to SEQ ID NO: 6. In some embodiments, the RNA molecule has at least 95% sequence identity to SEQ ID NO: 6. In some embodiments, the RNA molecule has at least 96% sequence identity to SEQ ID NO: 6. In some embodiments, the RNA molecule has at least 97% sequence identity to SEQ ID NO: 6. In some embodiments, the RNA molecule has at least 98% sequence identity to SEQ ID NO: 6. In some embodiments, the RNA molecule has at least 99% sequence identity to SEQ ID NO: 6.

In some embodiments, the single-stranded nucleic acid molecule is an RNA molecule that comprises a nucleic acid aptamer capable of binding exosite 2 of thrombin that replaces tetra-loop region 1 of the RNA molecule, a nucleic acid aptamer capable of binding exosite 1 of thrombin that replaces tetra-loop region 4 of the RNA molecule, and an A-form double-helical structure separating the nucleic acid aptamer capable of binding exosite 2 of thrombin from the nucleic acid aptamer capable of binding exosite 1 of thrombin (3H-2NN1). In some embodiments, the RNA molecule has 80% sequence identity to SEQ ID NO: 7. In some embodiments, the RNA molecule has at least 85% sequence identity to SEQ ID NO: 7. In some embodiments, the RNA molecule has at least 90% sequence identity to SEQ ID NO: 7. In some embodiments, the RNA molecule has at least 95% sequence identity to SEQ ID NO: 7. In some embodiments, the RNA molecule has at least 96% sequence identity to SEQ ID NO: 7. In some embodiments, the RNA molecule has at least 97% sequence identity to SEQ ID NO: 7. In some embodiments, the RNA molecule has at least 98% sequence identity to SEQ ID NO: 7. In some embodiments, the RNA molecule has at least 99% sequence identity to SEQ ID NO: 7.

In some embodiments, the single-stranded nucleic acid molecule is an RNA molecule that comprises a nucleic acid aptamer capable of binding exosite 2 of thrombin that replaces tetra-loop region 1 of the RNA molecule, a nucleic acid aptamer capable of binding exosite 1 of thrombin that replaces tetra-loop region 4 of the RNA molecule, and two A-form double-helical structures separating the nucleic acid aptamer capable of binding exosite 2 of thrombin from the nucleic acid aptamer capable of binding exosite 1 of thrombin (4H-2NN1). In some embodiments, the RNA molecule has 80% sequence identity to SEQ ID NO: 8. In some embodiments, the RNA molecule has at least 85% sequence identity to SEQ ID NO: 8. In some embodiments, the RNA molecule has at least 90% sequence identity to SEQ ID NO: 8. In some embodiments, the RNA molecule has at least 95% sequence identity to SEQ ID NO: 8. In some embodiments, the RNA molecule has at least 96% sequence identity to SEQ ID NO: 8. In some embodiments, the RNA molecule has at least 97% sequence identity to SEQ ID NO: 8. In some embodiments, the RNA molecule has at least 98% sequence identity to SEQ ID NO: 8. In some embodiments, the RNA molecule has at least 99% sequence identity to SEQ ID NO: 8.

Embodiments of the present disclosure also include a DNA molecule encoding any of the single-stranded nucleic acid molecules described herein. As would be recognized by one of ordinary skill in the art based on the present disclosure, the DNA molecule encoding any of the single-stranded nucleic acid molecules described herein can be single- or double-stranded, and can act as a template for generating any of the single-stranded nucleic acid molecules described herein. The DNA template can be part of an expression plasmid or other construct for in vivo and/or in vitro biochemical reactions.

Embodiments of the present disclosure also include an anticoagulant composition. In accordance with these embodiments, the compositions include a single-stranded nucleic acid molecule comprising an A-form double-helical structure and at least one crossover region, at least one kissing-loop region, and at least one nucleic acid aptamer having anti-coagulant activity, and pharmaceutically acceptable excipient, solvent, carrier, or diluent. In some embodiments, the single-stranded nucleic acid molecule additionally comprises at least one tetraloop region. As would be recognized by one of ordinary skill in the art based on the present disclosure, the composition can be administered to a subject or patient in accordance with a treatment regimen to modulate blood coagulation in the context of a surgical procedure and/or to treat a disease condition.

Embodiments of the present disclosure also include a system for modulating coagulation. In accordance with these embodiments, the system includes any of the single-stranded nucleic acid molecules described herein, and at least one single-stranded nucleic acid antidote capable of binding to at least a portion of any of the single-stranded nucleic acid molecules described herein, which counteract the anti-coagulant activity of these single-stranded nucleic acid molecules. As would be recognized by one of ordinary skill in the art based on the present disclosure, the system can be used for treating a subject or patient in accordance with a treatment regimen to modulate blood coagulation in the context of a surgical procedure and/or to treat a disease condition.

In some embodiments, the at least one nucleic acid antidote is a DNA molecule, a RNA molecule, an O-methyl RNA molecule, a fluoro-modified RNA molecule, a PNA molecule, an LNA molecule, or a combination or derivative thereof. In some embodiments, the at least one nucleic acid antidote binds to at least a portion of any of the single-stranded nucleic acid molecules described herein in a reverse complementary manner. In some embodiments, the at least one nucleic acid antidote binds to the least one nucleic acid aptamer of any of the single-stranded nucleic acid molecules described herein to counteract the anti-coagulant activity.

Unless otherwise defined herein, scientific and technical terms used in connection with the present disclosure shall have the meanings that are commonly understood by those of ordinary skill in the art. For example, any nomenclatures used in connection with, and techniques of, cell and tissue culture, molecular biology, immunology, microbiology, genetics and protein and nucleic acid chemistry and hybridization described herein are those that are well known and commonly used in the art. The meaning and scope of the terms should be clear; in the event, however of any latent ambiguity, definitions provided herein take precedent over any dictionary or extrinsic definition. Further, unless otherwise required by context, singular terms shall include pluralities and plural terms shall include the singular.

2. DESIGNS AND METHODS

Embodiments of the present disclosure include methods for designing and generating single-stranded nucleic acid molecules comprising nucleic acid aptamers with various therapeutic functions, such as, but not limited to, anti-coagulant activity. In some embodiments, single-stranded nucleic acid molecules of the present disclosure include RNA molecules (RNA origami) that include nucleic acid aptamers having anti-coagulant activity. In accordance with these embodiments, the present disclosure provides general steps for designing RNA origami, which include, (i) creating a 3D model, (ii) conversion to a 2D model, (iii) producing a text file design from 2D model, and (iv) analysis of RNA sequence.

Figures 5A, 5B:
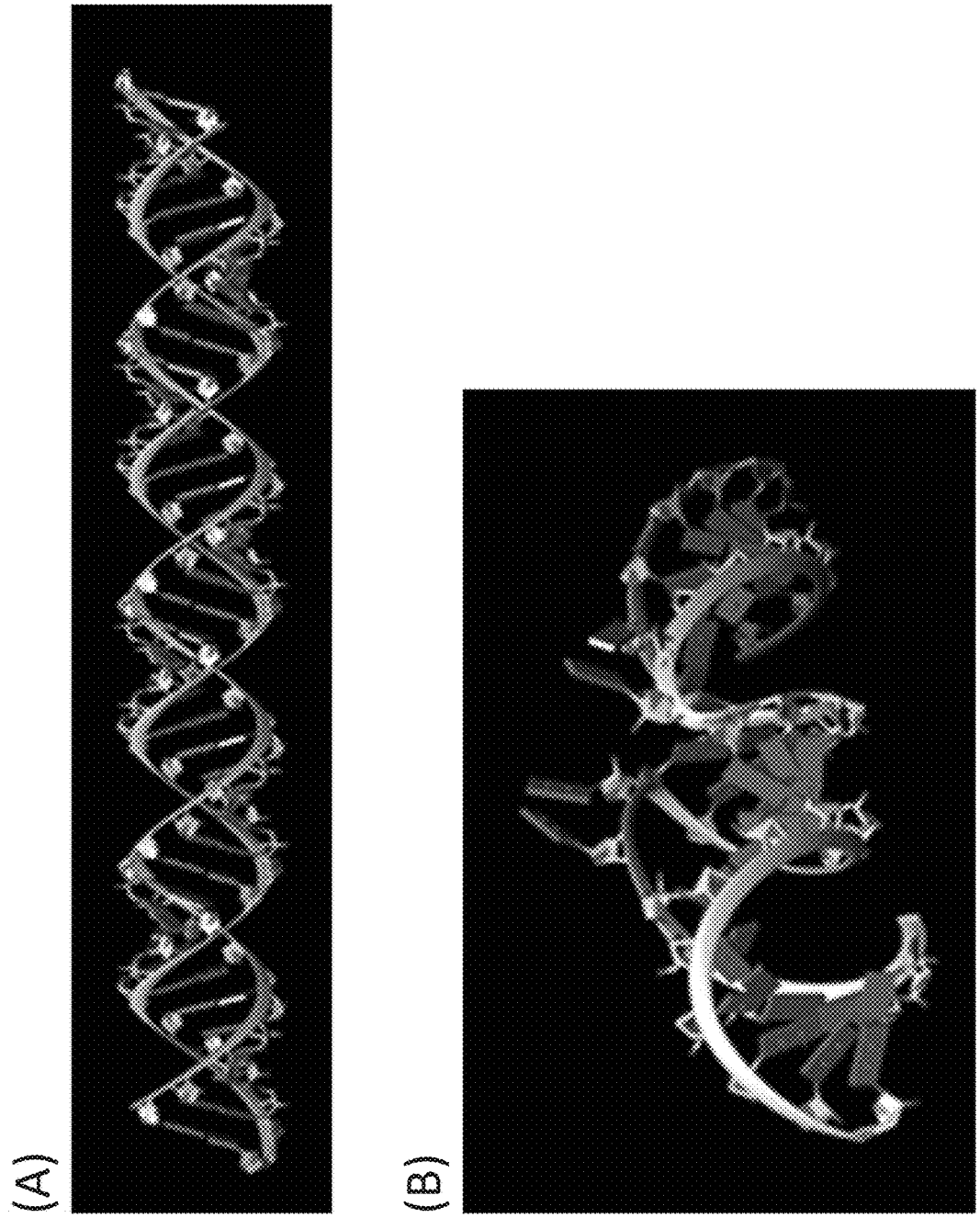
FIGS. 5A-5B include representative images of an RNA molecule having an A-form double-helical structure (FIG. 5A) and a 180° kissing-loop (FIG. 5B).

In some embodiments of RNA origami design, an A-form of an RNA double helix is used (FIGS. 5A-5B). The geometry of the helix contributes to determining where to place the double crossovers. Multiple motifs can be used with this design. For example, the use of a kissing loop motif allows for a multi-helical structure to be routed by a single strand. In some embodiments, a 180° kissing-loop can be used. Additionally, a tetra-loop motif can be used; a tetra-loop is a small four-nucleotide motif that caps the ends of the structure. The presence of tetra-loops can function to stabilize the overall structure of the RNA molecule.

Figure 6A:
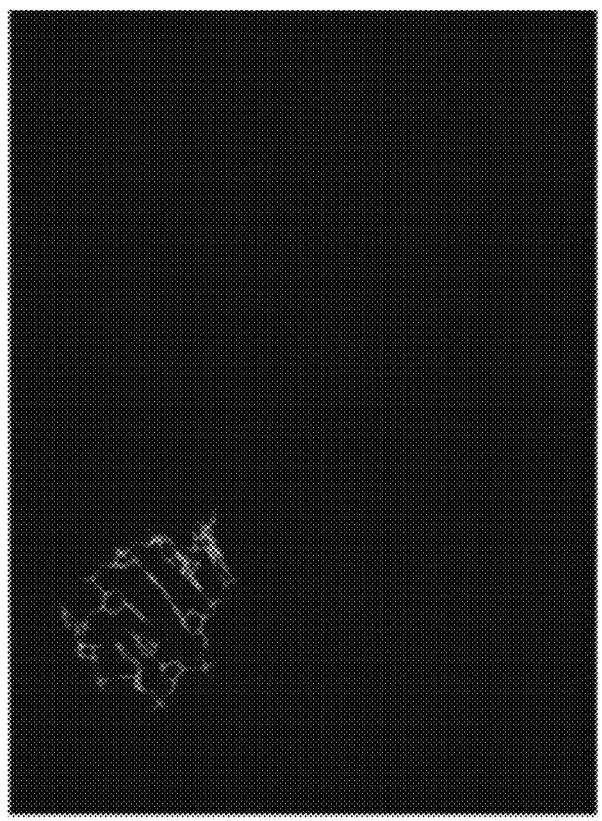
FIGS. 6A-6B include representative images of a tetra-loop before (FIG. 6A) and after (FIG. 6B) extraction from a larger structure. The red circle shows tetra loop within the larger structure.
Figure 6B:
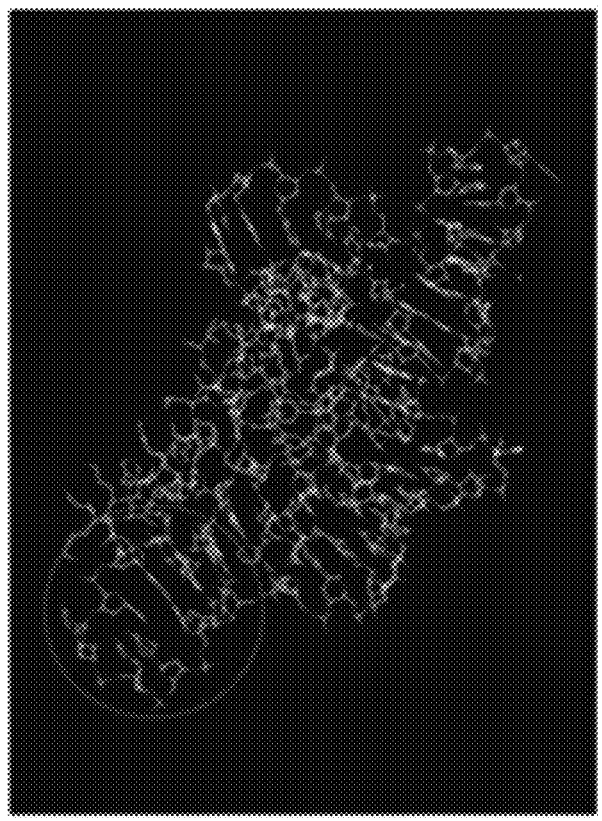
Figure 7A:
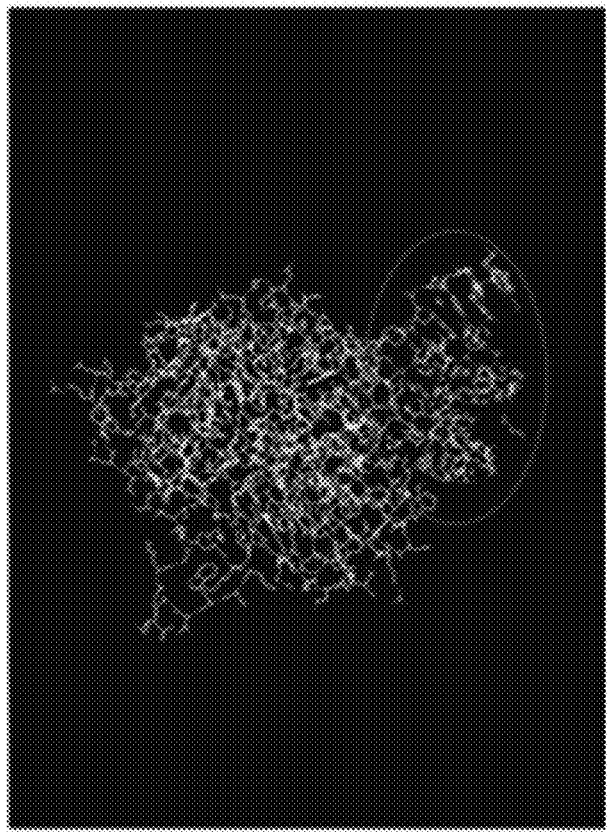
FIGS. 7A-7B include representative images of an exosite 2 thrombin aptamer before (FIG. 7A) and after (FIG. 7B) extraction from a larger structure. The red circle shows tetra loop within the larger structure.
Figure 7B:
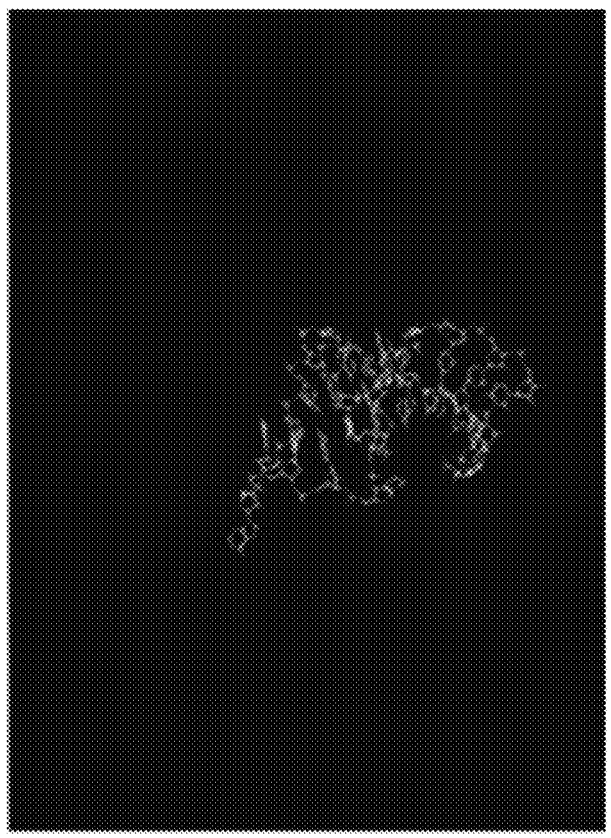

In accordance with the methods described herein, a 3D model can be created of the RNA origami molecule. For example, a 2-helix RNA origami structure was created and included thrombin RNA aptamers. Bioinformatics software can be used to generate files for each of the motifs, including, but not limited to, the RNA double helix, the tetra-loop(s), the 180° kissing-loop(s), and the RNA thrombin aptamer(s). Generally, the file corresponding to the A-form RNA double helix is generated first, as it serves as a base for all other motifs. Next, a file corresponding to a 180° kissing-loop (FIG. 5B) was added, followed by the file corresponding to the tetra-loop, which in some cases, can be extracted from larger files (FIG. 6A-6B). Lastly, the file corresponding to the exosite 1 and exosite 2 RNA aptamers is added; again, in some cases, these files can be extracted from larger sources (FIG. 7A-7B).

Figures 8A, 8B:
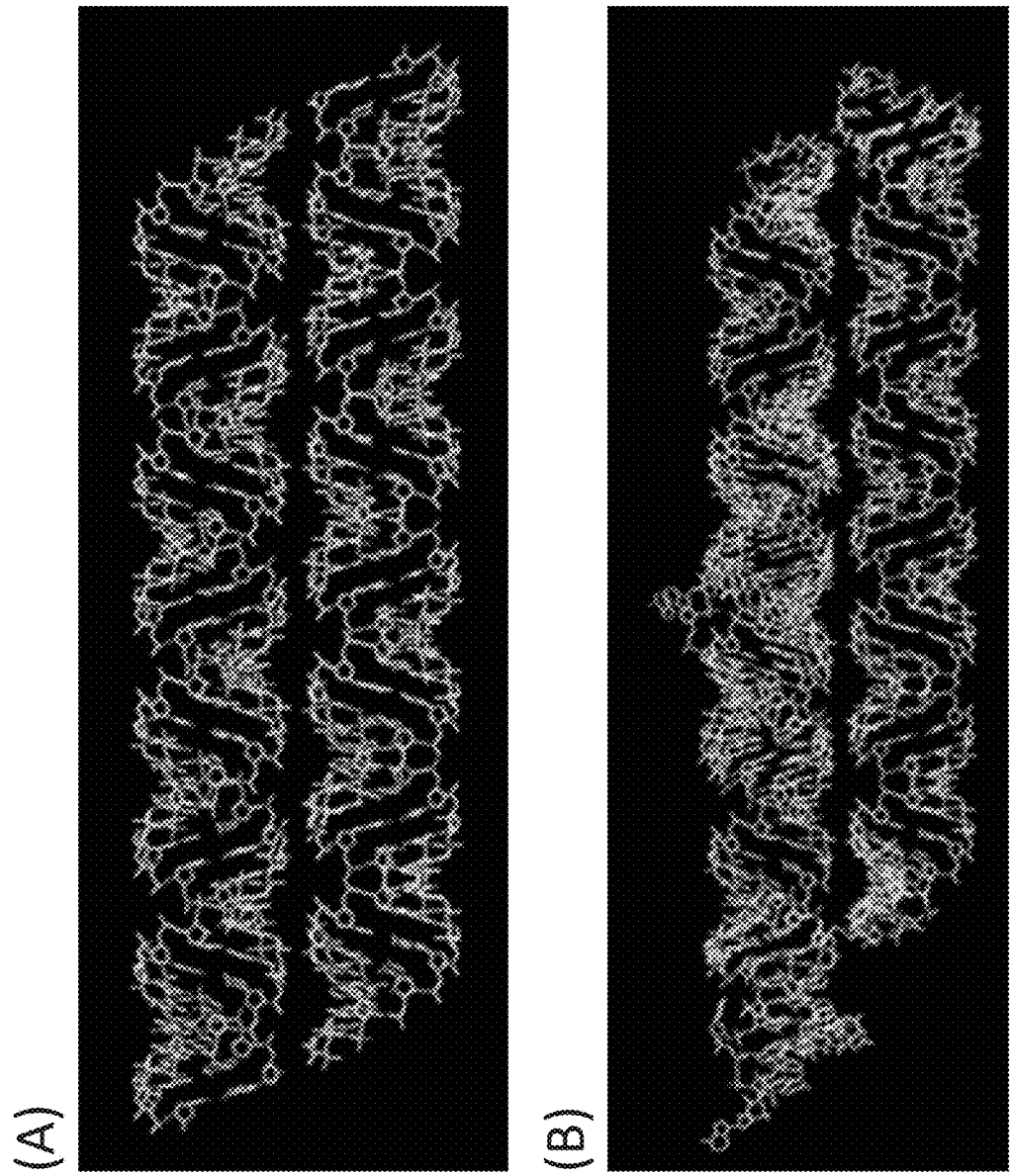
FIGS. 8A-8B include representative images of double helices after being aligned to form crossovers (FIG. 8A; top helix is Helix 1, and bottom helix is Helix 2). The phosphate atoms and backbone and side (sugar/base) where the crossovers are positioned are identified in red and yellow, respectively.
Figure 9:
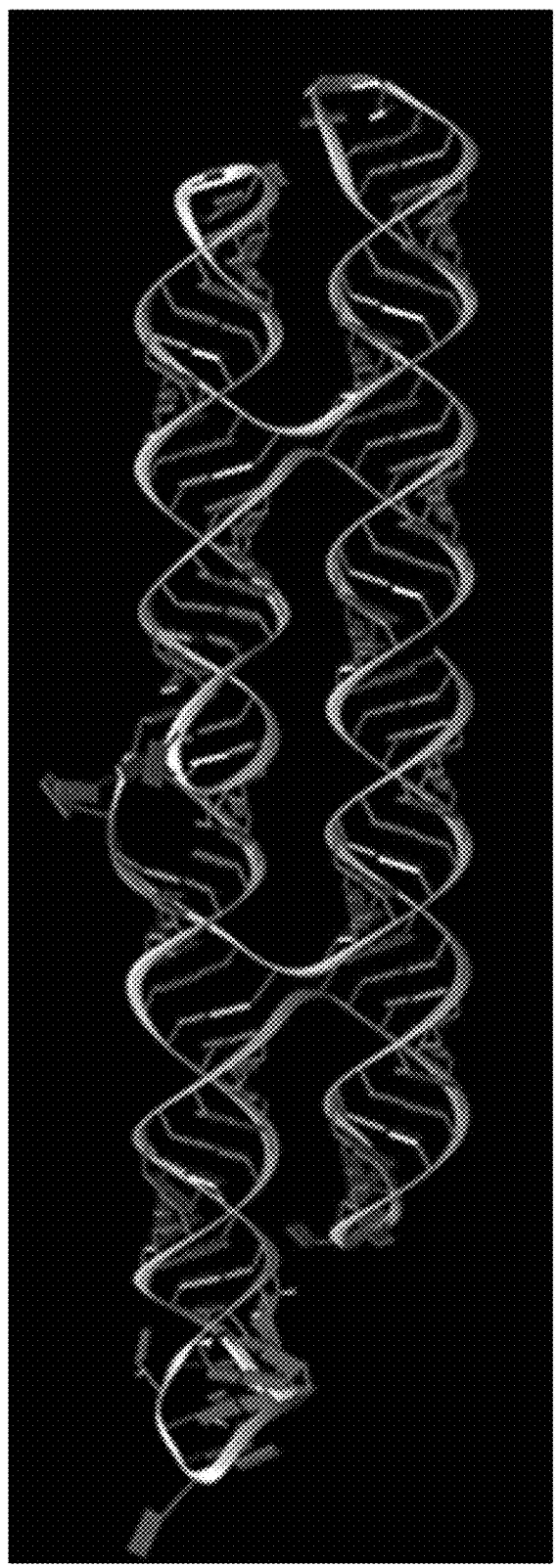
FIG. 9 is a 3D depiction of the ligation structure of a 2-helix RNA origami molecule that includes an RNA aptamer.

Once all motif files have been obtained, they can be assembled and aligned using programs such as Chimera (cgl.ucsf.edu/chimera). For example, the two A-from RNA helices can be aligned as shown in FIG. 8A. Next, the nucleotides where the crossovers will be positioned can be identified, such as with alternative coloration, which facilitates visualization of where the crossovers are to be placed. After RNA helices are aligned, all motifs including tetra-loops, kissing-loops and RNA aptamers can be inserted into the alignment panel (FIG. 8B). The next step involves converting this structure into a single-stranded structure, which can be done using various bioinformatics software (e.g., andersen-lab.dk), as shown in FIG. 9.

Figure 10:
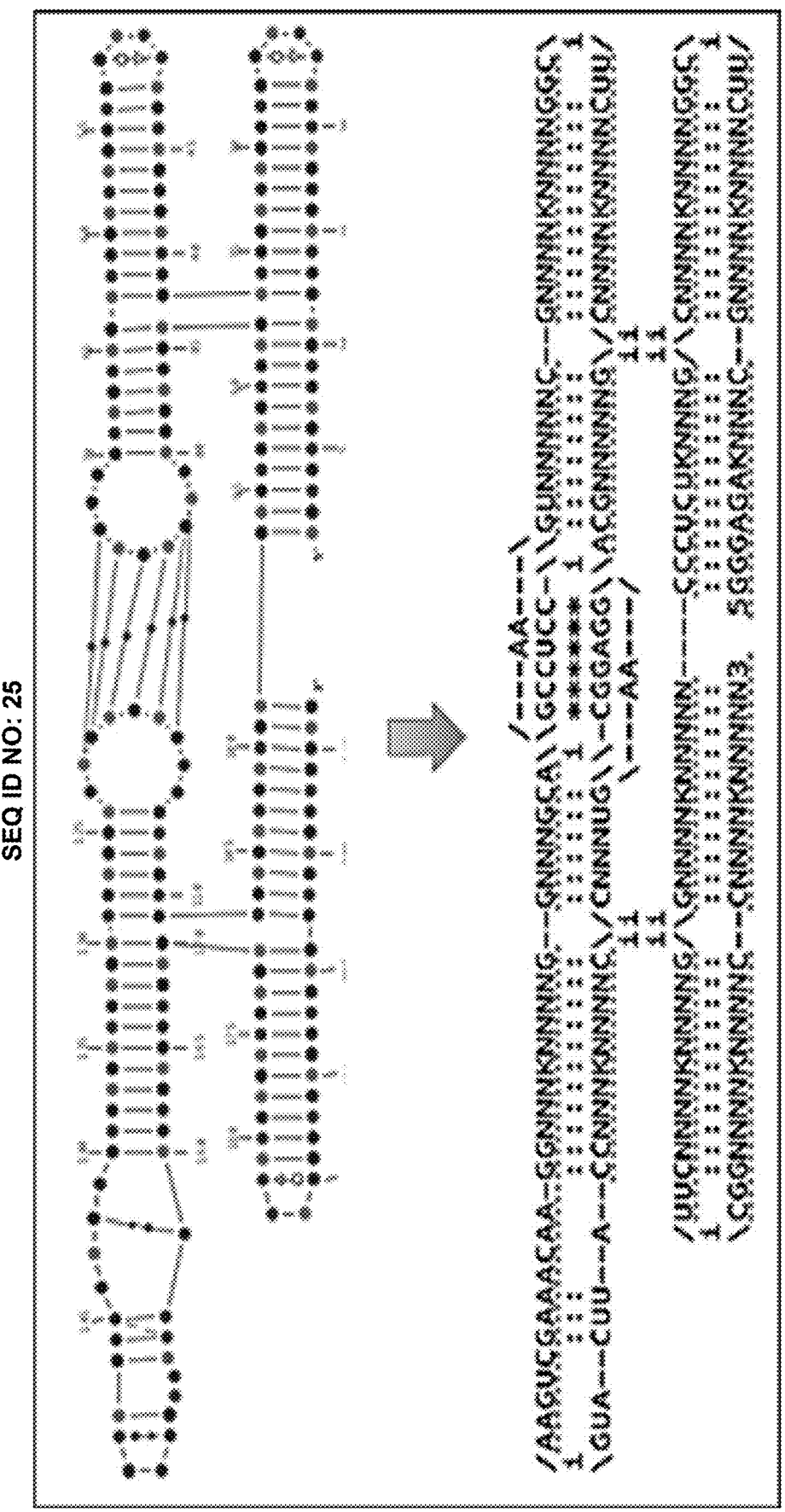
FIG. 10 is a representative diagram of an RNA origami molecule (top) that is transcribed from a 2D model to a text file (bottom).
Figure 11A:
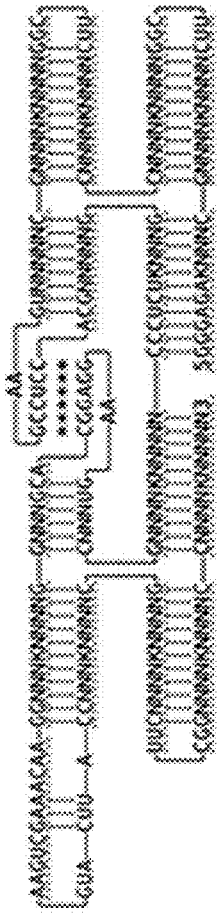
FIGS. 11A-11B include representative depictions of RNA origami sequences.
Figure 11B:
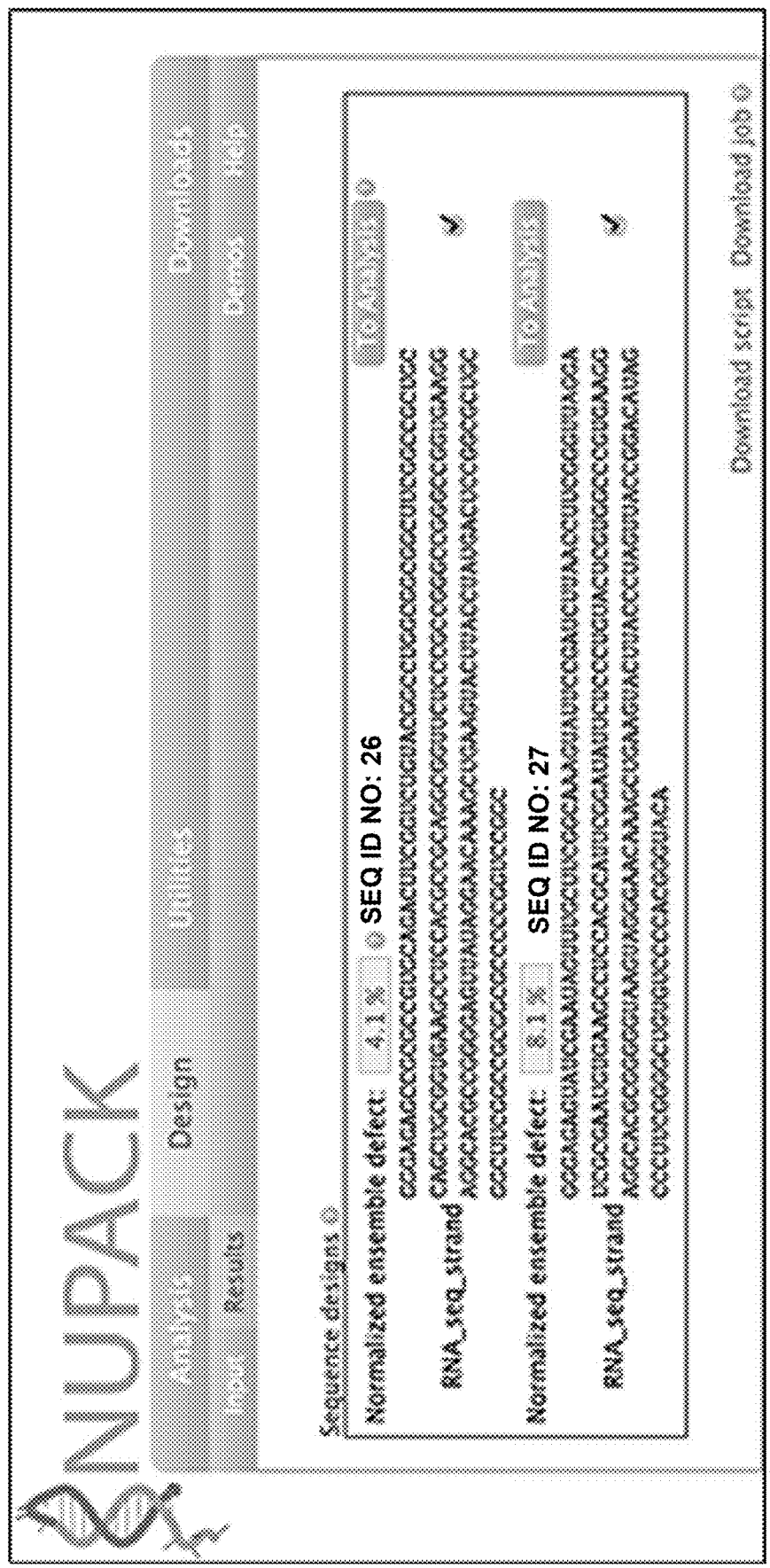

The methods of the present disclosure also include converting the 3D models of the RNA origami molecules into 2D models using the files described above and the appropriate software program (e.g., Assemble2 software), as shown in FIG. 10. The 2D model is then transcribed into a text file, or similar format. To generate the nucleotide sequence of the single-stranded RNA origami molecule, appropriate software is used (e.g., NUPACK.org), and the 2D test file is then run through a trace script (e.g., Andersonlab.dk). The output code form the trace script is shown in FIG. 11A, and the out RNA sequences generated are shown in FIG. 11B.

The methods of the present disclosure also include analyzing RNA sequences generated by the software (e.g., NUPACK). To test for a proper folding of an RNA origami molecule, NUPACK and mfold were used. The sequence can be analyzed to select an optimal sequence that assures proper sequence folding. For example, a sequence with proper folding is generally one with a low ΔG, a GC % of less than 65%, and a low normalized ensemble defect (NED). The fewer secondary structures a sequence has, the more likely it is to fold properly. To optimize a sequence, manual edits of the sequences can be performed, including, but not limited to, changing position of G-C base pairing in order to remove undesired structures.

Embodiments of the present disclosure also include designs and methods for including nucleic acid aptamers in a single-stranded nucleic acid origami molecule. The nucleic acid aptamers that can be included in the single-stranded RNA origami molecules of the present disclosure can be made of RNA, DNA, PNA, or any derivatives thereof. For example, as described further herein, an RNA origami molecule can include one or more nucleic acid aptamers, such as RNA aptamers that specifically bind to and modulate a protein involved in blood coagulation. In some embodiments, the RNA aptamers exhibit anti-coagulation activity by inhibiting one or more coagulation proteins, including but not limited to, one or more of thrombin, Factor XIIa, Factor XIIIa, Factor XIa, Factor IXa, Factor Xa, and von Willebrand factor. In some embodiments, the RNA aptamers exhibit anti-thrombin activity that prevents blood coagulation and protects against conditions such as thrombosis. In some embodiments, the anti-thrombin RNA aptamers that are included in the single-stranded RNA origami molecules of the present disclosure are $RNA_{R9D-14T}$ aptamer ((A) below), which binds prothrombin and thrombin at exosite 1, and Toggle-25 aptamer ((B below), which binds exosite 2 of thrombin.

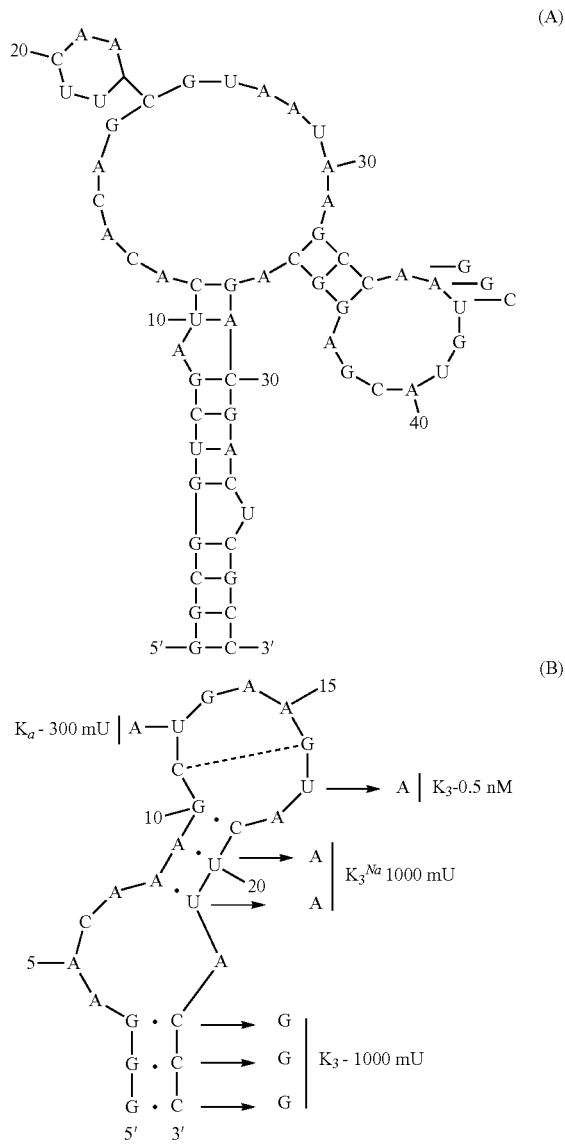

Other nucleic acid aptamers that can be included in the RNA origami molecules disclosed herein include any aptamers involved in modulating blood coagulation, including but not limited to, ARC183/HD1 (targets FIIa); HD22 (targets FIIa); HD1-22 (targets FIIa); Tog25 (targets FII); R9d14t (targets FII/FIIa); 11F7t (targets FXa); 16.3 (targets FVIIa); 7S-1/7S-2 (targets FVII); 9.3t (targets FIXa); R4cXII-1 (targets FXII/FXIIa); NU172 (targets thrombin); REG1 (targets FIX/FIXa); REG2 (targets FIX/FIXa); ARC1779 (targets von Willebrand Factor); and ARC19499 (targets TFPI).

Figure 12A:
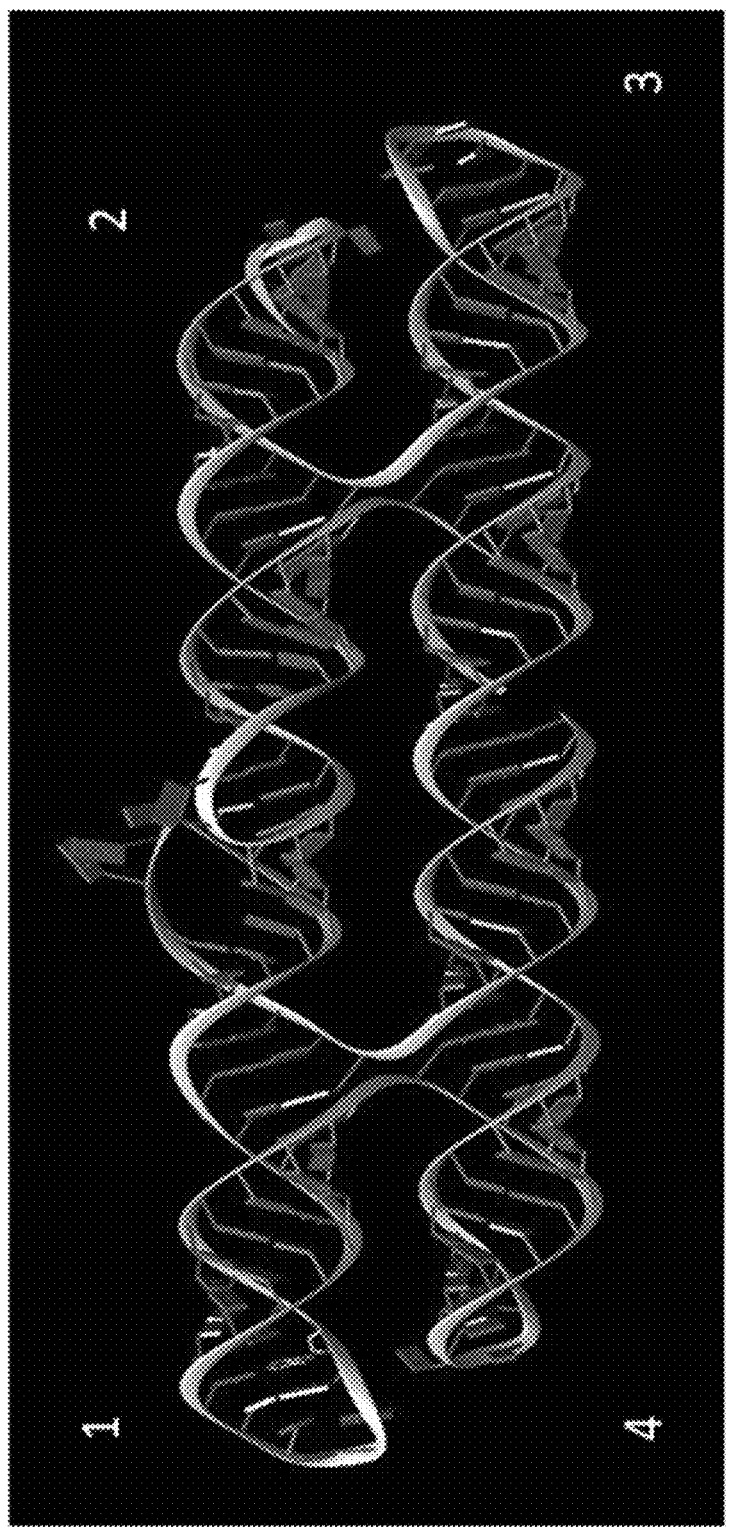
FIGS. 12A-12B include representative depictions of a 3D illustration (FIG. 12A) and 2D ribbon model (FIG. 12B) of 2-helices RNA origami without RNA aptamers (2HO-RNA-NNNN). The numbers represent four possible positions to include an RNA aptamer on an RNA origami molecule. Tetra-loops represented in yellow box and kissing loop indicated in green box.
Figure 12B:
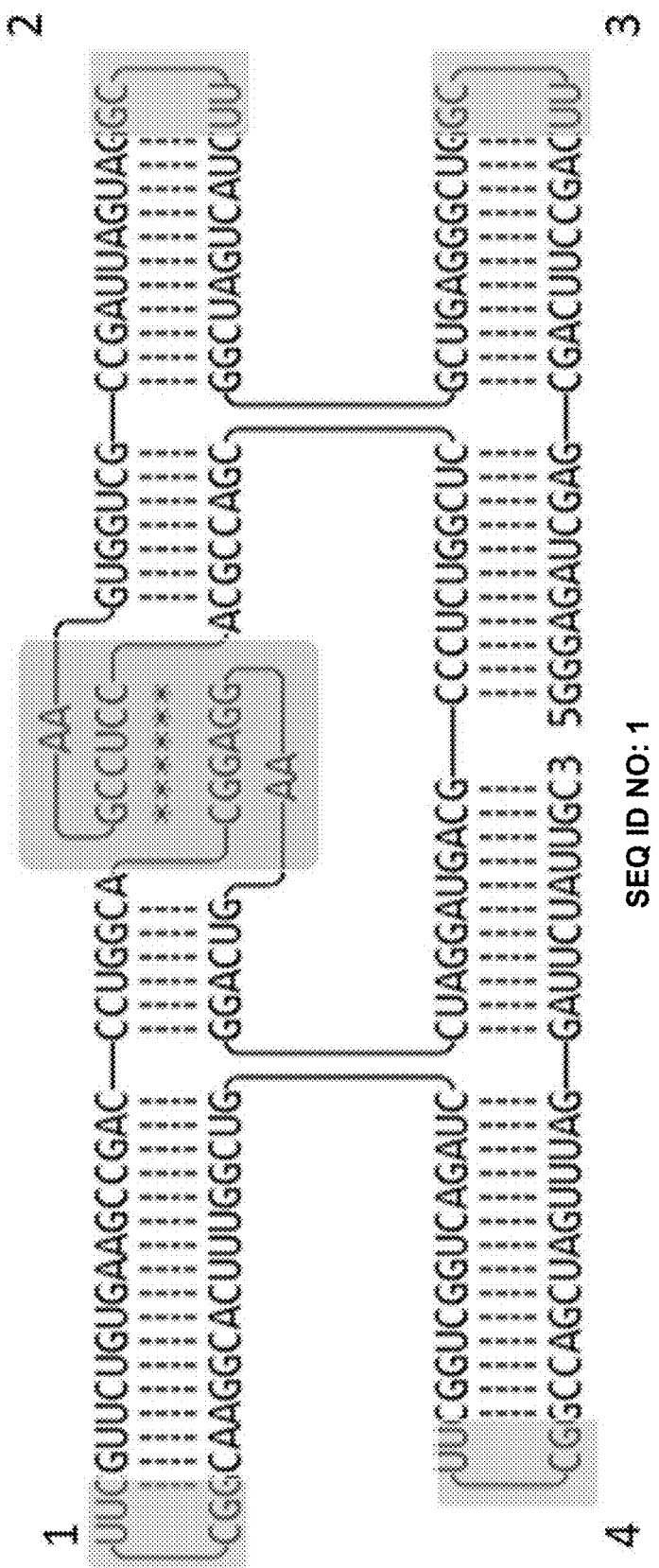
Figures 13A, 13B, 13C, 13D:
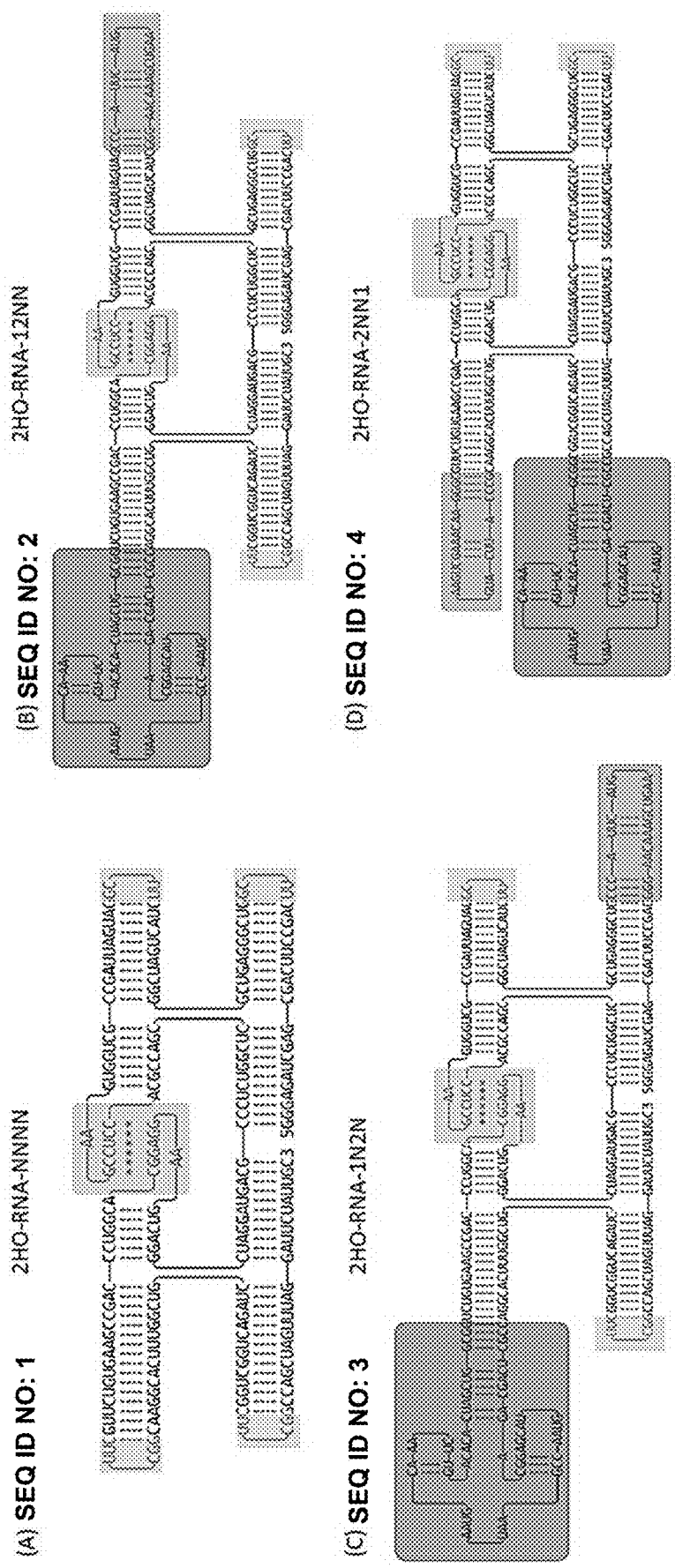
FIGS. 13A-13D include representative 2D models of four designs of RNA origami that include two aptamers.
Figures 14A, 14B, 14C:
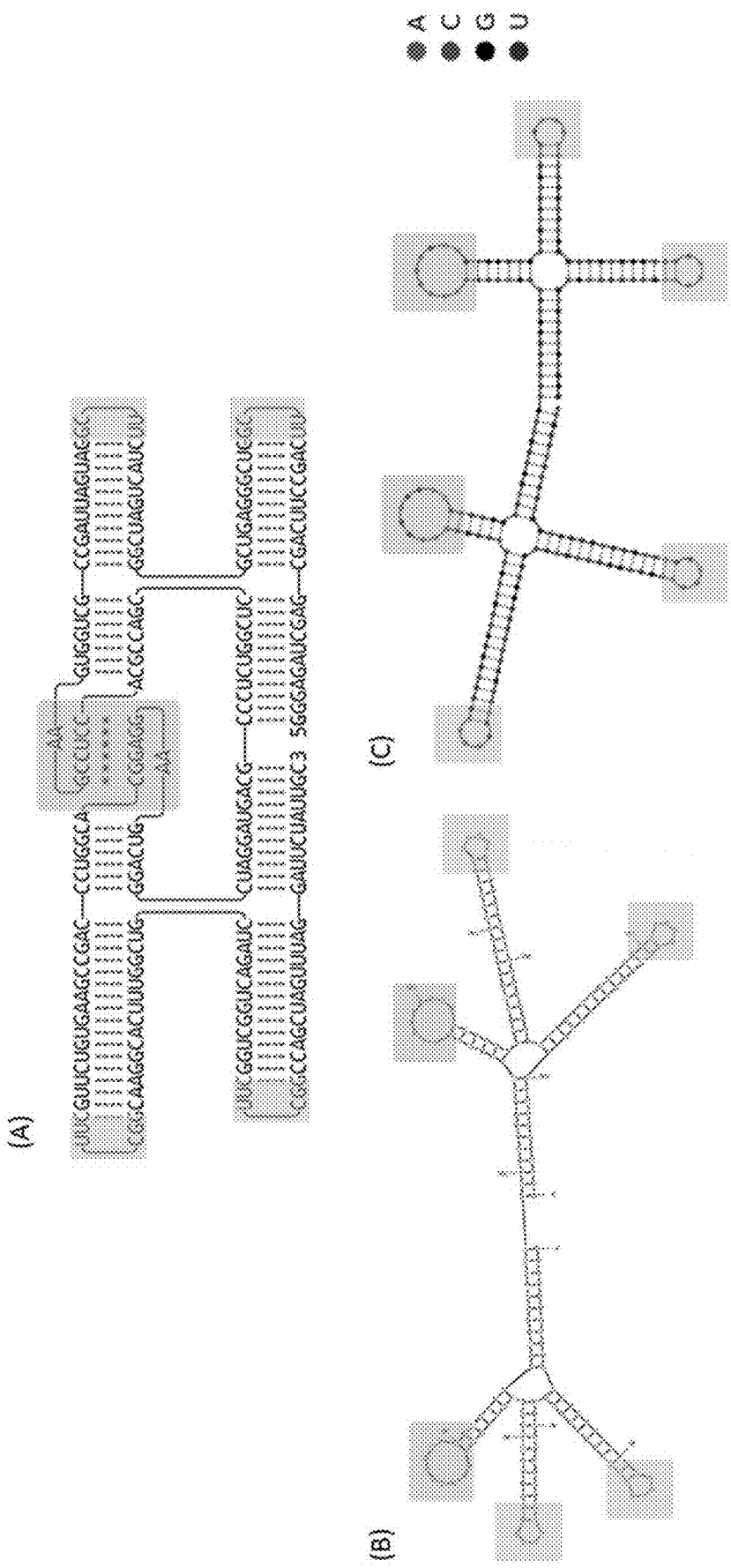
FIGS. 14A-14C include representative 2D models of 2HO-RNA-NNNN (A) and computational simulation of RNA folding analyzed by (B) mfold and (C) NUPACK. Tetra-loops and kissing-loop are indicated in yellow and green boxes, respectively.
Figures 15A, 15B, 15C:
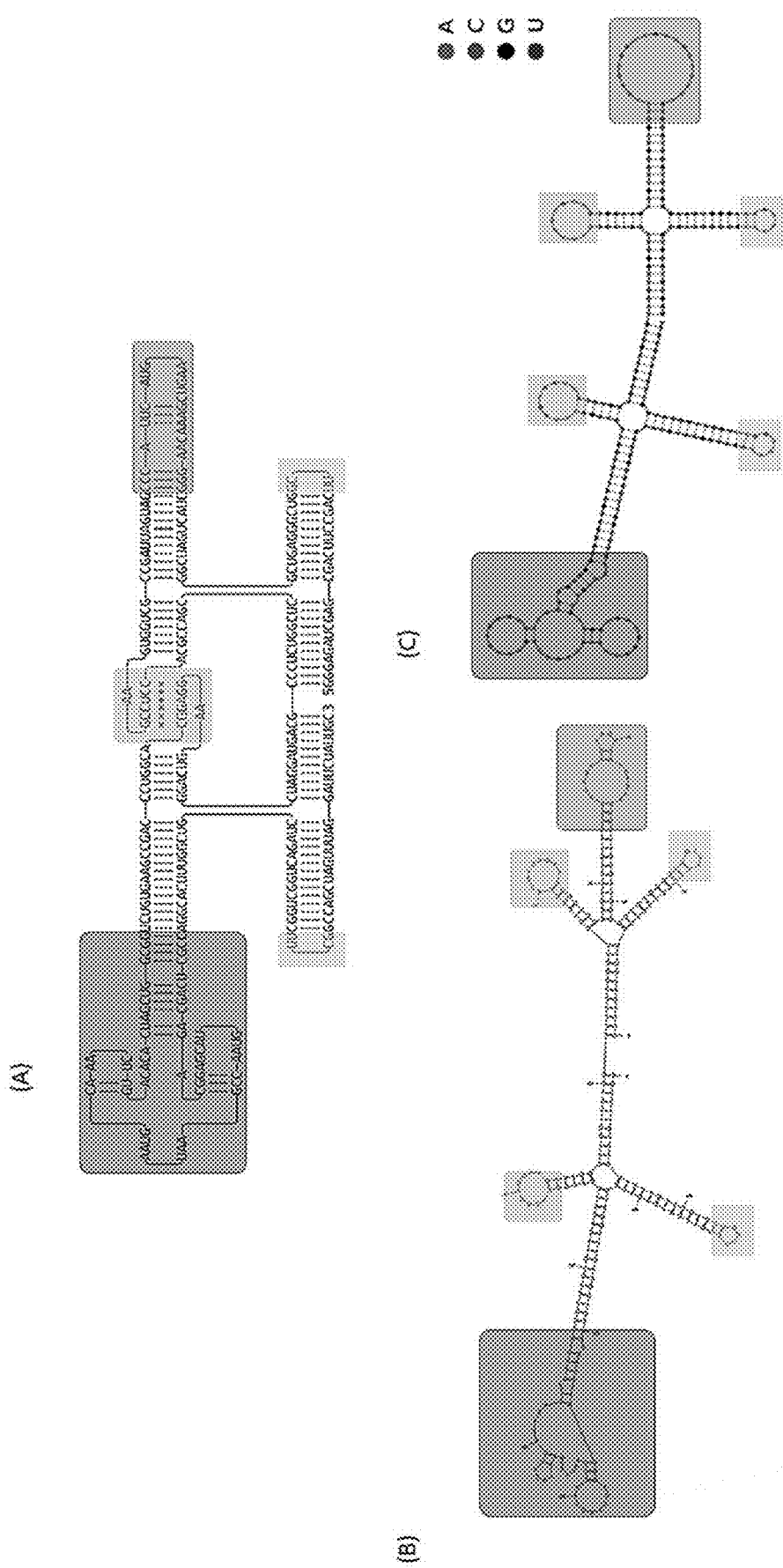
FIGS. 15A-15C include representative 2D models of 2HO-RNA-12NN (A) and computational simulation of RNA folding analyzed by (B) mfold and (C) NUPACK. Tetra-loops and kissing-loop are indicated in yellow and green boxes, respectively. Exosite 1 and 2-binding RNA aptamers are represented in purple and blue rectangles, respectively FIGS. 16A-16C include representative 2D models of 2HO-RNA-1N2N (A) and computational simulation of RNA folding analyzed by (B) mfold and (C) NUPACK. Tetra-loops and kissing-loop are indicated in yellow and green boxes, respectively. Exosite 1 and 2-binding RNA aptamers are represented in purple and blue rectangles, respectively.
Figures 16A, 16B, 16C:
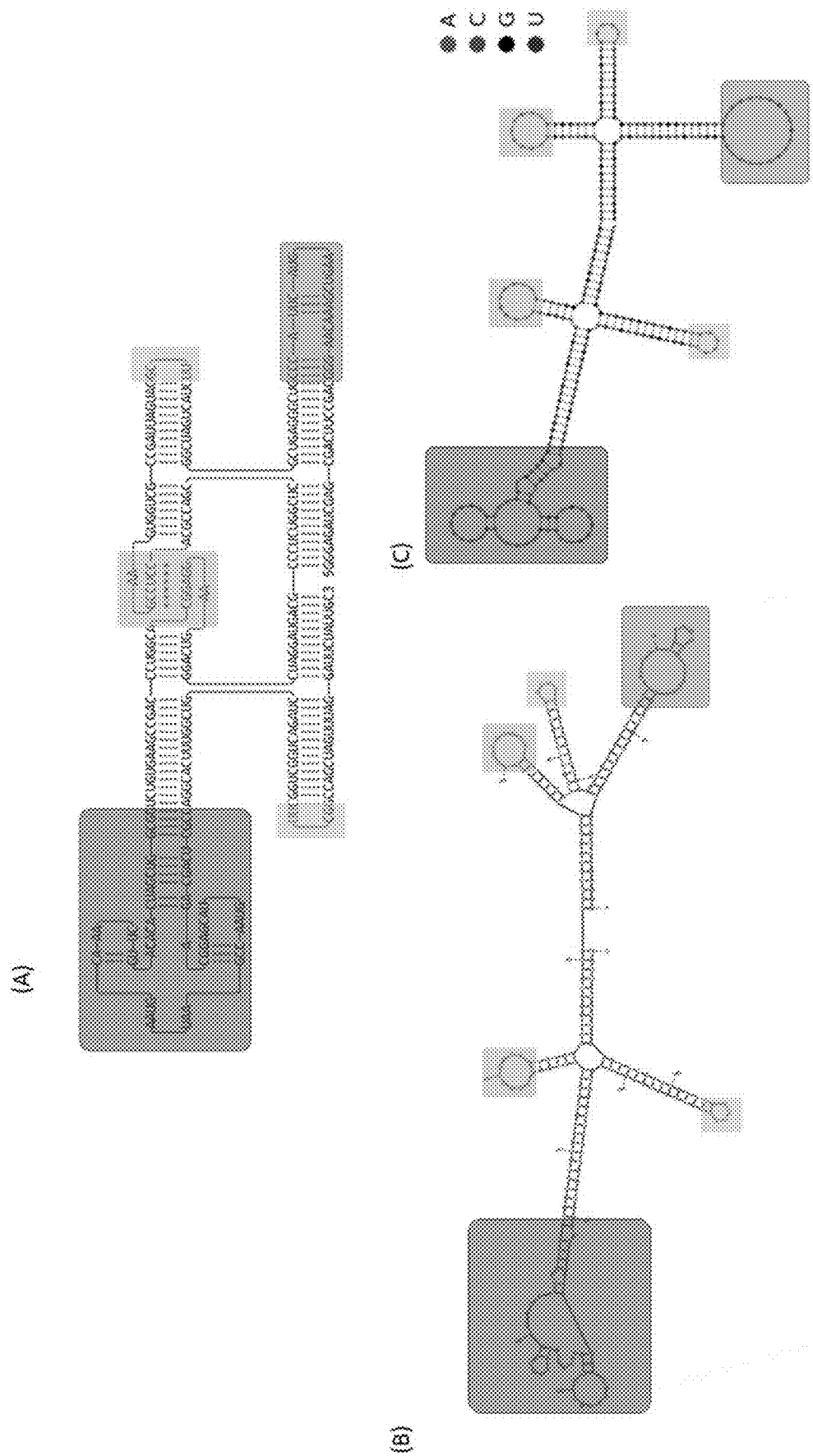
Figures 17A, 17B, 17C:
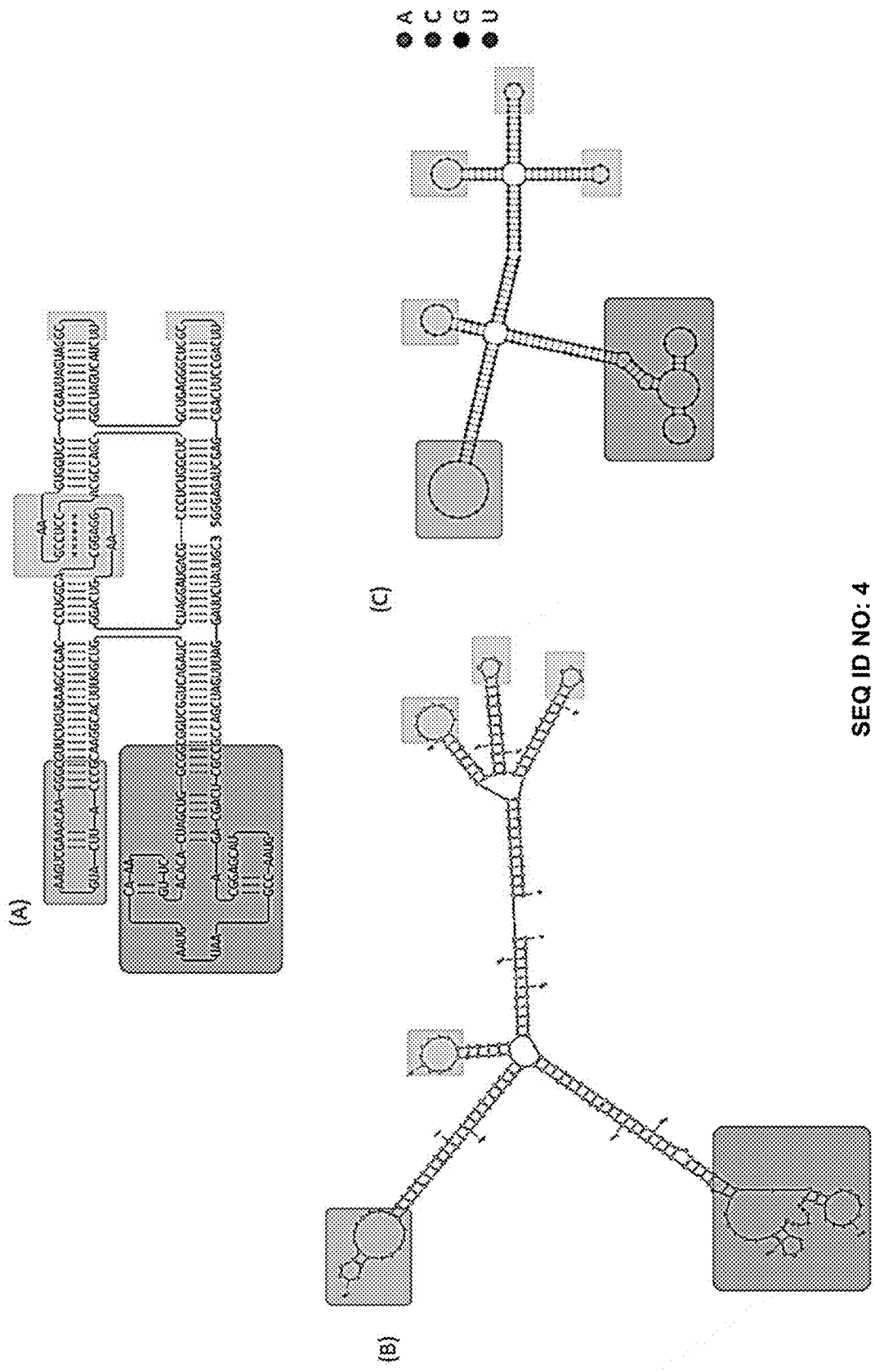
FIGS. 17A-17C include representative 2D models of 2HO-RNA-2NN1 (A) and computational simulation of RNA folding analyzed by (B) mfold and (C) NUPACK. Tetra-loops and kissing-loop are indicated in yellow and green boxes, respectively. Exosite 1 and 2-binding RNA aptamers are represented in purple and blue rectangles, respectively.

To improve and optimize the anticoagulation activity, between one and four aptamers were included in the RNA origami molecules in four different positions. For example, a two-helical RNA origami (2HO-RNA-XXXX) offers four possible positions for an RNA aptamer, one aptamer at each tetra-loop, as shown in FIGS. 12A-12B.

In some embodiments, it was determined that the binding activity of dual RNA aptamers included in an RNA origami molecule depends at least partially on the distance between two aptamers and the flexibility of each aptamer at the different positions on an RNA origami. In accordance with these embodiments, four configurations of RNA aptamers were designed by including them in the RNA origami as shown in FIGS. 13A-13D. For the purpose of nomenclature, four digits were added after the particular RNA origami used, for example, 2HO-RNA-XXXX (no aptamers; SEQ ID NO: 1). Depending on the aptamer and placement position, X can be replaced by a number or letter corresponding to a particular aptamer. For example, the exosite 1 and exosite 2 binding RNA aptamers are called "1" and "2," respectively. (No aptamer is defined as "N.") Therefore, 2HO-RNA-1N2N refers to exosite 1-binding aptamer placed at position 1 and exosite 2-binding aptamer 2 tethered at position 3 on 2-helical RNA origami. All four designs are depicted in FIGS. 13A-13D. The 2HO-RNA-NNNN molecule was used as a negative control in subsequent experiments.

The folding of these RNA origami structures were computationally analyzed using online software (mfold; see, unafold.rna.albany.edu) and NUPACK (see, nupack.org), as shown in FIGS. 14-17. The kissing loop formation is not shown in the simulations.

In accordance with these embodiments, single-stranded RNA origami structures without aptamers are about 200 nucleotides in length, and about 500 nucleotides in length when two aptamers are included in the RNA origami. As would be recognized by one of ordinary skill in the art based on the present disclosure, the single-stranded RNA molecules, with or without aptamers, can be synthesized chemically, enzymatically, or using cell-based technologies. For example, T7 RNA polymerase can be used for RNA production via in vitro and in vivo transcription. In some embodiments, double-stranded DNA can be used as a template. For example, the DNA template can be engineered to contain the Blueprint for RNA origami and the T7 promoter located at the 5' end of the sequence.

In some embodiments, both modified and non-modified RNA origami structures can be generated. For example, the single-stranded RNA origami molecules of the present disclosure can include at least one nucleoside with a 2'-modification. In some embodiments, single-stranded RNA origami molecules of the present disclosure can include at least one 2'-fluoro-dCTP or a 2'-fluoro-dUTP or one other nucleoside with a 2'-modification such as 2'-amino or 2'-O-methyl or a chemical modification of the backbone phosphate groups such as a phosphorothioate.

The above-described designs and methods are applicable to the construction of all the nucleic acid molecules described herein, including those embodied in the examples and figures. As one of ordinary skill in the art would recognize based on the present disclosure, the above-described designs and methods can also be used to generate variations of the nucleic acid molecules described herein, for example, with respect to a desired functionality (e.g., antithrombin activity).

3. EXAMPLES

It will be readily apparent to those skilled in the art that other suitable modifications and adaptations of the methods of the present disclosure described herein are readily applicable and appreciable, and may be made using suitable equivalents without departing from the scope of the present disclosure or the aspects and embodiments disclosed herein. Having now described the present disclosure in detail, the same will be more clearly understood by reference to the following examples, which are merely intended only to illustrate some aspects and embodiments of the disclosure, and should not be viewed as limiting to the scope of the disclosure. The disclosures of all journal references, U.S. patents, and publications referred to herein are hereby incorporated by reference in their entireties.

The present disclosure has multiple aspects, illustrated by the following non-limiting examples.

Example 1

Figure 18:
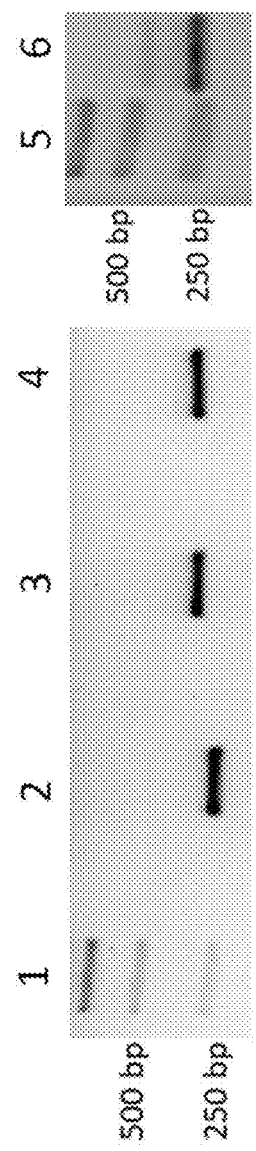
FIG. 18 includes a representative image characterizing DNA template amplification using 1% agarose gel run at 150V for 30 minutes. 1 kb ladder (lane 1 and 5), 2H-DNA-NNNN (lane 2), 2H-DNA-12NN (lane 3), 2H-DNA-1N2N (lane 4), and 2H-DNA-2NN1 (lane 6).
Figure 39:
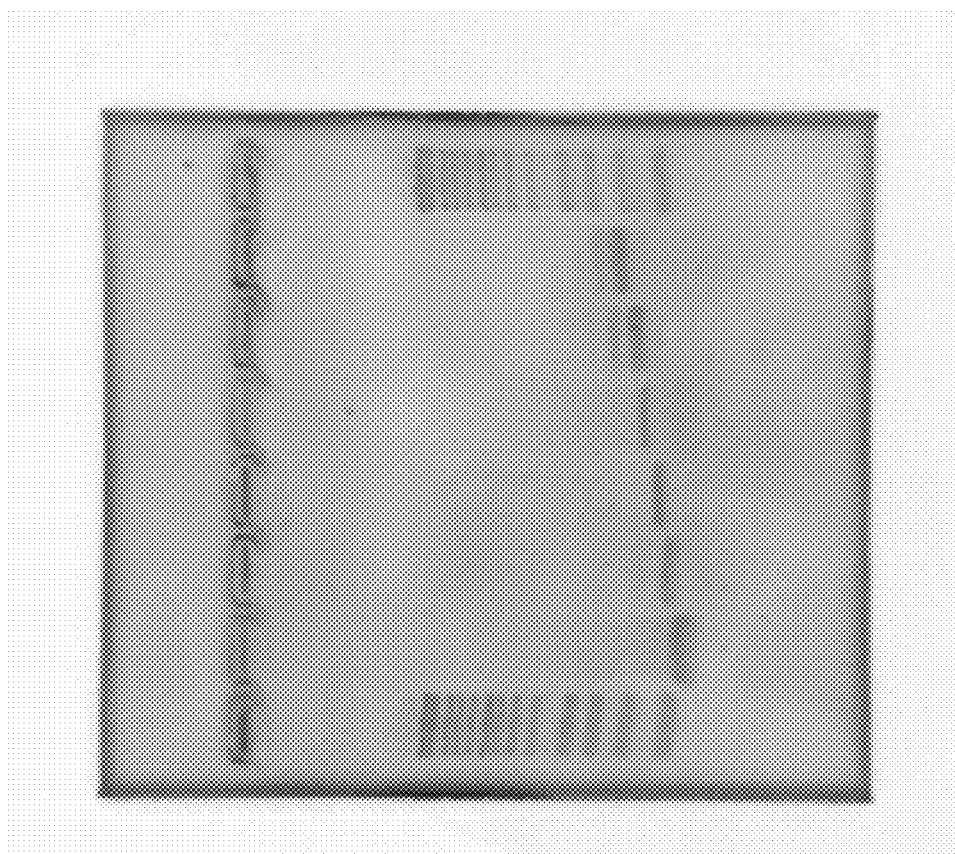
FIG. 39 includes a representative image characterizing DNA template amplification. Lane 1 and 8: DNA marker, Lane 2: Fss12, Lane 3: 2H-DNA-NNNN. Lane 4: 2H-DNA-2NN1, Lane 5: 2H-DNA-2211, Lane 6: 3H-DNA-2NN1 and Lane 7: 4H-DNA-2NN1.
Figure 40:
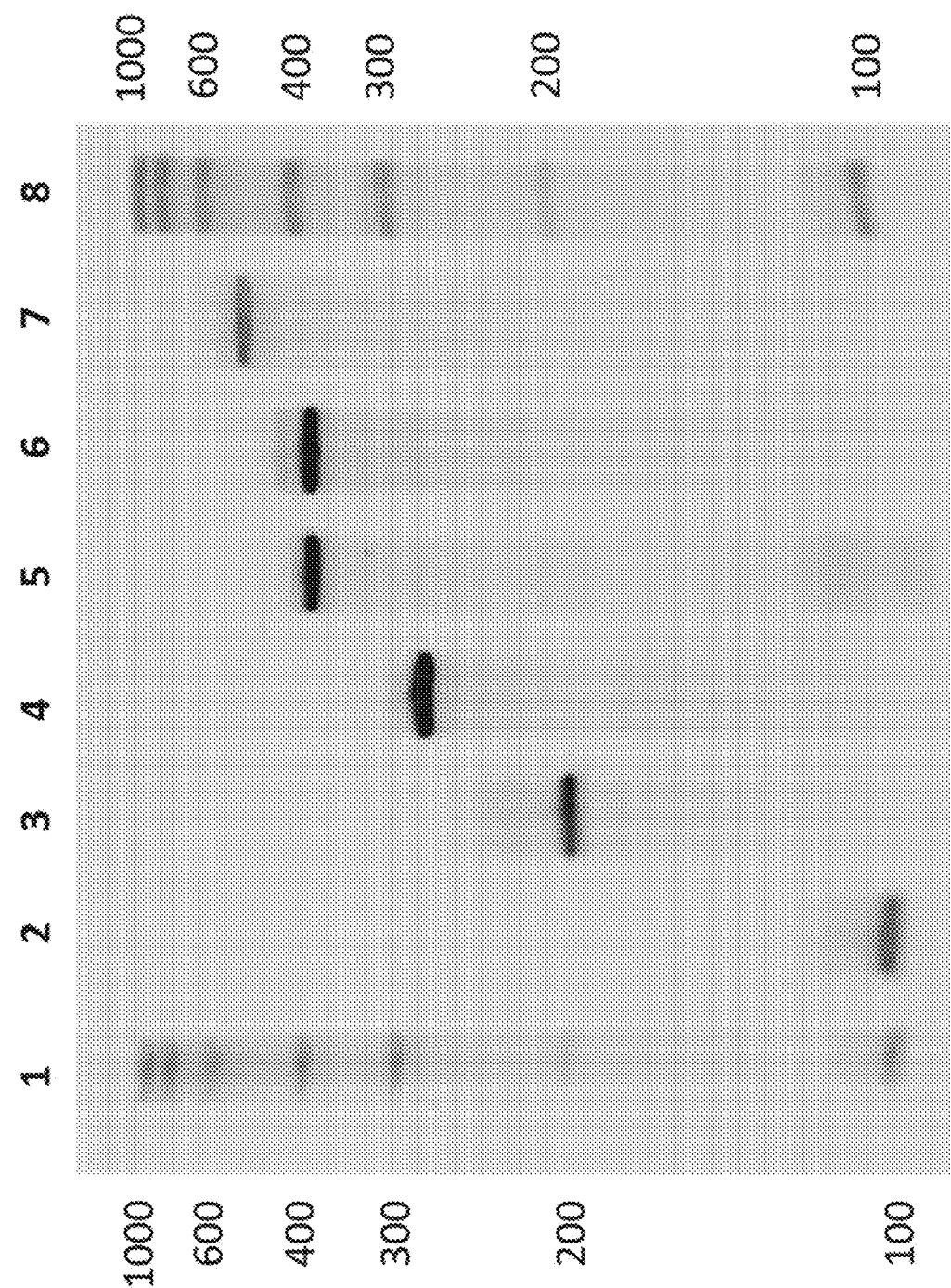
FIG. 40 includes a representative image characterizing RNA origami by denaturing acrylamide gel electrophoresis. Lane 1 and 8: ssRNA marker, Lane 2: 31nt-linked aptamer (Fss12), Lane 3: 2HF-RNA-NNNN, Lane 4: 2HF-RNA-2NN1, Lane 5: 2HF-RNA-2211, Lane 6: 3HF-RNA-2NN1, Lane 7: 4HF-RNA-2NN1.

Amplification of DNA templated from G-Block by Polymerase Chain Reaction (PCR). DNA sequences were amplified and used for transcription. Each sequence was a double-stranded DNA, and each had differing aptamer placements, as shown in FIGS. 12-17, and FIGS. 35-39. Sequences without aptamers were used as negative controls. DNA template was amplified from G-block by PCR for in vitro production. All DNA sequences were successfully amplified with good yields for transcription. FIG. 18 and FIG. 39 shows 1% agarose gels with clear bands of the correct size for all amplified DNA sequences. Each amplification typically produced around 30-60 ng/ul of DNA after purification was performed.

Figure 19:
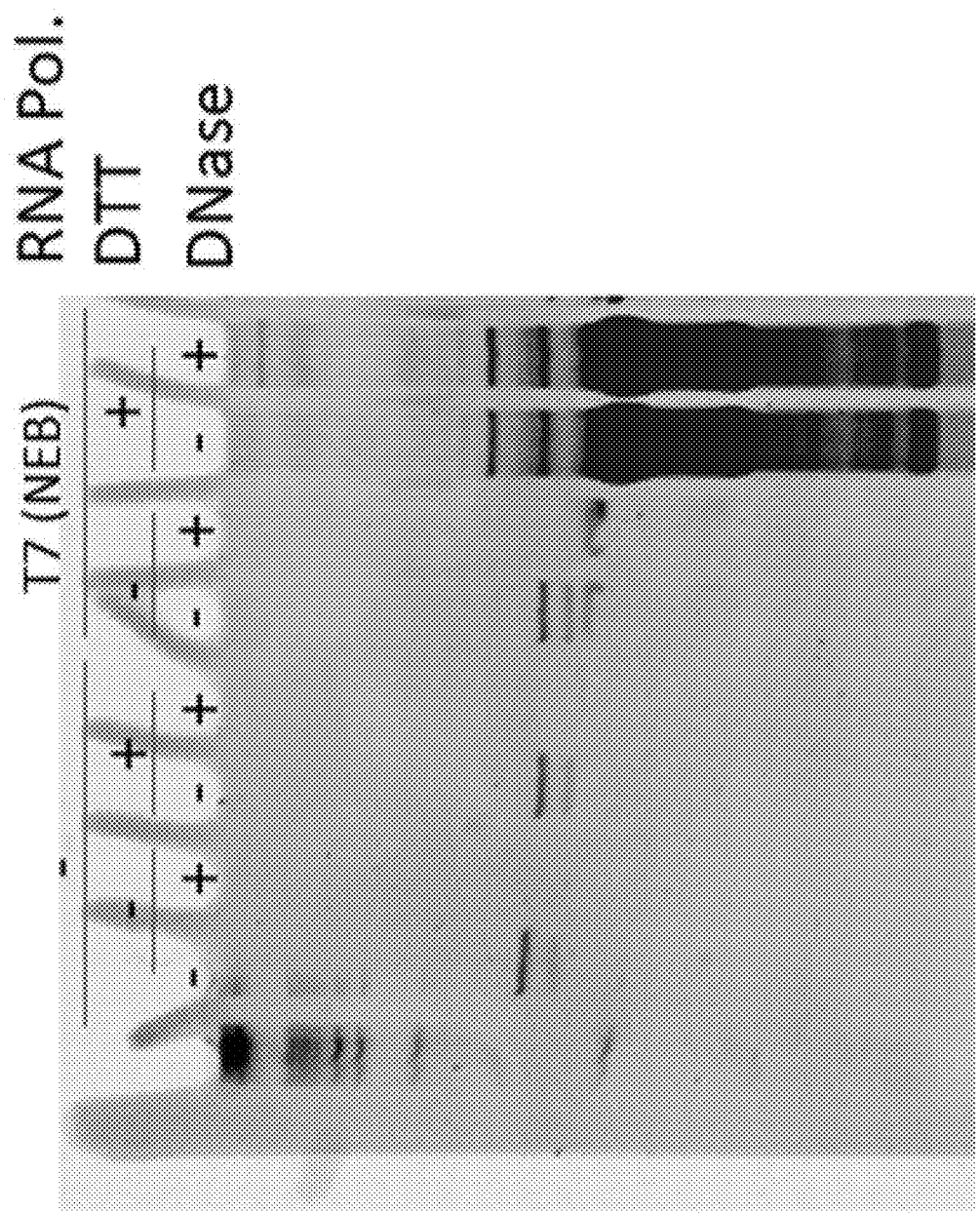
FIG. 19 includes a representative image of differences between transcription with and without fresh DTT. The native T7 RNA polymerase from New England Biolab was used for transcription of non-modified RNA structures.

Production of RNA Origami from Amplified DNA. RNA origami was then produced by transcription. Two types of RNA origamis were produced: (i) non-modified RNA origami and (ii) modified RNA origami. To produce modified RNA origami, 2'-fluoro-dCTP and -dUTP were substituted regular CTP and UTP and mutant T7 RNA polymerase (Y639F) was used instead of native T7 polymerase. The differences in RNA transcribed with and without DTT can be seen in FIG. 19. Thereafter, DTT was added to each transcription reaction.

Figure 20:
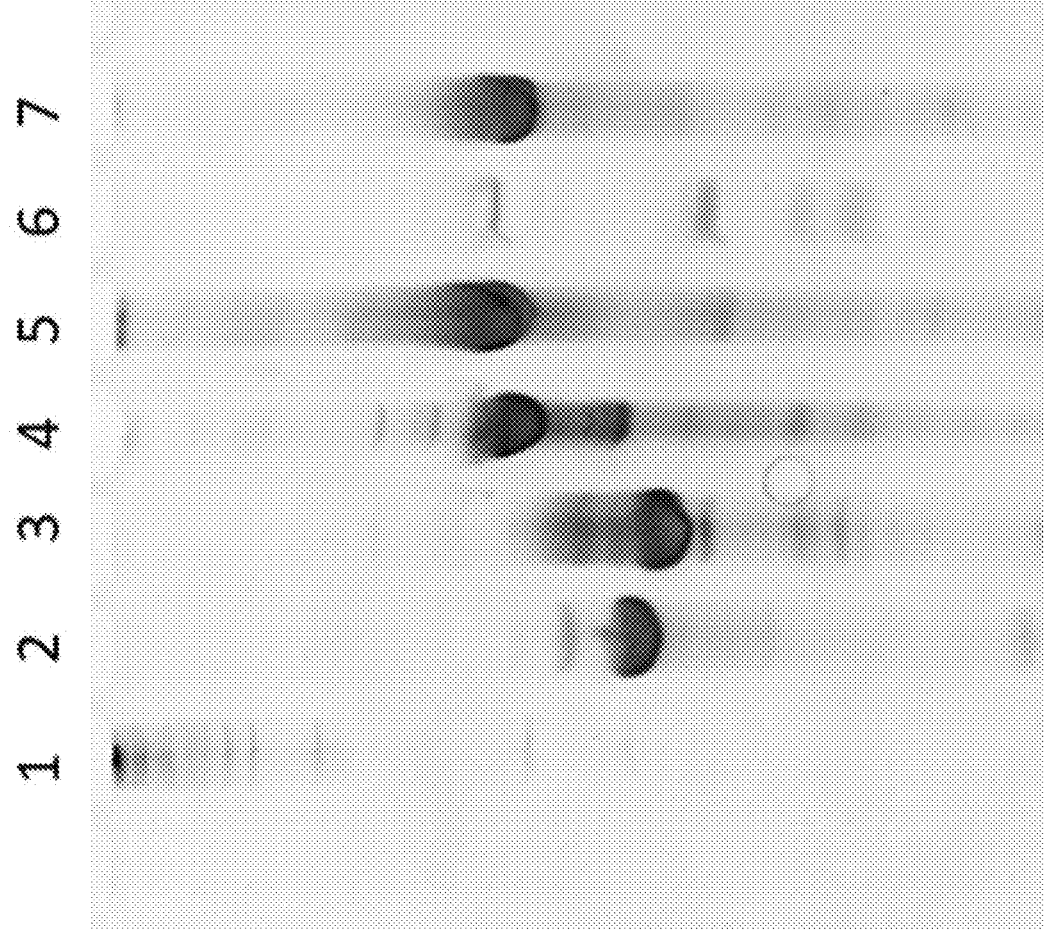
FIG. 20 includes a representative image of RNA origami run on 6% denaturing acrylamide gel run at 20 W for 1 hour. 1 kb ladder (lane 1), 2HO-RNA-NNNN (lane 2), 2HF-RNA-NNNN (lane 3), 2HO-RNA-2NN1 (lane 4), 2HF-RNA-2NN1 (lane 5), 2HO-RNA-1N2N (lane 6), and 2HF-RNA-1N2N (lane 7).
Figure 21:
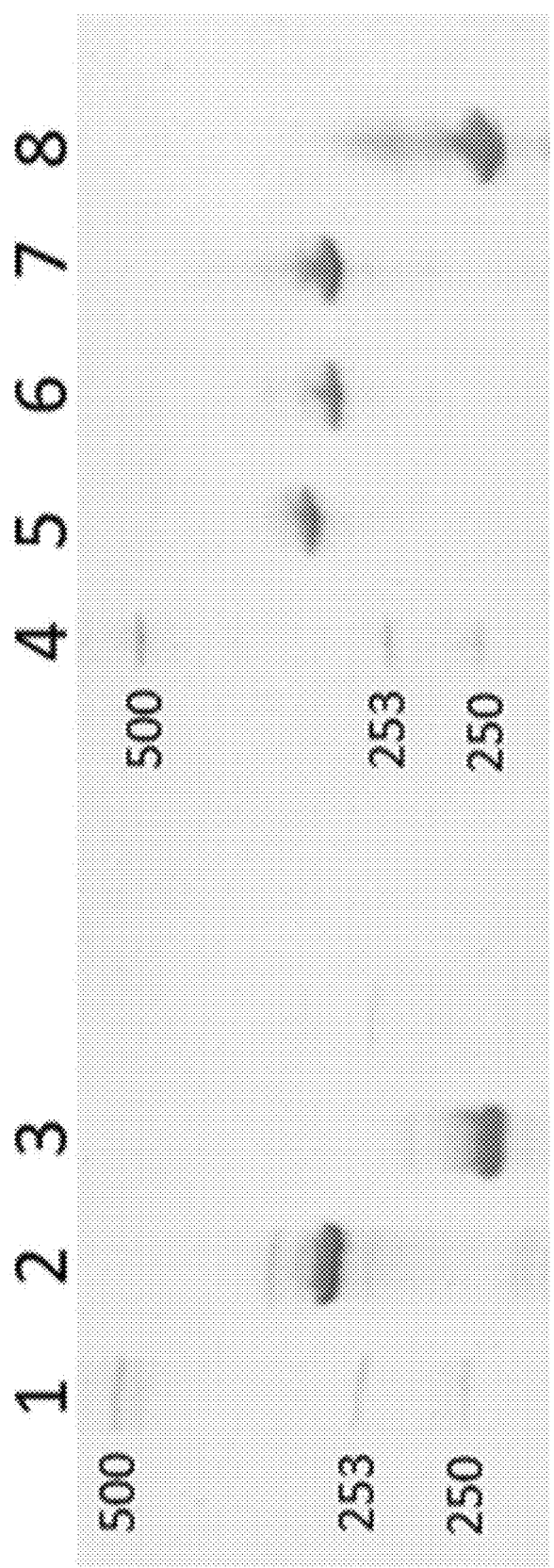
FIG. 21 includes a representative image of RNA origami run on 6% denaturing acrylamide gel run at 20 W for 1 hour. 1 kb ladder (lane 1), 2HO-RNA-1N2N, 279 nt (lane 2), 2HO-RNA-NNNN, 210 nt (lane 3), 1 kb ladder (lane 4), 2HF-RNA-2NN1, 285 nt (lane 5), 2HF-RNA-1N2N, 279 nt (lane 6), 2HF-RNA-12NN, 279 nt (lane 7), and 2HF-RNA-NNNN, 210 nt (lane 8).
Figure 22:
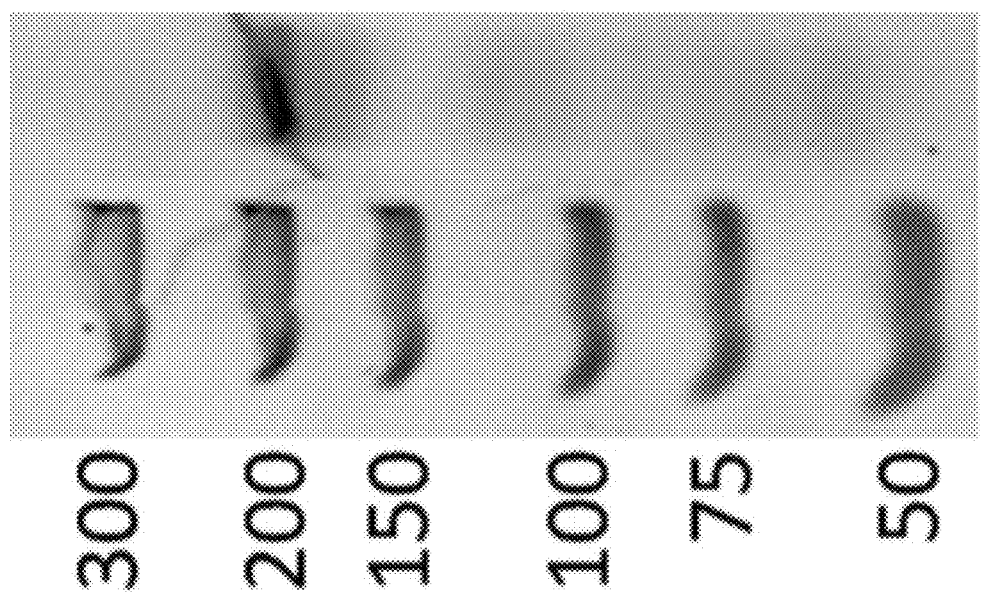
FIG. 22 includes a representative image of RNA origami run on 6% native acrylamide gel run at 150V for 3 hours. DNA marker, GeneRuler Ultra Low Range DNA Ladder (left lane) and 2HO-RNA-2NN1 (right lane).

Analysis of RNA origami structures based on sizes. Non-modified RNA and modified RNA were produced. All DNA sequences were transcribed into modified and non-modified RNA with the exception of 2H-12NN. The RNA was labeled "2HO-RNA-XXXX" for the non-modified two helix RNA with various aptamer placements and "2HF-RNA-XXXX" for the two-helix modified RNA with various aptamer placements. RNA aptamers which bind to exosite 1 and 2 are labeled as "1" and "2", respectively. FIG. 20 shows the modified and non-modified RNA bands for NNNN, 2NN1, and 1N2N sequences run through a 6% denaturing acrylamide gel at 20 W for 1 hour. FIG. 21 shows non-modified transcription for NNNN and 1N2N and modified transcription for all four sequences. A smaller amount of RNA was added into the gel for FIG. 21 compared to FIG. 20 in order to achieve a sharper, single band. Following heat anneal, a native gel was run to characterize the folded structures. FIG. 22 shows an example of a 6% native acrylamide gel run at 150V for 3 hours with a 2HO-RNA-2NN1 heat annealed sample and a 1 kb DNA ladder.

Experiments were also conducted to characterize the nucleic acid constructs embodied in FIGS. 35-38. FIGS. 35A-35C include representative 2D models of two aptamers included in a single-stranded RNA linker of 31 nucleotides (Fss12; FIG. 35A). FIGS. 36A-36C include representative 2D models of RNA origami including four aptamers (2H-RNA-2211; FIG. 36A). FIGS. 37A-37C include representative 2D models of RNA origami including two aptamers and three A-form double-helical structures (3H-RNA-2NN1; FIG. 37A). And FIGS. 38A-38C include representative 2D models of RNA origami including two aptamers and four A-form double-helical structures (4H-RNA-2NN1; FIG. 38A). Computational analysis of RNA origami folding for the above embodiments were analyzed using mfold RNA and NUPACK software. Purple and blue rectangles represent exosite-1, and exosite-2-binding aptamers, respectively, and yellow and green rectangles indicate tetra loops and kissing loop motifs, respectively.

Taken together, these results provide a wide degree of variation and flexibility for constructing effective nucleic acid-based anticoagulant therapeutics. In particular, these results also demonstrate the ability to produce both modified and non-modified RNA origami structures which bind with exosite 1 and 2 of thrombin. This was done through the amplification of a DNA sequence followed by transcription and heat annealing to produce the RNA origami structure. As shown in FIGS. 12-17, and FIGS. 35-38, eight types of origami structures were produced, each having differing aptamer placements (or no aptamers as a control; see FIGS. 13A-13D), and each was characterized through gel electrophoresis. Fluoro-modified NTPs and mutant T7 polymerase were used to create modified RNA which was stable in plasma. In vitro production allows mass production of structures, creating enough to cause coagulation in blood plasma.

Example 2

Anti-coagulation Activity. Coagulation in human blood is the result of a complex series of reactions between various proteins in the blood called the Blood Coagulation Cascade (BCC). The aptamers used herein bind to one of the proteins in the BCC, thrombin. By binding to thrombin, the aptamers included in the RNA origami inhibit the BCC and delay coagulation. The origami uses two different aptamers to bind to exosites 1 and 2 on the thrombin protein preventing the BCC. The relative inhibition of the BCC can be tested using an aPTT assay on a coagulometer. The coagulometer measures the time it takes for coagulation occur after it is artificially induced using $CaCl_2$. Using this method, the coagulation modulation efficacy of the single-stranded nucleic acid molecules described herein can be determined.

Figure 23:
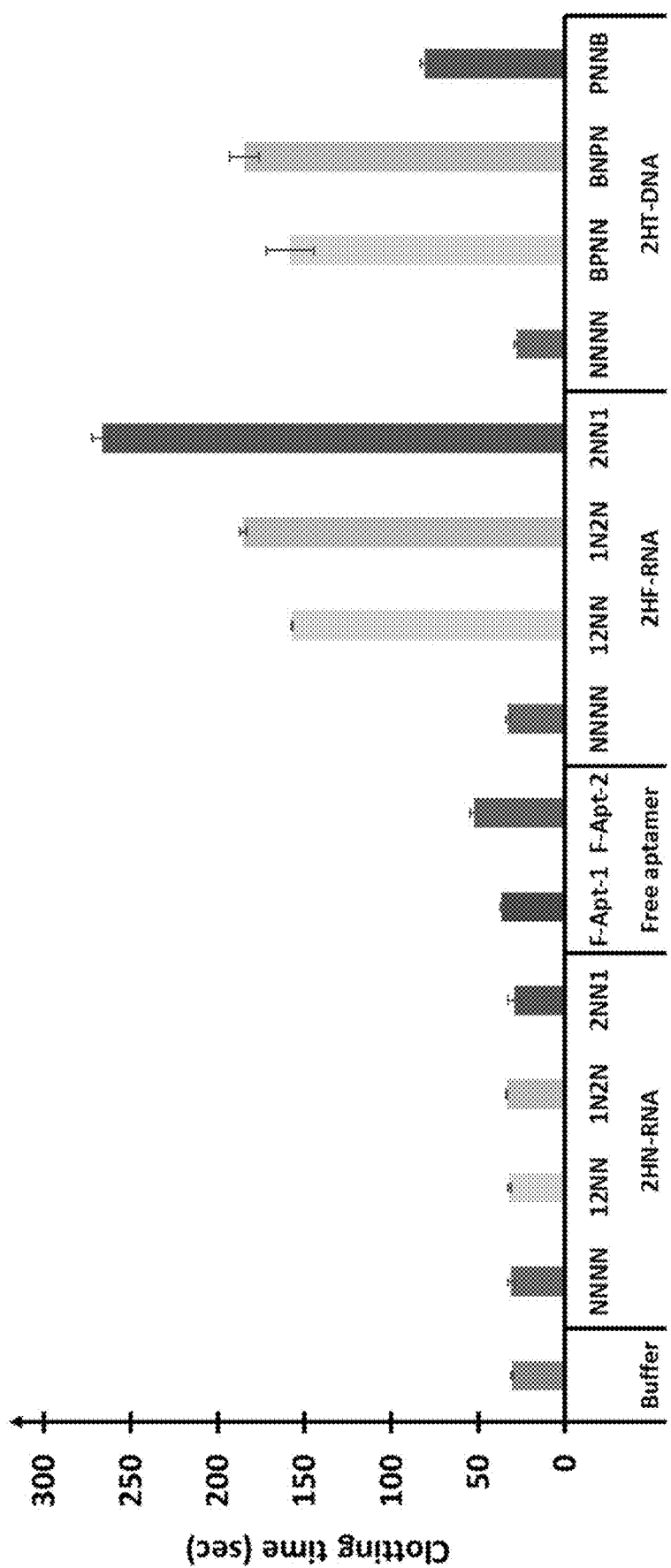
FIG. 23 includes representative results of anti-coagulation tests comparing the average clotting times of 2'-fluoro-modified free aptamers, nonmodified RNA origami (2HO-RNA), 2'-fluoro-modified RNA origami (2HF-RNA), and DNA weave tiles (2HT-DNA) using aPTT assays. Error bar is standard deviation (N=3).

For the anti-coagulation test, four aptamer arrangements for both DNA and RNA were tested in a Model ST4 coagulometer from Diagnostica Stago. The resulting data collected confirmed the anti-coagulation activities of non-modified RNA origami were not found in all aptamer arrangement designs, as the 2HN RNA origamis showed the same coagulation times as standard buffer. These results also confirmed that unmodified RNA origami is unstable in human blood plasma. However, the modified RNA origami showed remarkable activity compared to unmodified RNA tiles with coagulation times between 150 and 260 seconds. Additionally, the DNA aptamers present on DNA tiles tested demonstrated the same trends in anticoagulation activity as previously reported and have similar magnitudes of activity. The activity of all the tiles tested are provided in FIG. 23.

Figure 47:
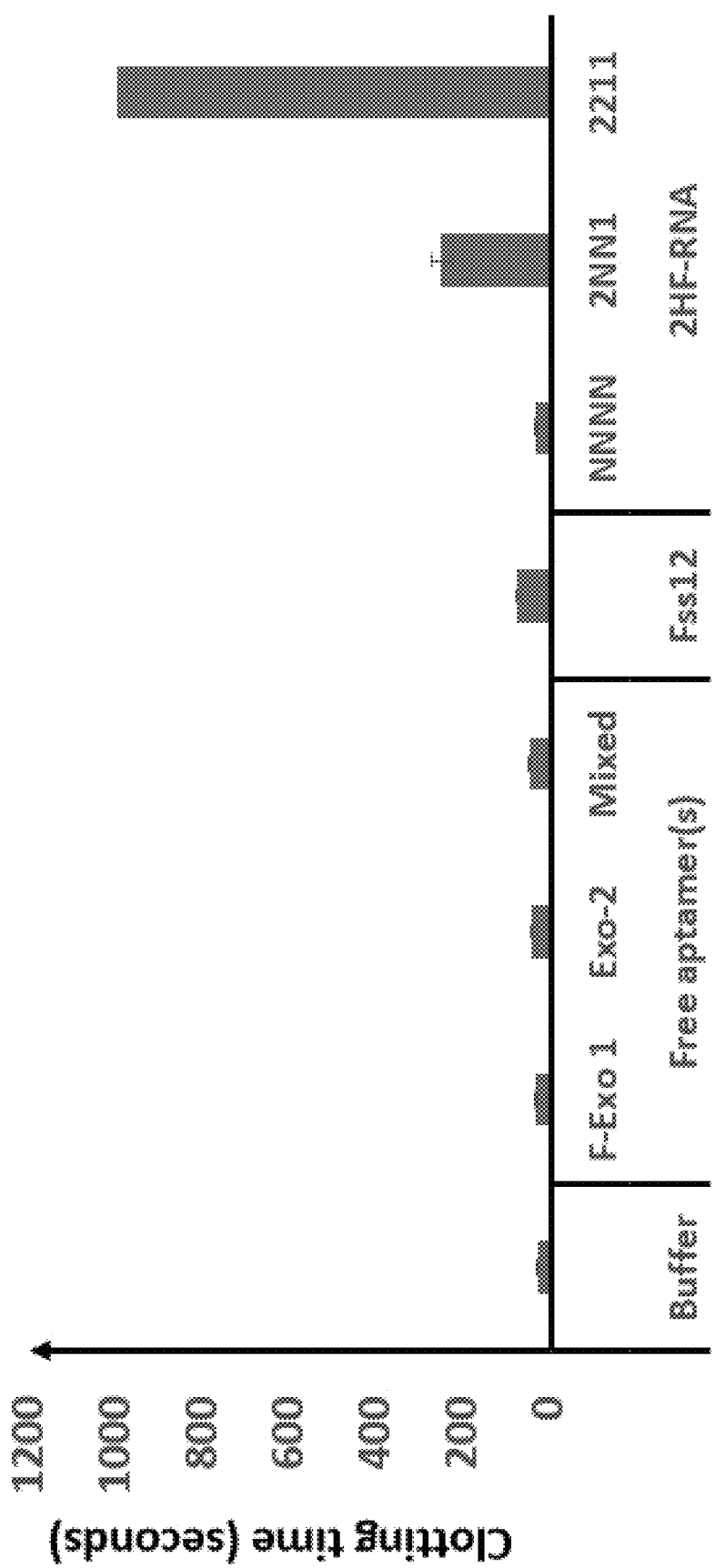
FIG. 47 includes representative results of anticoagulation activities of free aptamers, ssRNA-linked aptamers, and RNA origami including aptamers tested by aPTT assays. All designs of anticoagulants are at final concentration of 500 nM except 2HF-RNA-2211. The final concentration of 2HF-RNA-2211 is 400 nM. The results demonstrate that the anticoagulation activity of 2 aptamers linked with ssRNA (Fss12) is higher than free aptamers and the mixture of free aptamers. Additionally, the anticoagulation activity of two aptamers included on RNA origami (2HF-RNA-2NN1) is greater than ssRNA-linked aptamers (Fss12). Further, RNA origami including four aptamers (2HF-RNA-2211) exhibits the highest anticoagulation activity (more than twice 2HF-RNA-2NN1 activity).
Figure 48:
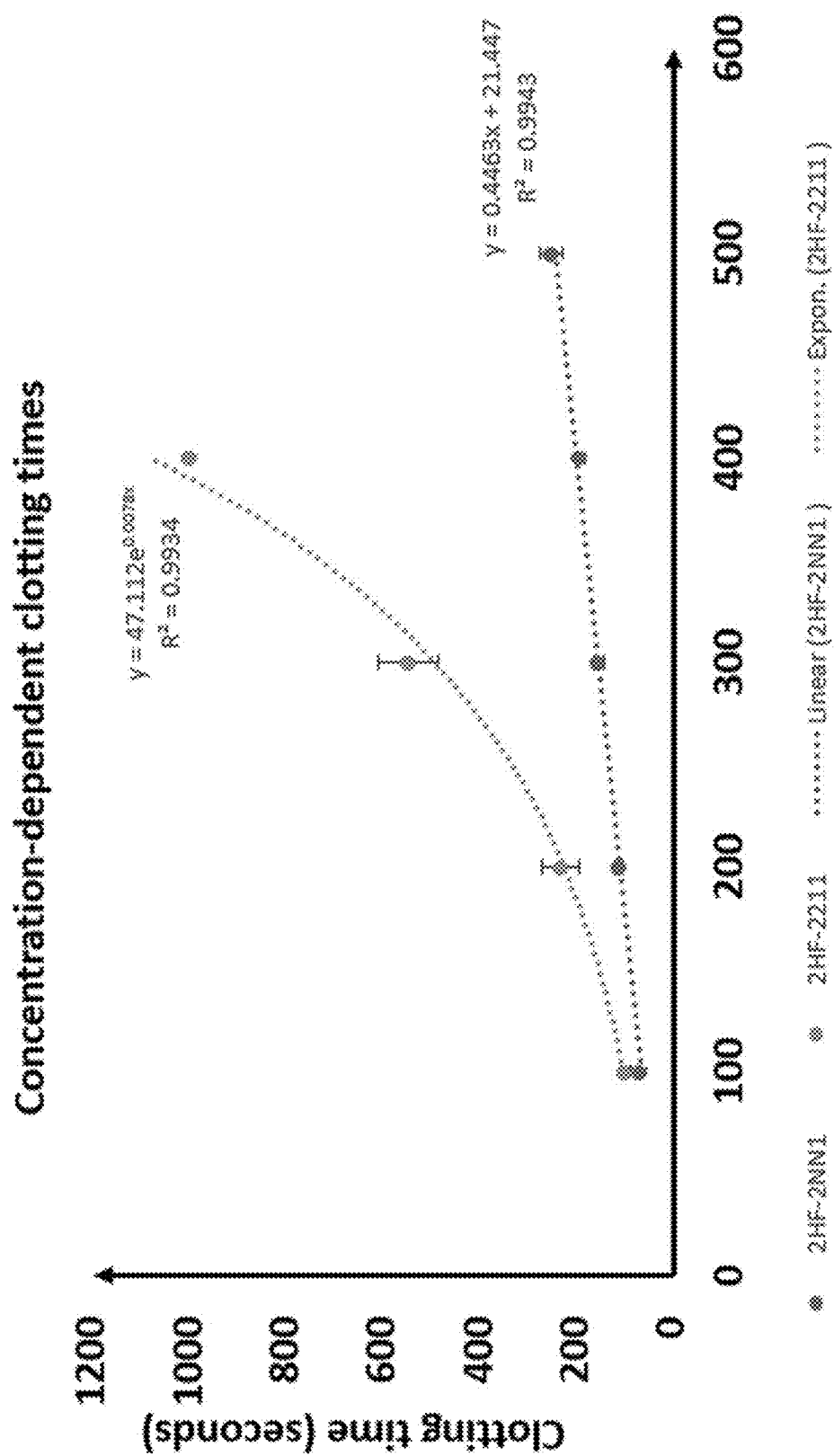
FIG. 48 includes representative results testing concentration-dependent clotting times of RNA origami including two (2HF-RNA-2NN1) and four RNA aptamers (2HF-RNA-2211). For 2HF-RNA-2211 at concentrations of 400 nM, clotting times reached a maximum limit (999 seconds measured using a coagulometer). Surprisingly, the anticoagulation activity of 2HF-RNA-2211 (4 aptamers) is more than double of the anticoagulation activities of 2HF-RNA-2NN1 (2 aptamers).
Figure 49:
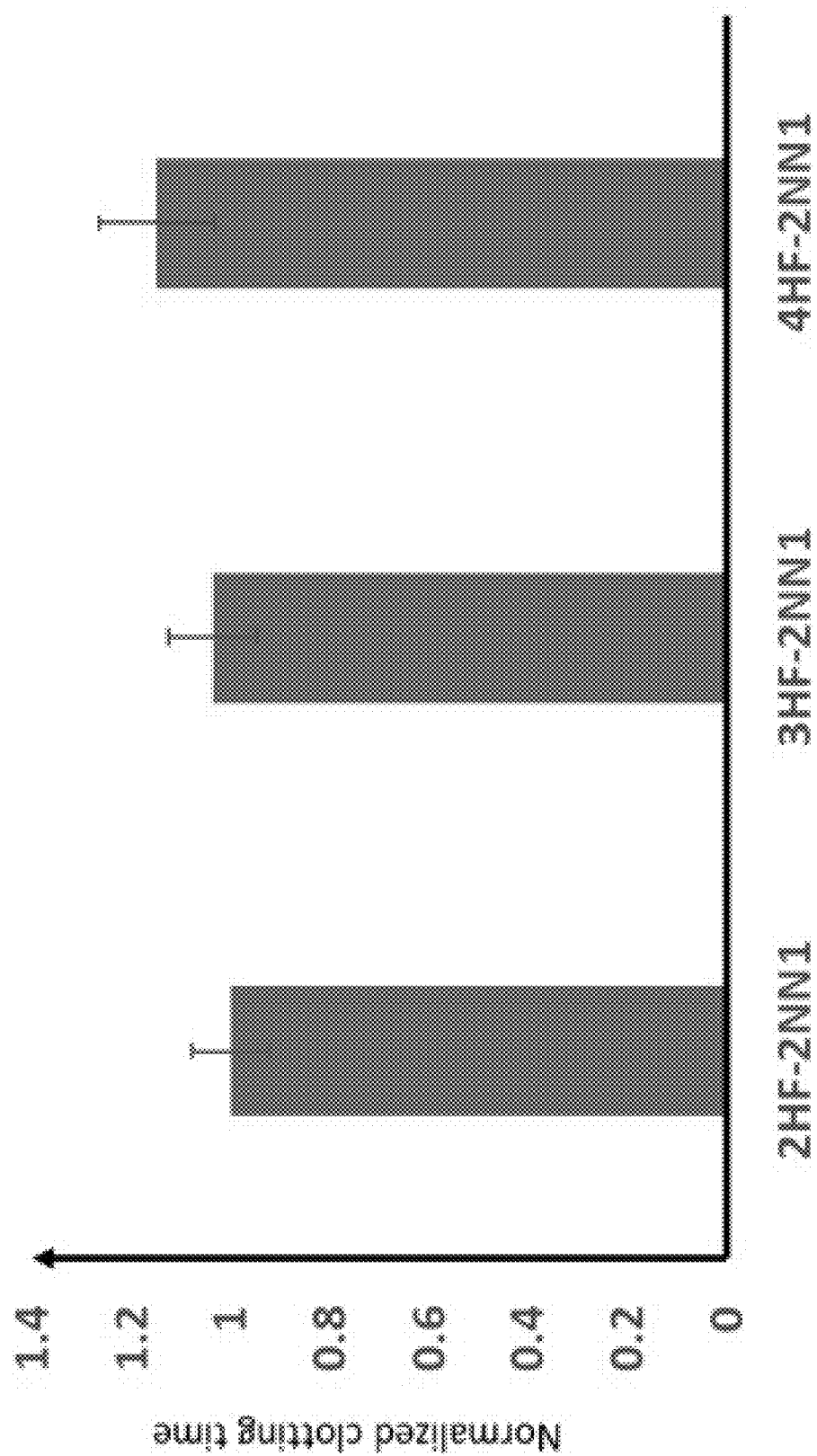
FIG. 49 includes representative results testing anticoagulation activities of RNA origami including two RNA aptamers (2NN1) and 2 (2HF), 3 (3HF), or 4 (4HF) helical structures. Results indicate that 2HF, 3HF, and 4HF RNA origami including two RNA aptamers all exhibit anticoagulation activities.

The results demonstrate that the modified RNA have similar or better effectiveness as the DNA tiles, and that the data fits within standard deviation. The RNA structures of 12NN, 1N2N, 2NN1 (FIGS. 23 and 48), and 2211 (FIGS. 47 and 48) were all exhibited significant anticoagulant activity, albeit to varying degrees. The RNA origami tiles with RNA aptamers preformed as good as if not better than their DNA counterparts. The observed binding is also further confirmation that the modified RNA is stable in human blood plasma.

Example 3

Specificity Tests. In the complex environment of the coagulation cascade and human plasma, many proteins and small molecules are involved and present in the blood. Therefore, specific binding of the capture molecule to its target is important. Thrombin contains two active sites for activation of the coagulation pathway as known as exosite 1 and 2. In order to inhibit the activity of thrombin, thrombin RNA aptamers were used, as described further herein. Functional RNA origami molecules containing two aptamers that bind to thrombin for inhibition coagulation process were designed. For testing the specificity of thrombin-binding RNA origami, thrombin, Factor IXa, and Factor Xa, which are all involved in the coagulation cascade, were used, along with bovine serum albumin (BSA). The binding of the RNA origami-protein complex was characterized by gel electrophoresis mobility shift assay.

Figure 24:
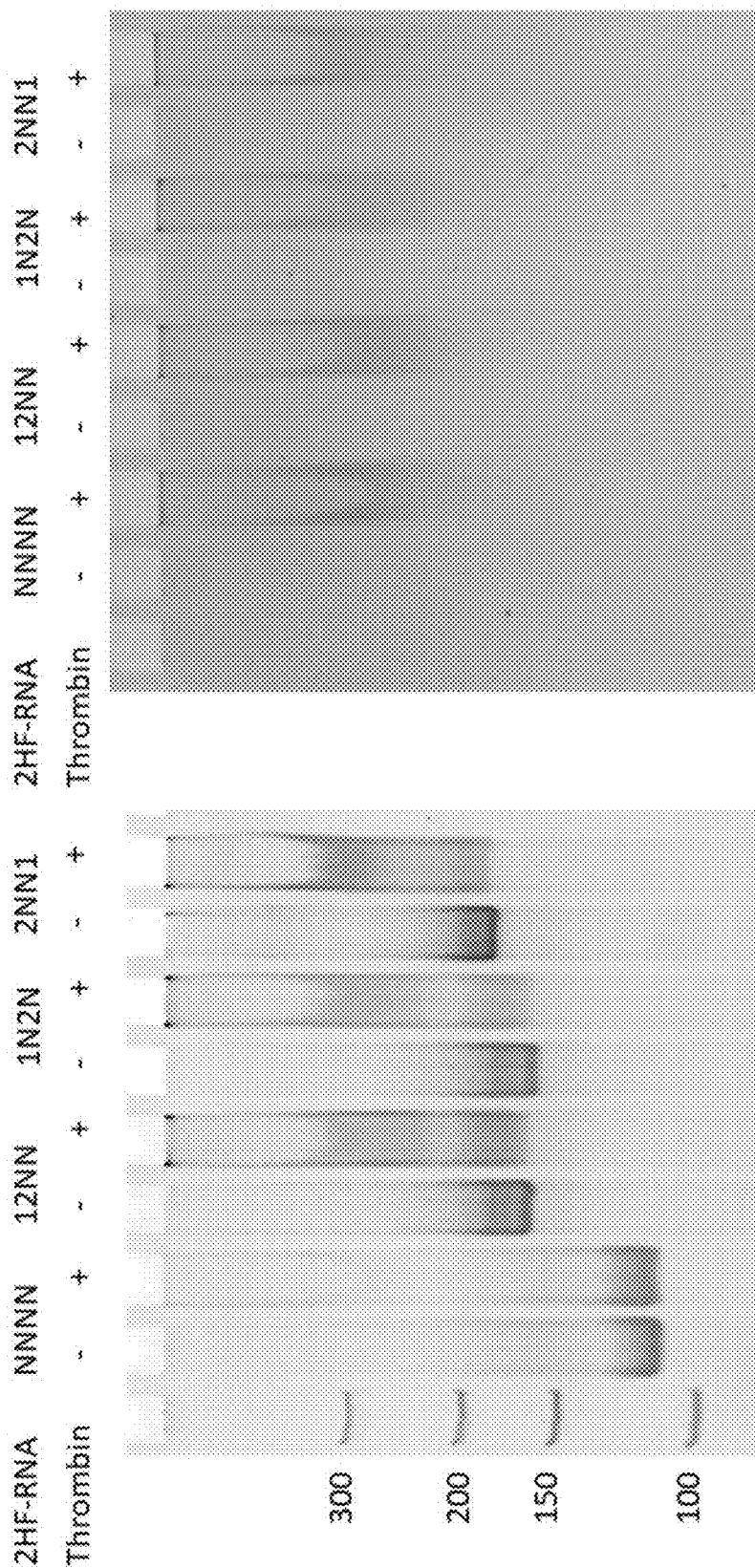
FIG. 24 includes representative images of acrylamide gel electrophoresis results of RNA origami-thrombin complex. Nucleic acid stained gel (left) and protein-staining gel (right).
Figures 41A, 41B, 41C, 41D:
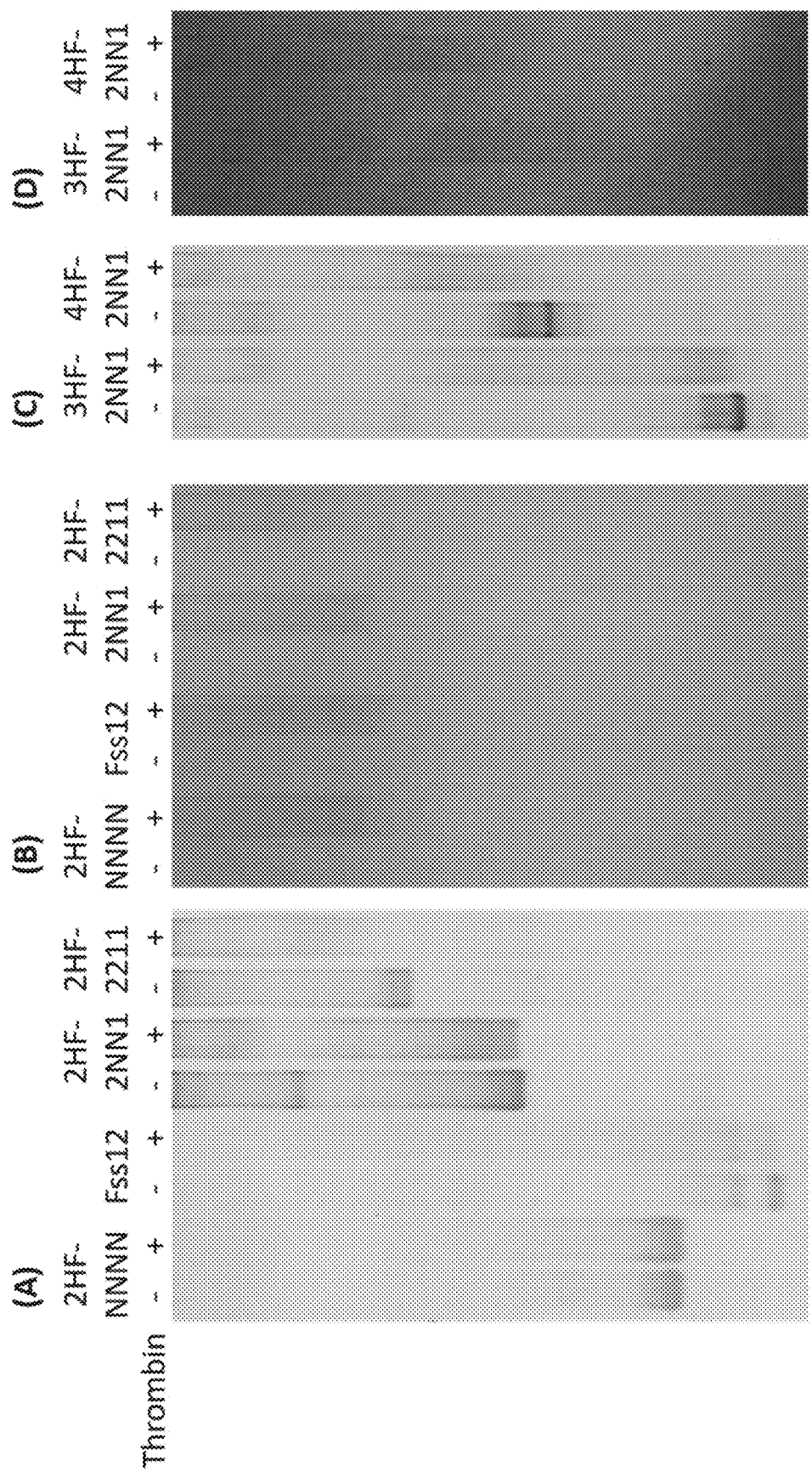
FIGS. 41A-41D include representative images characterizing RNA origami bearing aptamers binding with thrombin by 6% native acrylamide gel electrophoresis. RNA origami incubated with thrombin at 37 C for 1 hr before characterization (A). Gels in (A) and (B) are the same gel and run at 150 V for 3 hr. Gel (C) and (D) are the same gel and run at 150 V for 6 hr. Nucleic acid-stained gel, ethidium bromide (A and C). Protein-stained gel, Coomassie blue (B and D). Negative and positive values indicated absence and presence of thrombin, respectively.
Figures 42A, 42B:
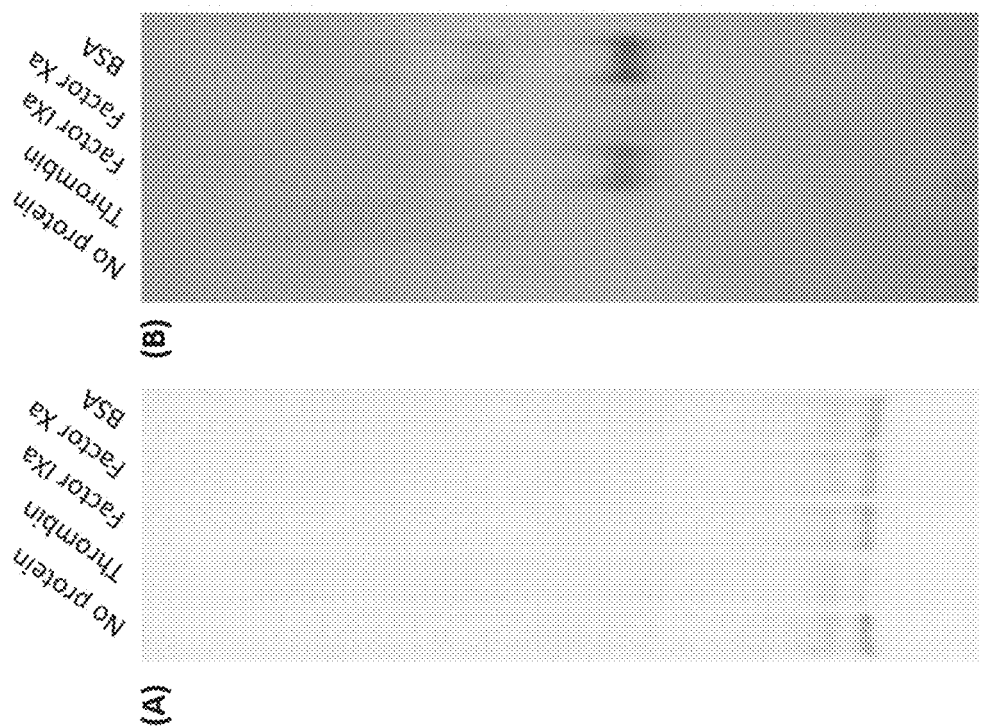
FIGS. 42A-42B include representative images of specific binding tests of 31nt-linked two aptamers (Fss12) with four different proteins by native acrylamide gel electrophoresis. Lane 1: Fss12. Lane 2: Fss12 incubated with thrombin. Lane 3: Fss12 incubated with factor IXa. Lane 4: Fss12 incubated with factor Xa, and Lane 5: Fss12 incubated with BSA. 6% native PAGE gel was run at 150 for 3 hr. Nucleic-acid stained gel, ethidium bromide (A). Protein-stained gel, Coomassie blue (B). (A) and (B) are the same gel.
Figures 43A, 43B:
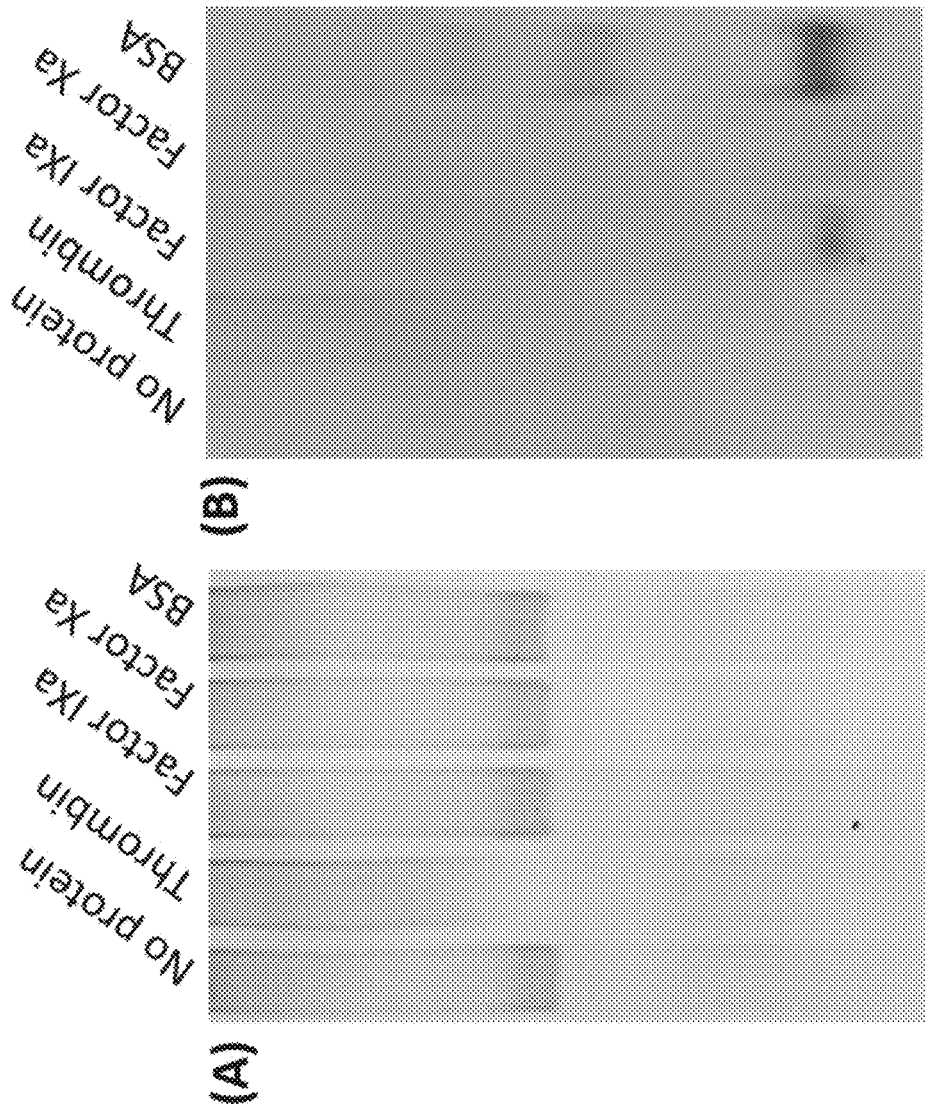
FIGS. 43A-43B include representative images of specific binding tests of 2HF-RNA-2211 with four different proteins by native acrylamide gel electrophoresis. Lane 1: 2HF-RNA-2211. Lane 2: 2HF-RNA-2211 incubated with thrombin. Lane 3: 2HF-RNA-2NN1 incubated with factor IXa. Lane 4: 2HF-RNA-2211 incubated with factor Xa, and Lane 5: 2HF-RNA-2211 incubated with BSA. 6% native PAGE gel was run at 150 for 3 hr. Nucleic-acid stained gel, ethidium bromide (A). Protein-stained gel, Coomassie blue (B). (A and B). (A) and (B) are the same gel.
Figures 44A, 44B:
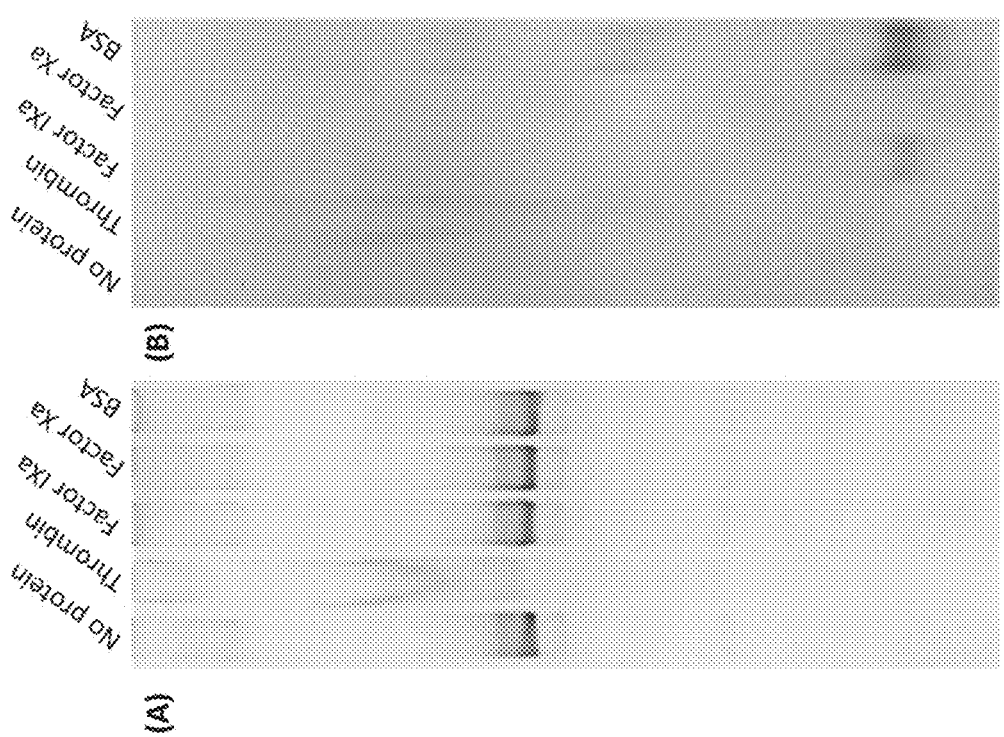
FIGS. 44A-44B include representative images of specific binding tests of 3HF-RNA-2NN1 with four different proteins by native acrylamide gel electrophoresis. Lane 1: 3HF-RNA-2NN1. Lane 2: 3HF-2NN1 incubated with thrombin. Lane 3: 3HF-RNA-2NN1 incubated with factor IXa. Lane 4: 3HF-RNA-2NN1 incubated with factor Xa, and Lane 5: 3HF-RNA-2NN1 incubated with BSA. 6% native PAGE gel was run at 150 for 6 hr. Nucleic-acid stained gel, ethidium bromide (A). Protein-stained gel, Coomassie blue (B). (A) and (B) are the same gel.
Figures 45A, 45B:
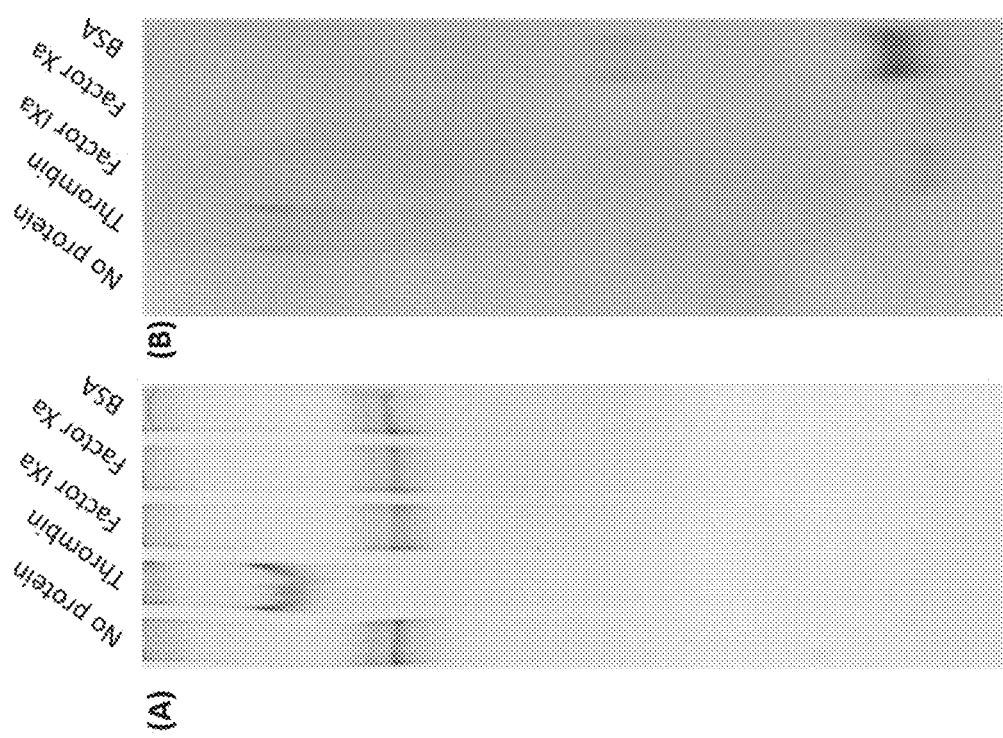
FIGS. 45A-45B include representative images of specific binding tests of 4HF-RNA-2NN1 with four different proteins by native acrylamide gel electrophoresis. Lane 1: 2HF-RNA-4NN1. Lane 2: 4HF-RNA-2NN1 incubated with thrombin. Lane 3: 4HF-RNA-2NN1 incubated with Factor IXa. Lane 4: 2HF-RNA-4NN1 incubated with Factor Xa, and Lane 5: 4HF-RNA-2NN1 incubated with BSA. 6% native PAGE gel was run at 150 for 6 hr. Nucleic-acid stained gel, ethidium bromide (A). Protein-stained gel, Coomassie blue (B). (A) and (B) are the same gel.

The binding complex of RNA thrombin aptamers included in the RNA origami (Th-RNA origami) with thrombin were tested using gel electrophoresis mobility shift assays. The eight designs of RNA origami (one without thrombin aptamers and seven designs containing thrombin aptamers) were examined RNA origami without a thrombin aptamer (2HF-RNA-NNNN) was not able to bind with thrombin. All seven designs of thrombin-containing RNA origami (2HF-RNA-12NN, 1N2N, 2NN1, Fss12, 2HF-2211, 3HF-2NN1, and 4HF-2NN1) incubated with thrombin migrate slower than RNA origami in the absence of thrombin (FIGS. 24 and 41). Moreover, the protein-stained gel shows that the smear pattern bands of thrombin protein appear at the same position of RNA-thrombin complex in the nucleic acid-stained gel. These results indicate that RNA origami with RNA thrombin aptamers binds with thrombin.

Figure 25:
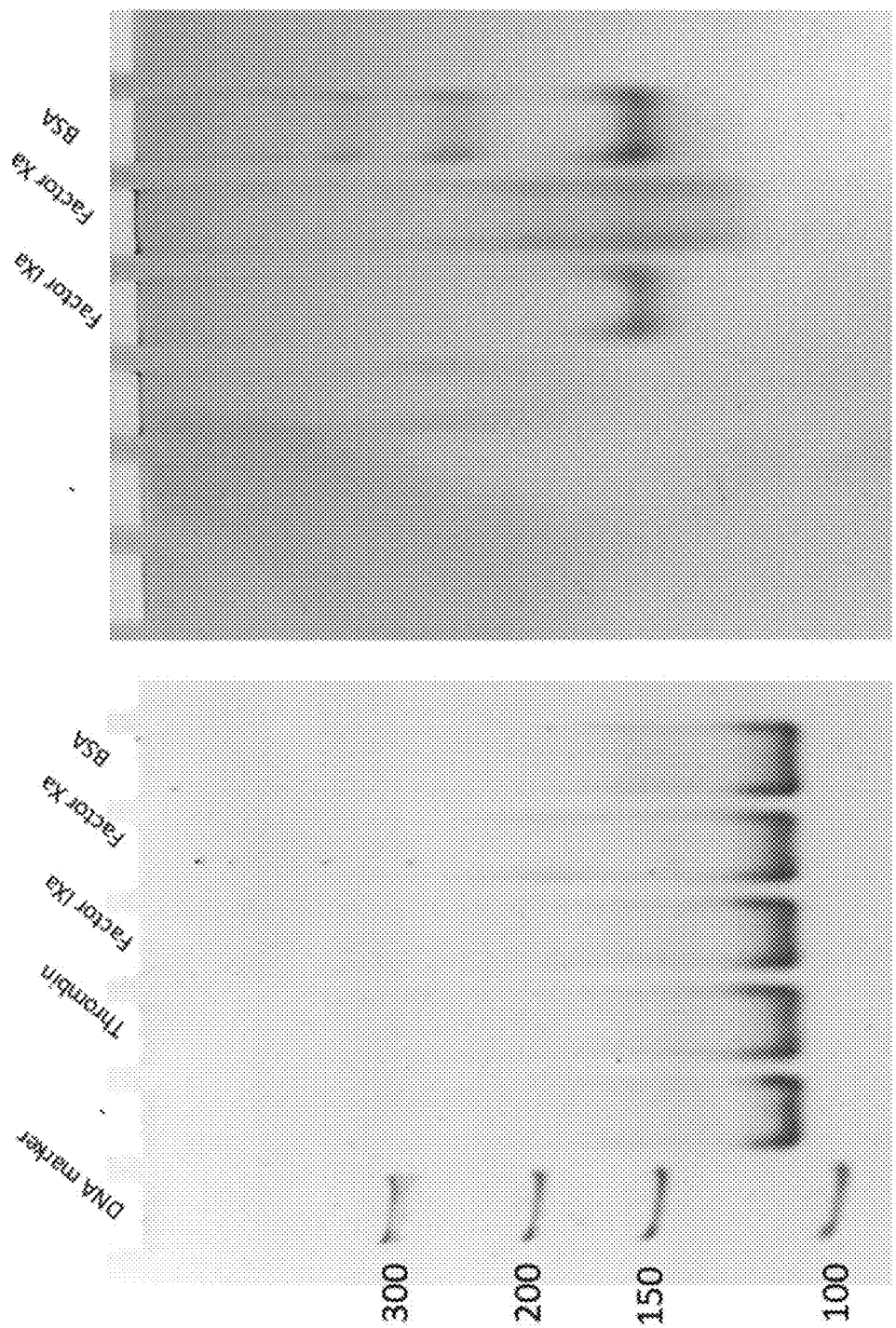
FIG. 25 includes representative images of acrylamide gel electrophoresis results of specificity tests of thrombin aptamers included in RNA origami with four different proteins by the gel electrophoresis mobility shift assay. Lane 1: DNA marker, Lane 2: 2HF-RNA-NNNN, Lane 3-6: 2HF-RNA-NNNN incubated with thrombin, factor IXa, factor Xa, and BSA, respectively. The left gel is the nucleic acid-stained gel, and the right gel is protein stained gel.
Figure 26:
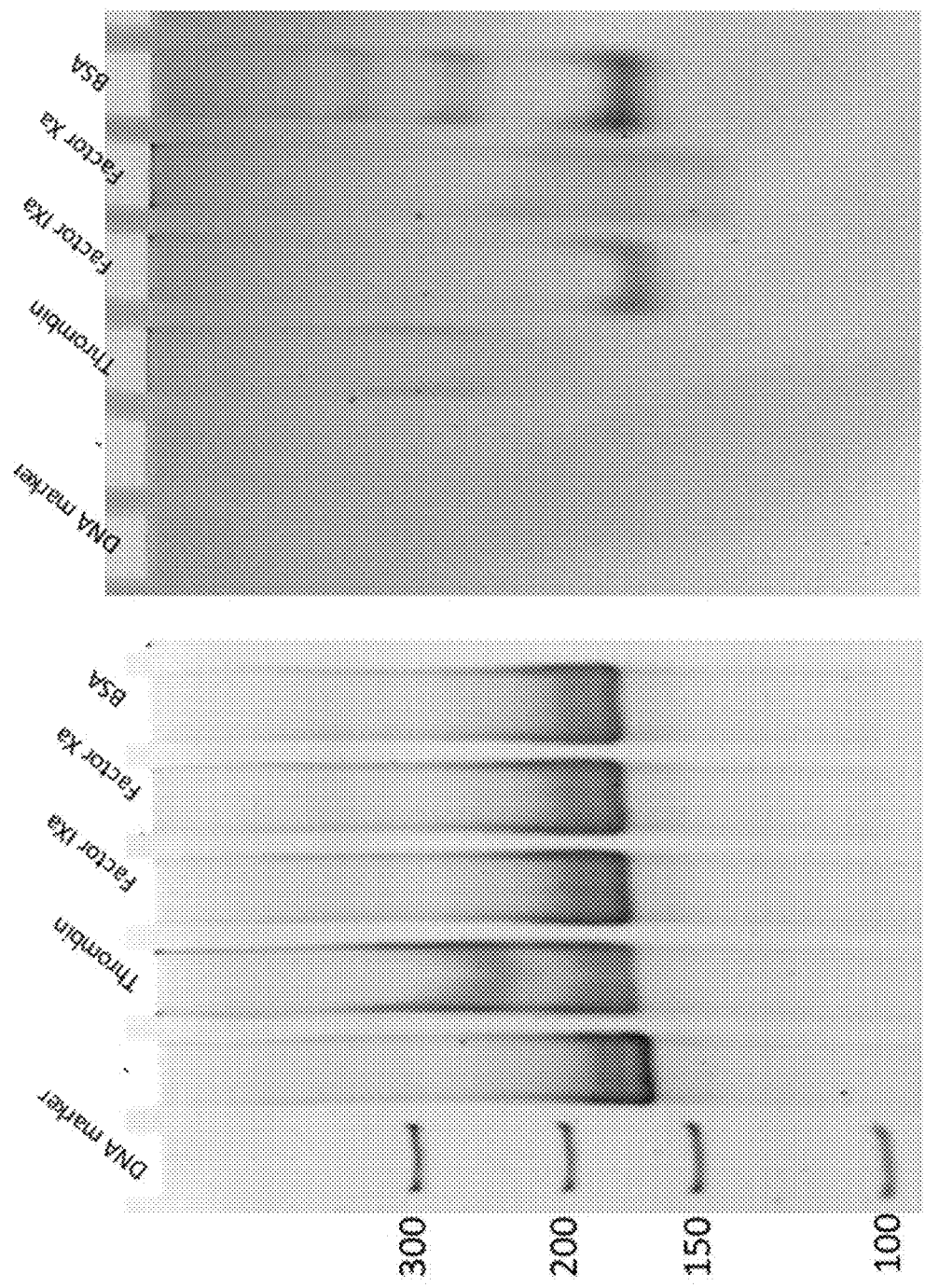
FIG. 26 includes representative images of acrylamide gel electrophoresis results of specificity tests of thrombin aptamers included in RNA origami with four different proteins. Lane 1: DNA marker, Lane 2: 2HF-RNA-12NN, Lane 3-6: 2HF-RNA-12NN incubated with thrombin, factor IXa, factor Xa, and BSA, respectively. The left gel is the nucleic acid-stained gel, and the right gel is protein stained gel.
Figure 27:
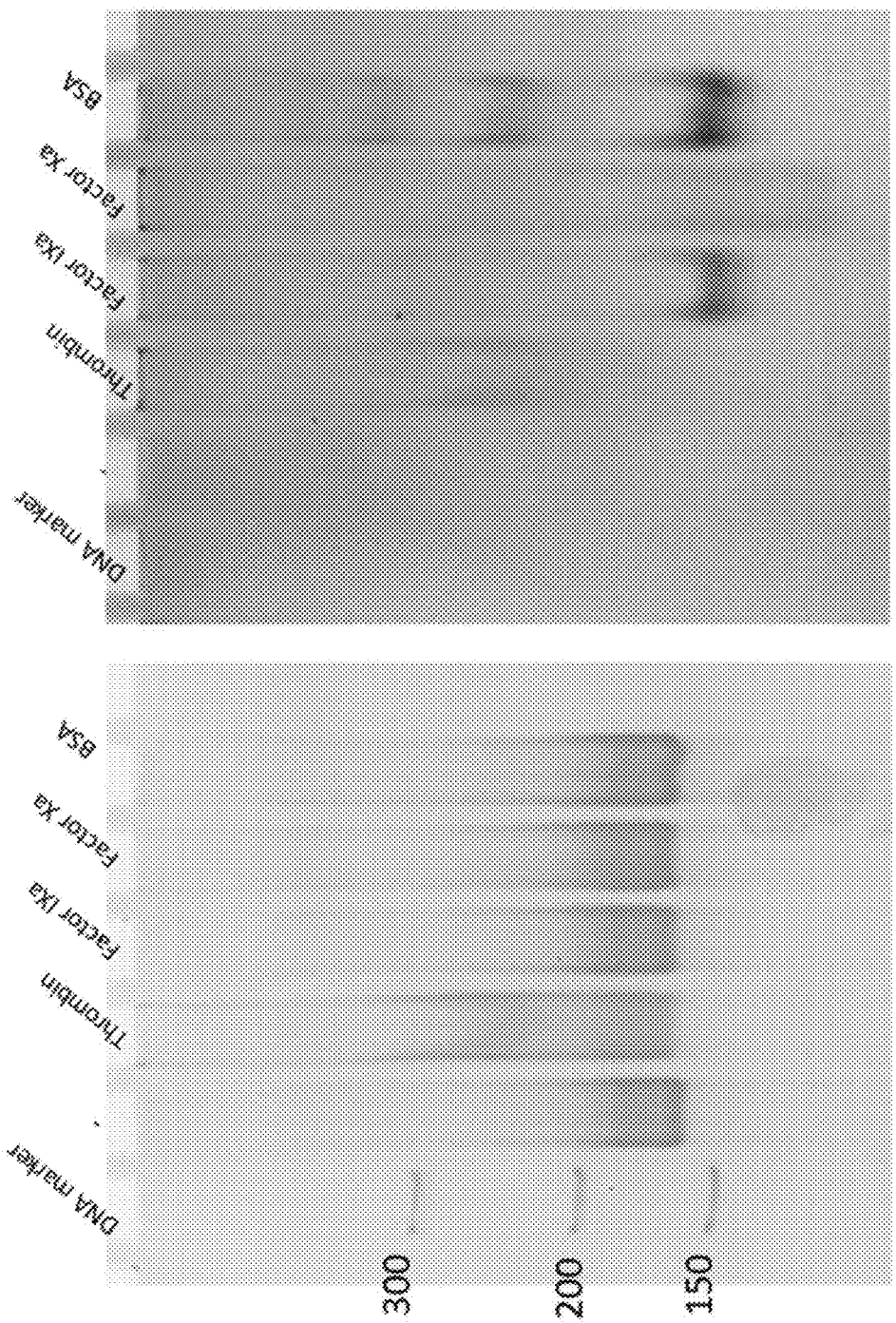
FIG. 27 includes representative images of acrylamide gel electrophoresis results of specificity tests of thrombin aptamers included in RNA origami with four different protein. Lane 1: DNA marker, Lane 2: 2HF-RNA-1N2N, Lane 3-6: 2HF-RNA-1N2N incubated with thrombin, factor IXa, factor Xa, and BSA, respectively. The left gel is the nucleic acid-stained gel, and the right gel is protein stained gel.
Figure 28:
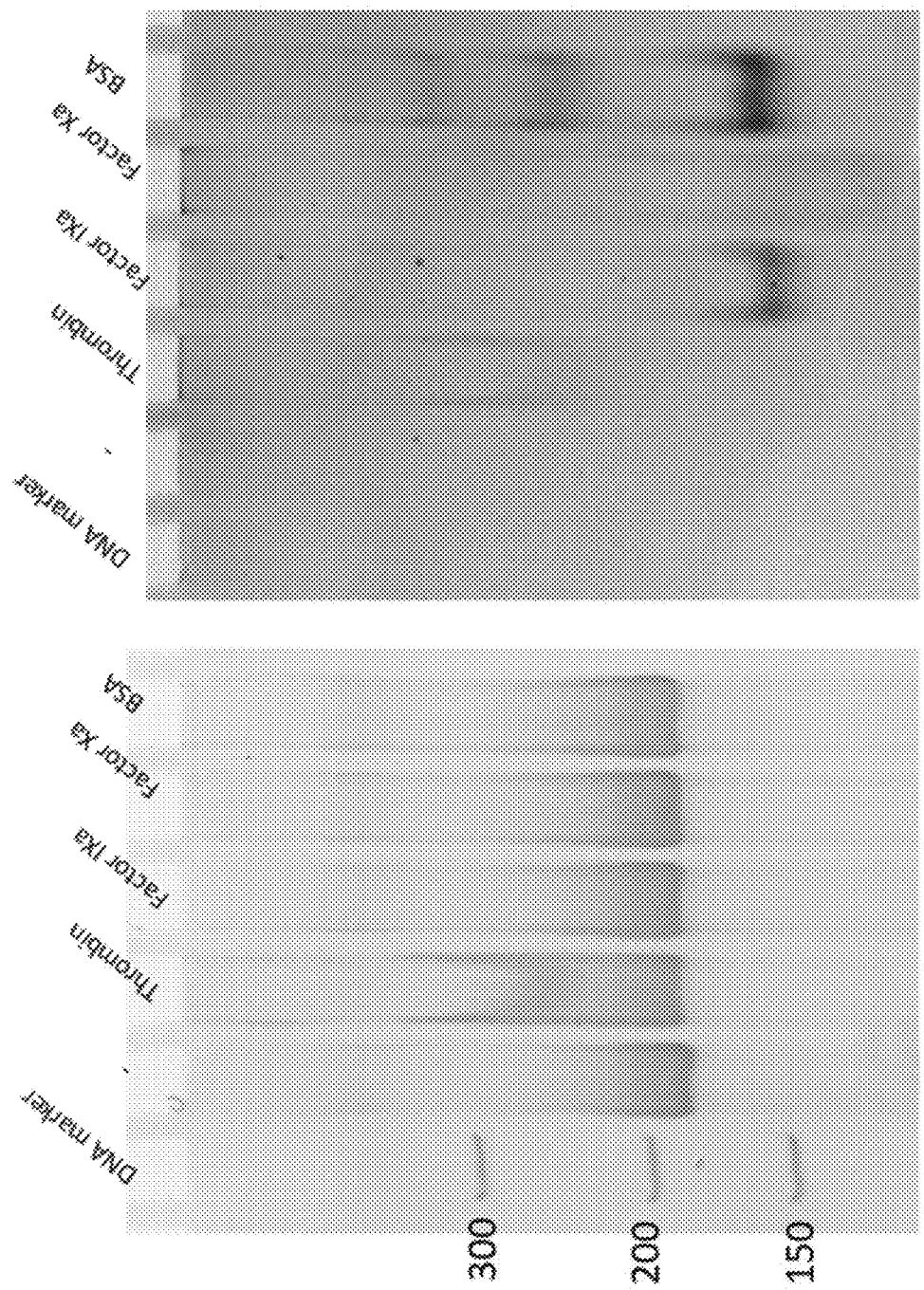
FIG. 28 includes representative images of acrylamide gel electrophoresis results of specificity tests of thrombin aptamers included in RNA origami with four different protein. Lane 1: DNA marker, Lane 2: 2HF-RNA-2NN1, Lane 3-6: 2HF-RNA-2NN1 incubated with thrombin, factor IXa, factor Xa, and BSA, respectively. The left gel is the nucleic acid-stained gel, and the right gel is protein-staining gel.

Specificity tests of the Th-RNA origami with two proteins (Factor IXa and Xa) involved in the coagulation cascade and one common protein (bovine serum albumin, BSA) were performed. To test specificity, the RNA origami was incubated with protein at 37° C. for one hour and characterized by native acrylamide gel electrophoresis. The non-aptamer presenting on RNA origami (2HF-RNA-NNNN) was not able to bind to all four proteins (FIG. 25). All seven designs of RNA origami with RNA thrombin aptamers (2HF-RNA-12NN, 1N2N, 2NN1, Fss12, 2HF-2211, 3HF-2NN1, and 4HF-2NN1) show the specificity binding with thrombin as results shown in FIGS. 26-28 and FIGS. 42-45).

Figure 29:
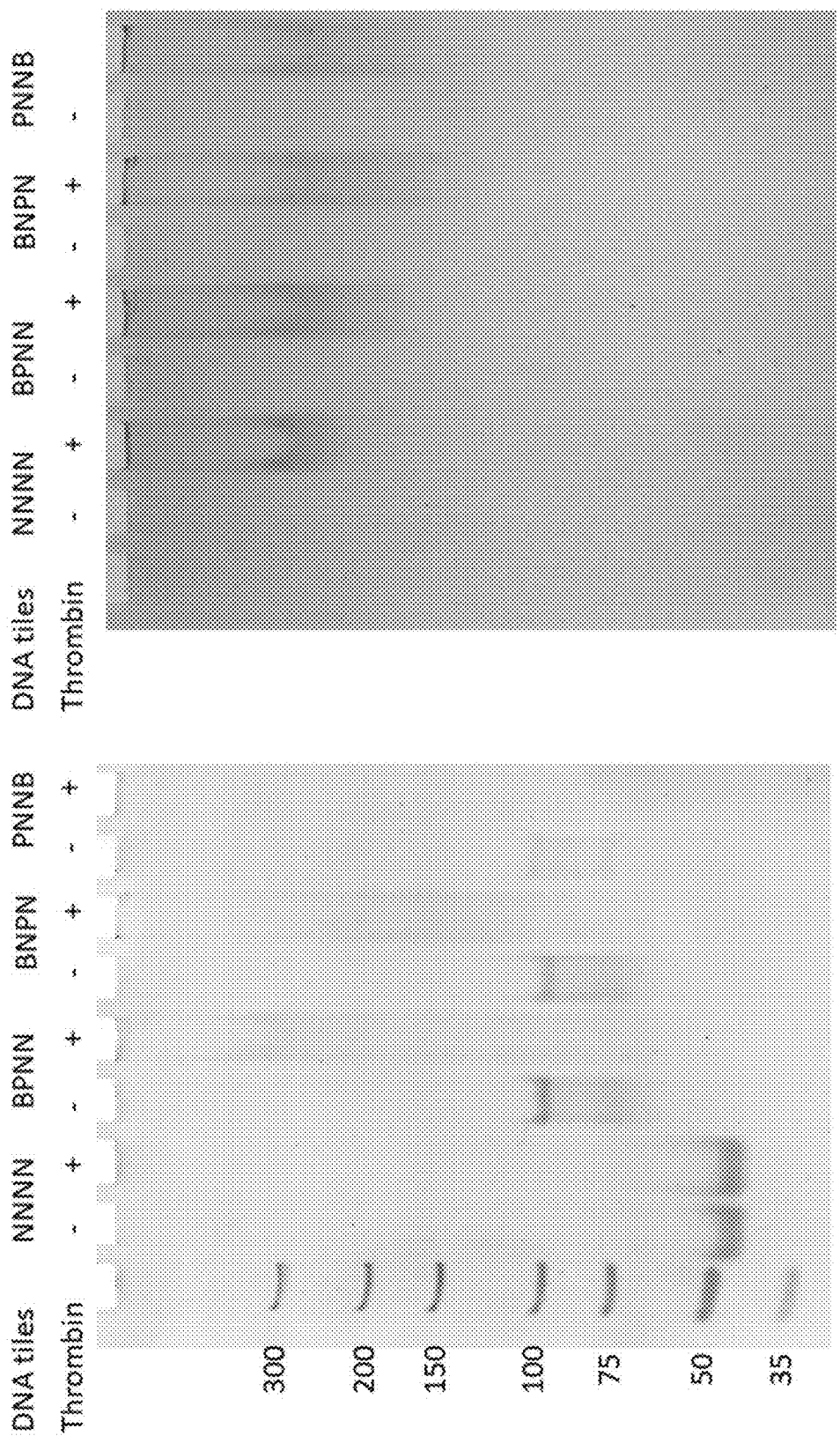
FIG. 29 includes representative results of binding assays of thrombin DNA aptamers included in DNA weave tiles with thrombin. The left gel is the nucleic acid-stained gel, and the right gel is the protein-staining gel.

Additionally, the specificity binding of thrombin DNA aptamers decorated on DNA weave tiles with thrombin protein was also tested. The 2-helices-DNA weave tile (2HT) was used. For the DNA tiles, two aptamers called "Apt-P" and "Apt-B" were extended on each design that binds with exosite 1 and 2 of thrombin. DNA tile called "NNNN" do not contain any aptamers. For the 2HT-DNA-BPNN construct, aptamers B and P were extended from position 1 and 2 on DNA weave tile (FIG. 29). These results demonstrate that thrombin binding with 2HT-DNA-NNNN was not observed.

The binding of 2HF-RNA and 2HT-DNA containing two aptamers and four aptamers with thrombin were evaluated using gel electrophoresis mobility shift assays. These results demonstrated that both RNA origami and DNA weave tiles with aptamers bind specifically with thrombin. Additionally, the non-specific binding of RNA origami with non-specific targets (Factor IXa, Xa and BSA) was not found (FIGS. 26-28 and 42-45).

As described further herein, the nucleic acid constructs embodied in FIGS. 35-38 demonstrate that effective anti-coagulant activity was achieved using a single-stranded RNA linked to aptamers (FIGS. 35A-35C) without tetra-loops or kissing loop motifs, as compared to the use of a double-stranded RNA origami platform that has one or more of these motifs. Effective anti-coagulant activity was also achieved using the RNA origami platform with four aptamers, but without tetra-loops (FIGS. 36A-36C). Additionally, effective anti-coagulant activity is also achieved using the RNA origami platforms with two aptamers and 2, 3, or 4 helical structures separating the aptamers.

Example 4

Stability Tests. RNA is a functional biomolecule that plays a crucial role in cell biology such a gene regulation. RNA is stable in cell physiological condition, but generally has a short half-life in human plasma (see diagram below). To use functional RNA for therapeutic purposes, the stability of RNA is one of the main challenges. The 2' modification of the ribose sugar has been widely used for the improvement of stability of RNA in nuclease conditions such as human plasma. It has been previously reported that 2'-fluoro- and 2'-amino-modified nucleotides integrated into ribozymes are resists to ribonuclease degradation. Importantly, 2'-fluoro-dCTP and 2'fluoro-dUTP did not affect catalytic activity of the ribozyme. Therefore, 2'-fluoro-CTP and -UTP were chosen as building blocks for in vitro production of RNA origami.

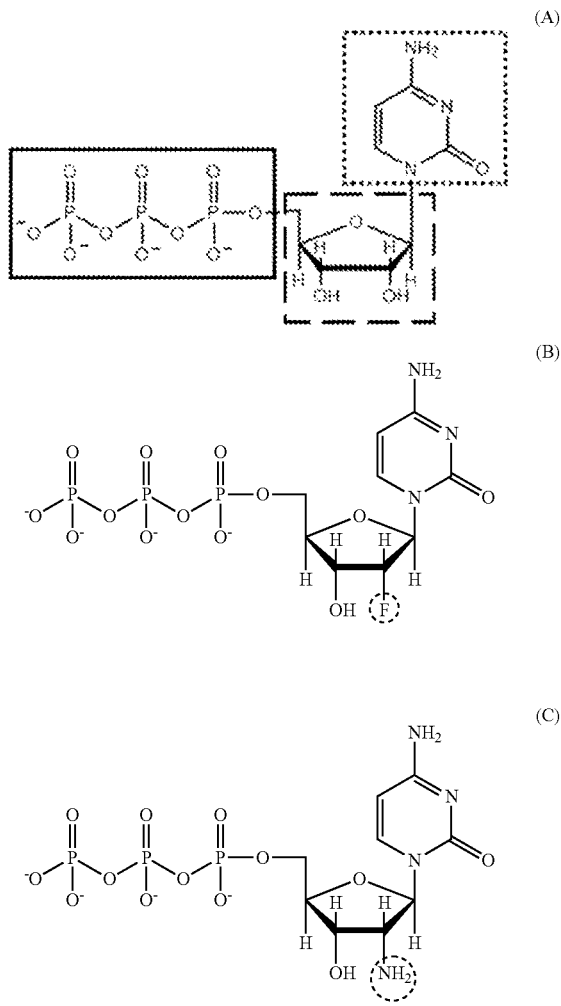

-continued

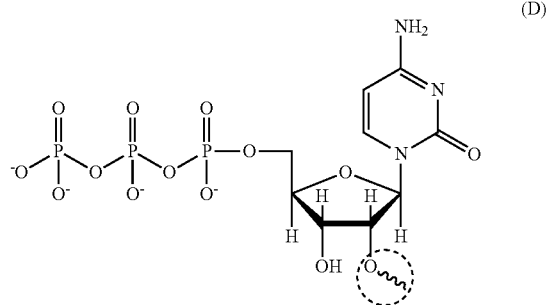

As shown above: (A) Native nucleotide, Cytidine-5'-triphosphate (CTP) and (B-D) modified nucleotides: (B) 2'-fluoro-2'-deoxycytidine-5'-triphosphate (2'F-dCTP), (C) 2'-amino-2'-deoxycytidine-5'-triphosphate (2'-amino-dCTP), and (D) 2'-O-methylcytidine-5' triphosphate (2'-O-Methyl-CTP). Cytosine, ribose sugar, triphosphate, and 2' modification are outlined in solid rectangle, dashed rectangle, dotted rectangle, and dashed circles, respectively.

Figures 30A, 30B:
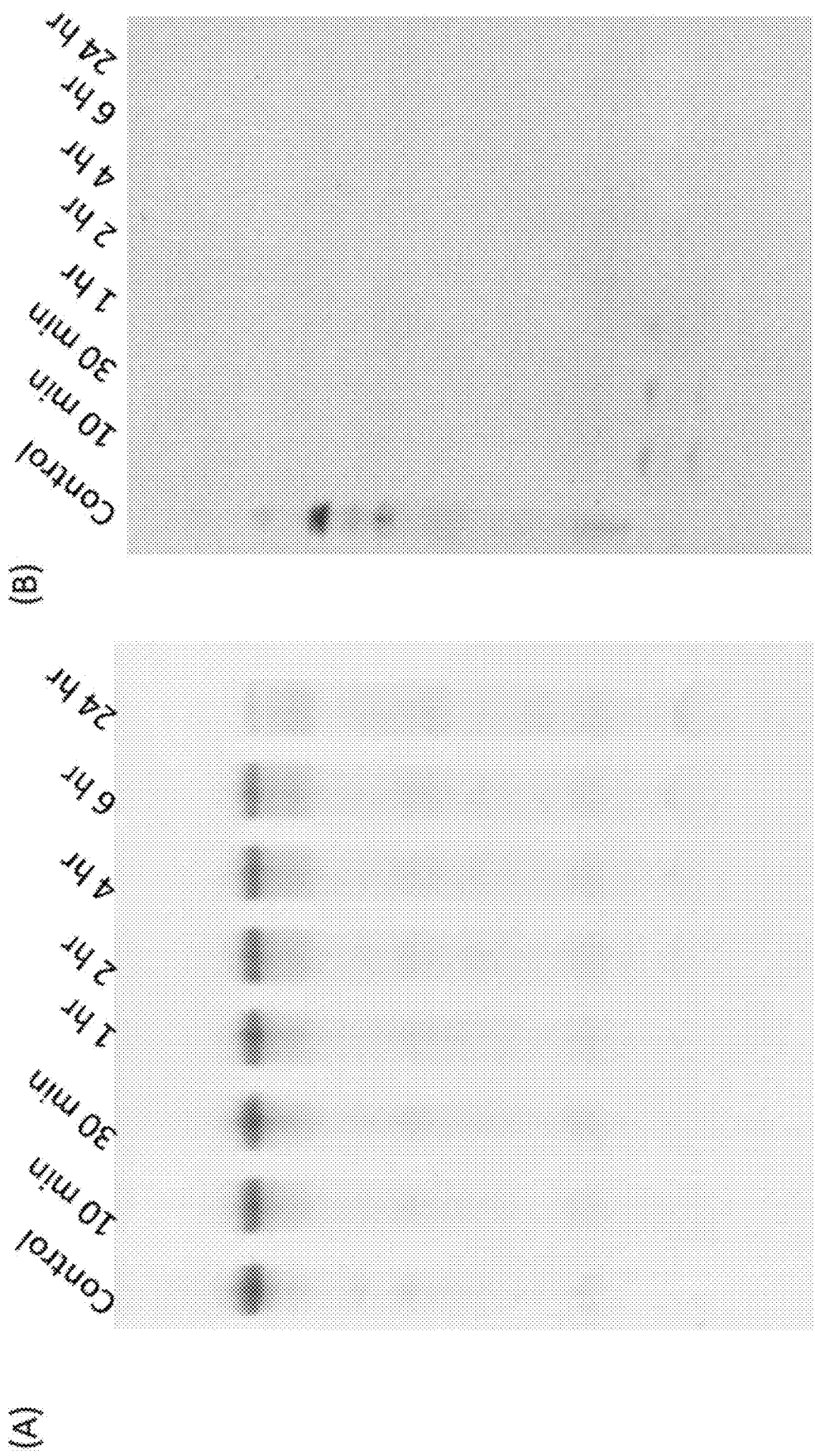
FIGS. 30A-30B include representative results of stability tests of modified (A) and non-modified (B) RNA origami treated with 10 ug/ml RNase A. The samples were characterized by denaturing gel electrophoresis.
Figure 31A:
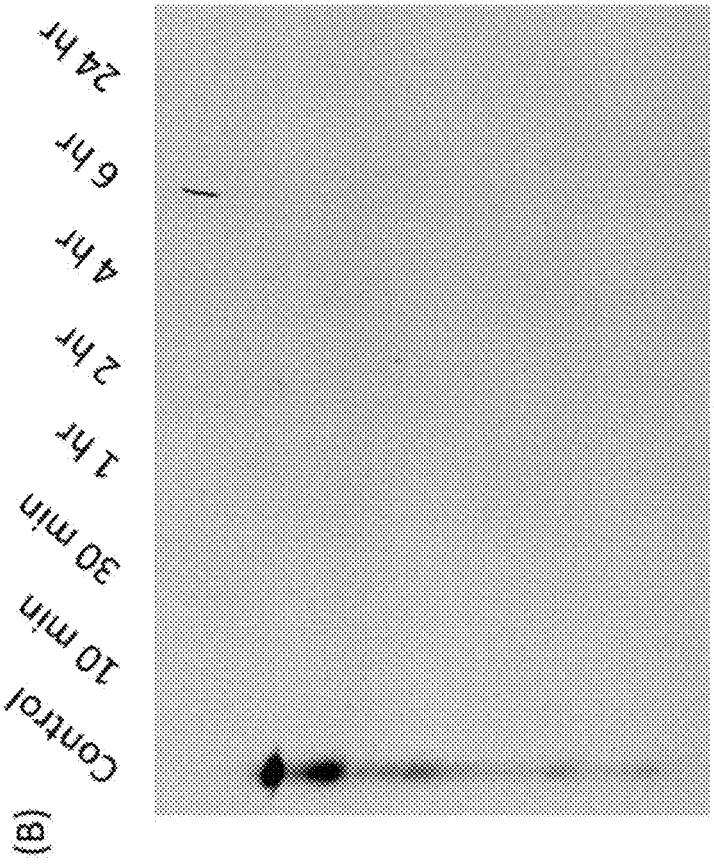
FIGS. 31A-31B include representative results of stability tests of modified (A) and non-modified RNA origami (B) treated with high concentration of RNase A (500 ug/ml). The samples were characterized by denaturing gel electrophoresis.
Figure 31B:
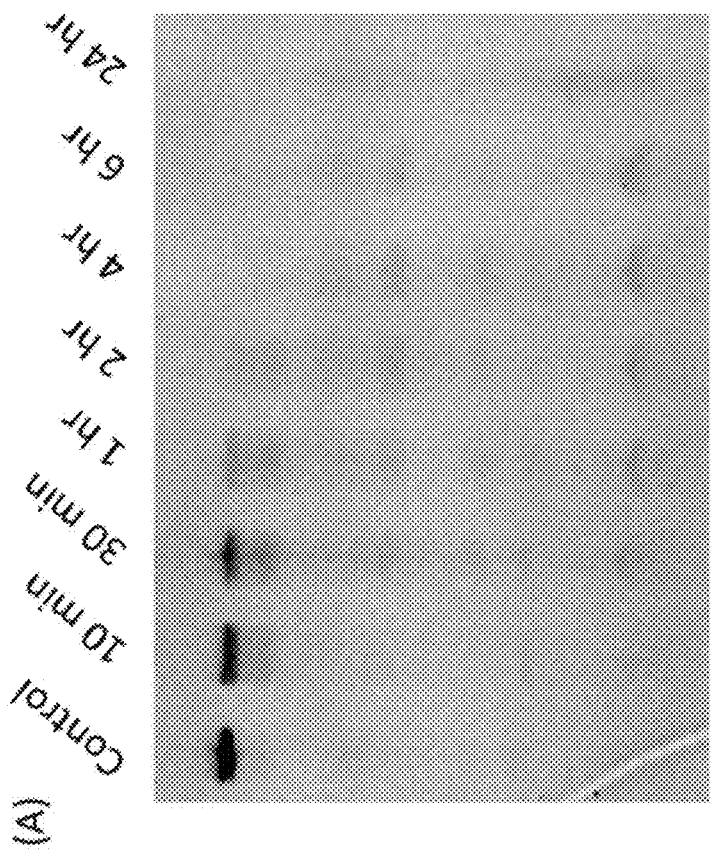

To test the stability of RNA origami in RNase A, the non-modified and modified RNA origami were incubated with RNase A (10 and 500 µg/ml) at 37° C. for 10 minutes up to 24 hours. The integrity of RNA origami was characterized by using denaturing gel electrophoresis (FIGS. 30-31). As the results demonstrate, the non-modified RNA origami was degraded in RNase A containing solution within 10 minutes (FIG. 30B). The 2'-fluoro-CTP and -UTP modified RNA origami is stable in 10 µg/ml RNase A for at least 6 hours (FIG. 30A). At high concentration of RNase A (500 µg/ml), the modified RNA origami was stable for 30 minutes as shown in FIG. 31A.

Figures 32A, 32B:
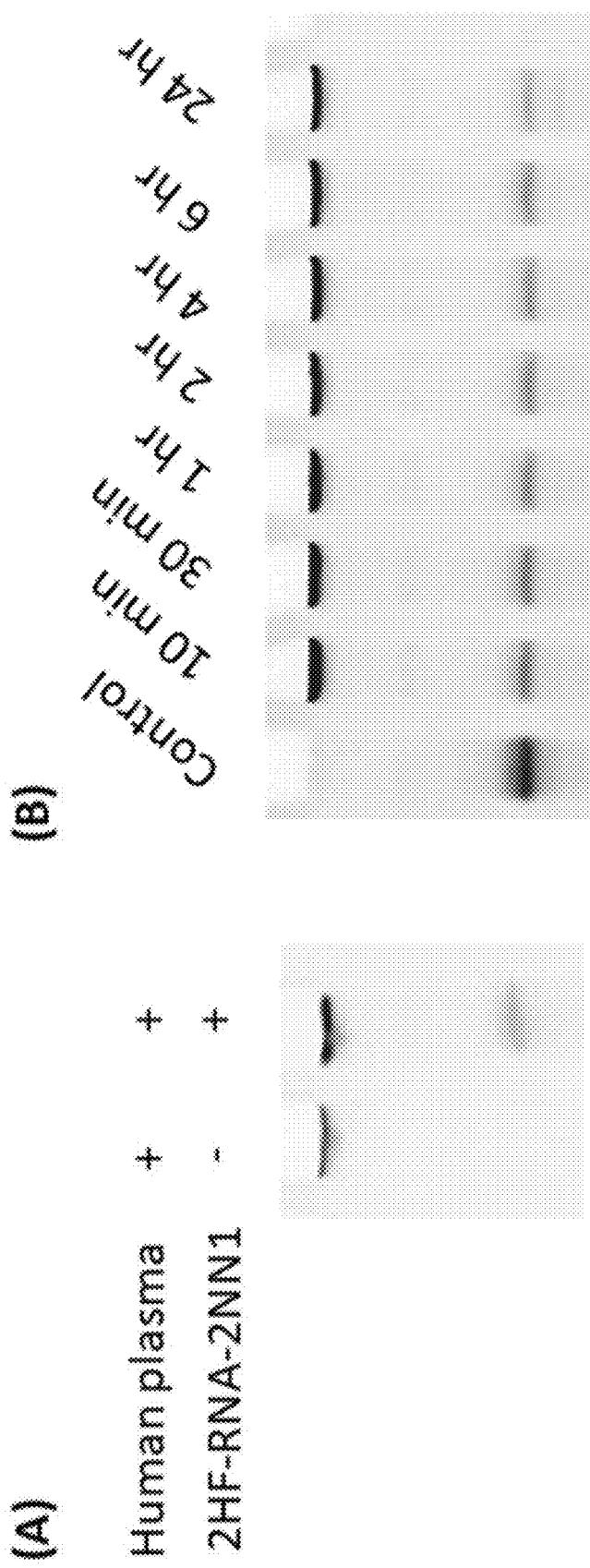
FIGS. 32A-32B include representative results of stability tests of modified RNA origami (2HF-RNA-2NN1) stored in human plasma from 10 minutes to 24 hours. The modified RNA origami (A) was stored with human plasma at 37° C. for 4 hours. The 2HF-RNA-2NN1 origami (B) was stored in human plasma from 10 minutes up to 24 hours. Control is 2HF-RNA-2NN1 stored in 1× buffer at 37° C. for 24 hours.
Figure 33:
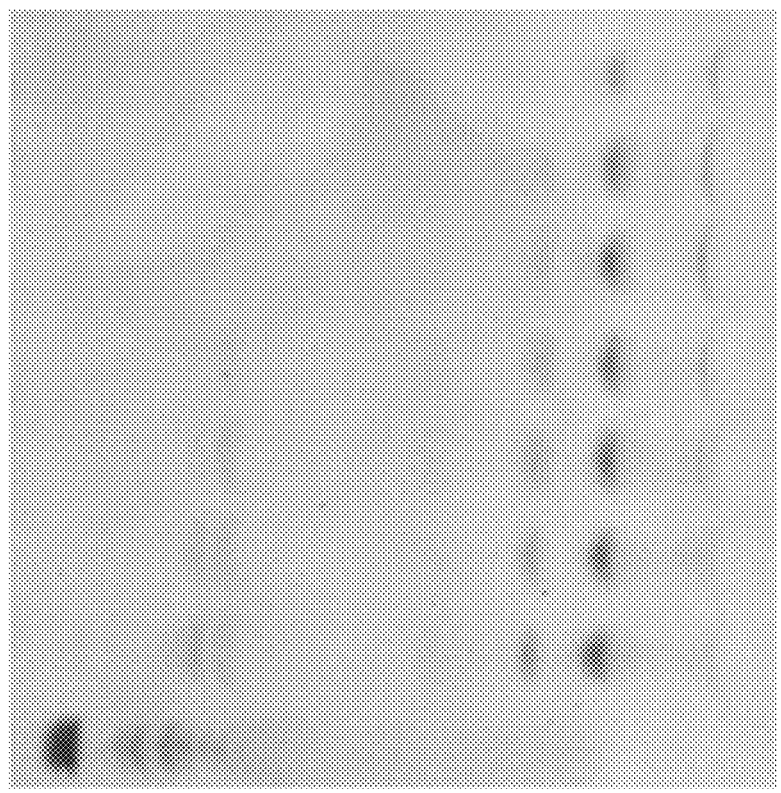
FIG. 33 includes representative results of stability tests of the non-modified RNA origami (2HO-RNA-2NN1) stored in human plasma at 37° C. from 10 minutes to 24 hours.
Figure 34:
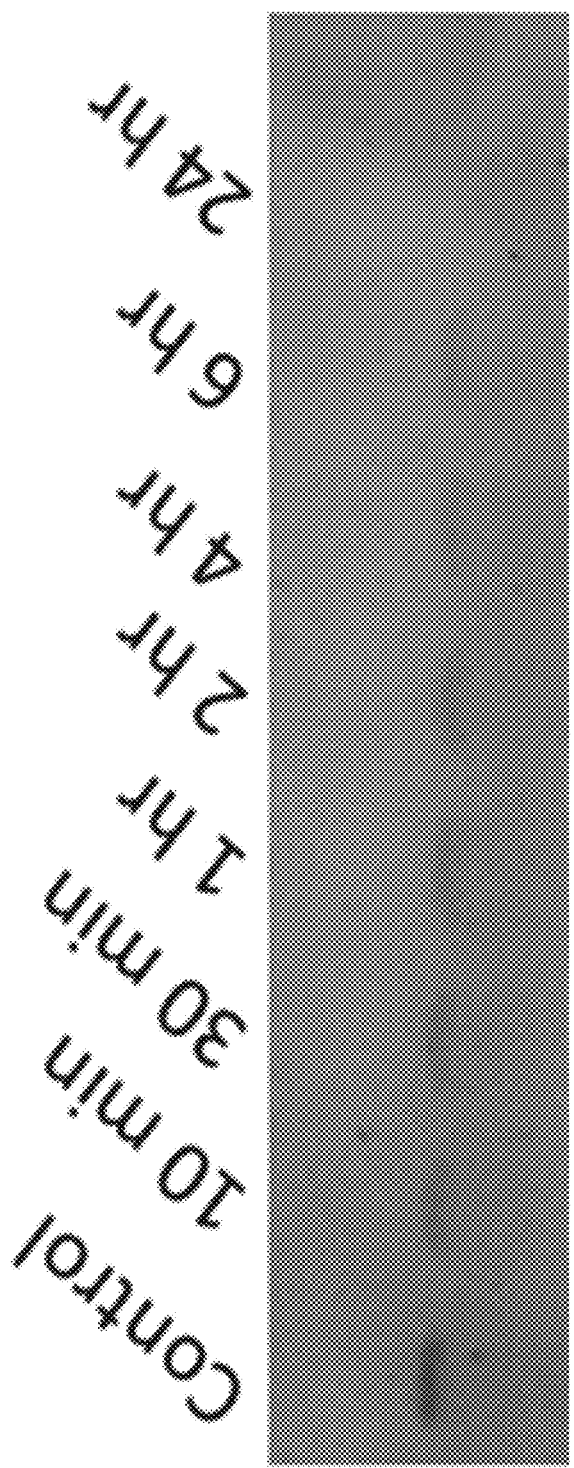
FIG. 34 includes representative results of stability tests of the DNA weave tile (2HT-DNA-PNNB) stored in human plasma from 10 minutes to 24 at 37° C. hours.
Figures 36A, 36B, 36C:
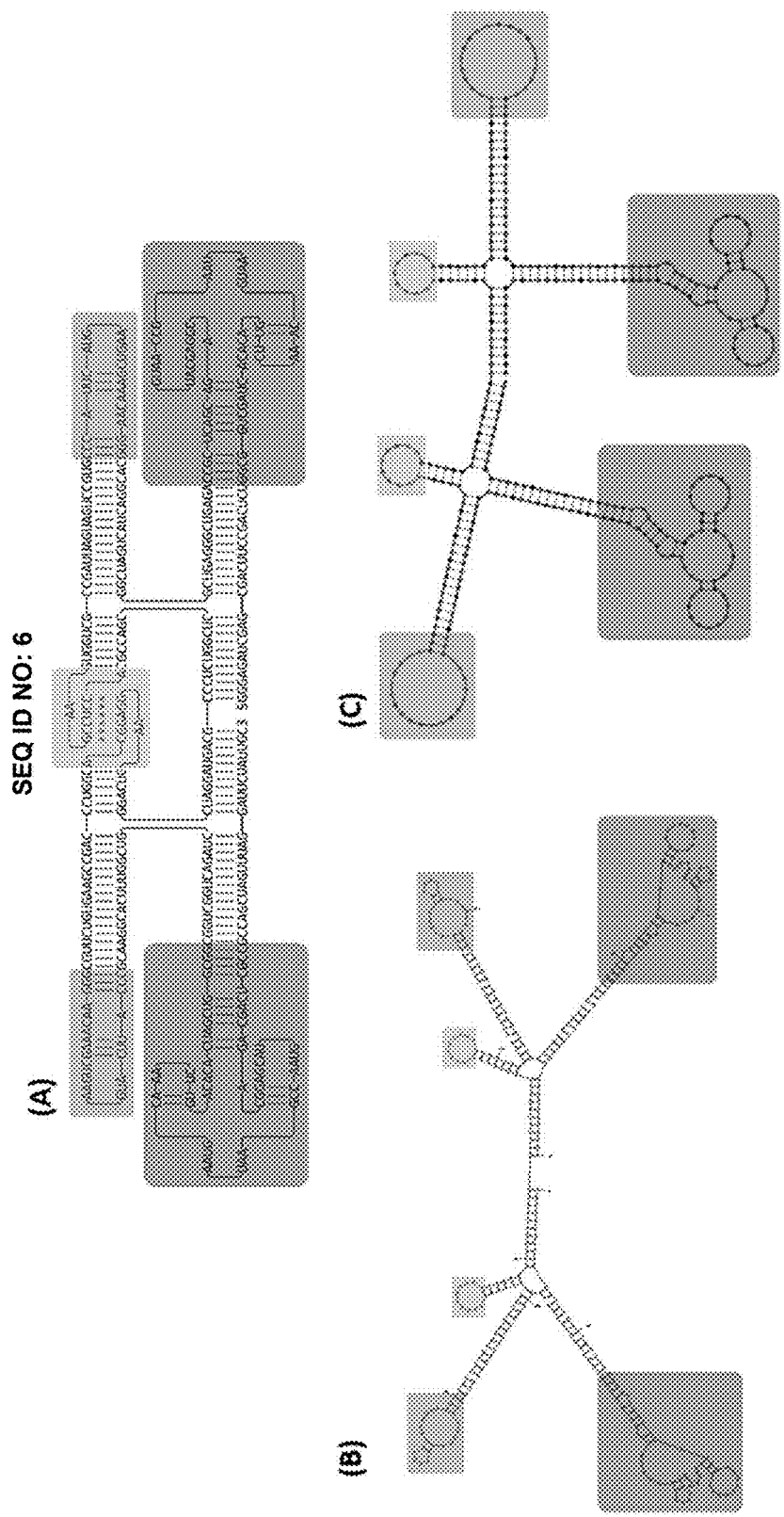
FIGS. 36A-36C include representative 2D models of four designs of RNA origami including four aptamers (2H-RNA-2211; A). Computational analysis of RNA origami folding analyzed by mfold RNA and NUPACK software (B-C). Purple and blue rectangles represent exosite-1, and exosite-2-binding aptamers, respectively, and green rectangles indicate kissing loop motifs.
Figures 37A, 37B, 37C:
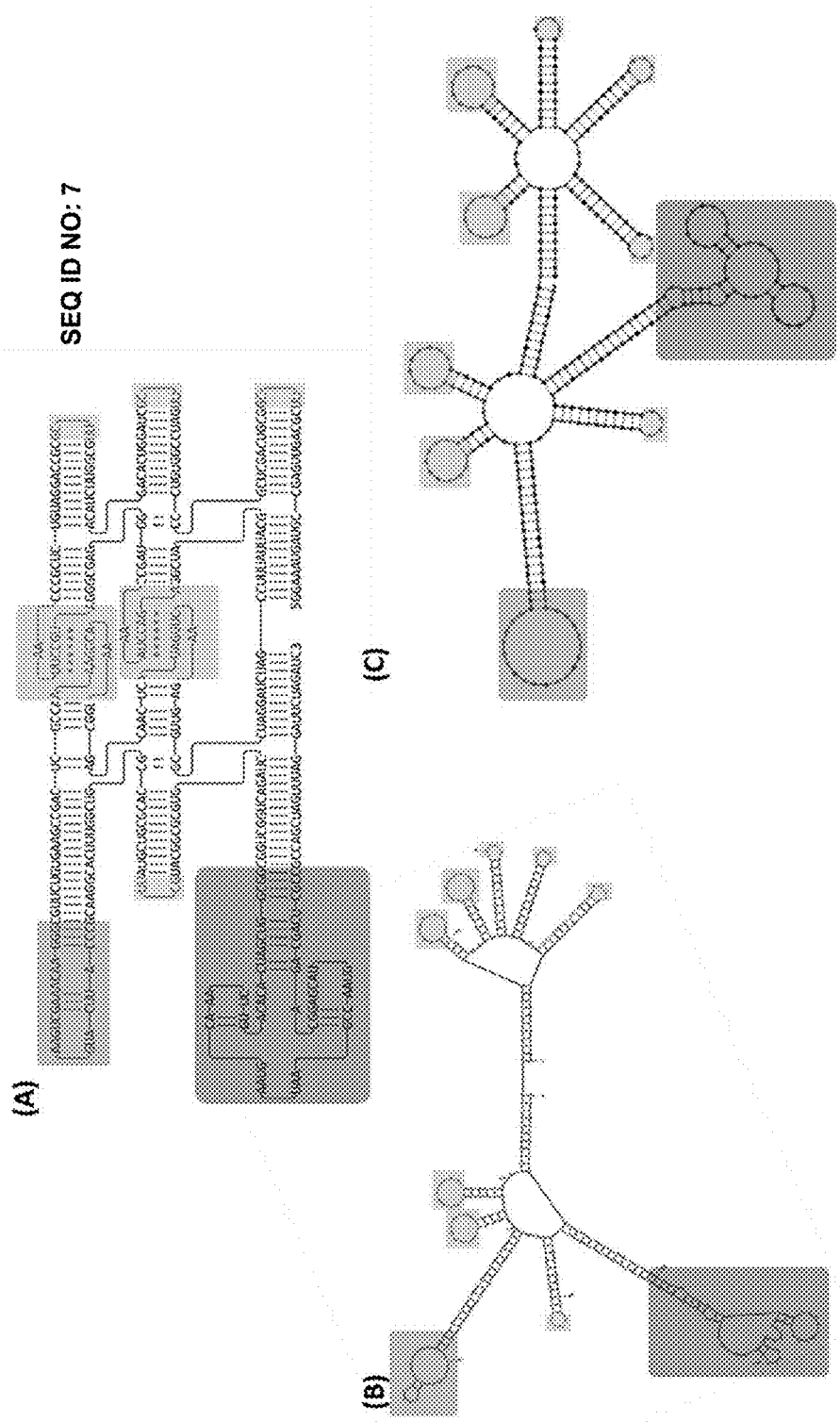
FIGS. 37A-37C include representative 2D models of four designs of RNA origami including two aptamers and three A-form double-helical structures (3H-RNA-2NN1; A). Computational analysis of RNA origami folding analyzed by mfold RNA and NUPACK software (B-C). Purple and blue rectangles represent exosite-1, and exosite-2-binding aptamers, respectively, and yellow and green rectangles indicate tetra loops and kissing loop motifs, respectively.
Figures 38A, 38B, 38C:
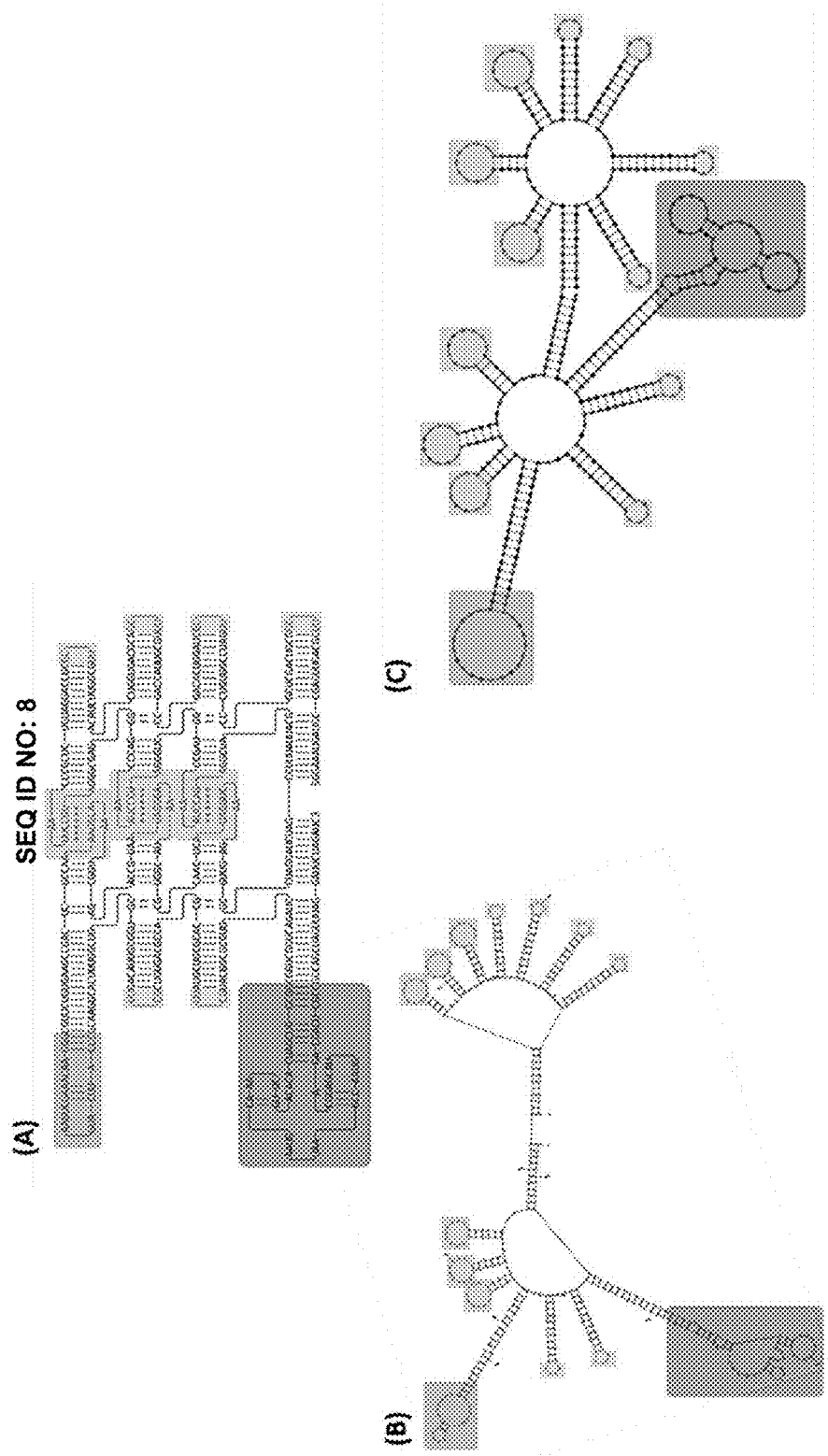
FIGS. 38A-38C include representative 2D models of four designs of RNA origami including two aptamers and four A-form double-helical structures (4H-RNA-2NN1; A). Computational analysis of RNA origami folding analyzed by mfold RNA and NUPACK software (B-C). Purple and blue rectangles represent exosite-1, and exosite-2-binding aptamers, respectively, and yellow and green rectangles indicate tetra loops and kissing loop motifs, respectively.

For therapeutic applications, the stability of anticoagulants in human plasma is important. Human plasma contains multiple components such as DNase and RNase that degrade DNA and RNA structures. Here, the resistance of RNA origami and DNA tiles in pooled human plasma was tested. Denaturing gel electrophoresis was used to characterize the integrity of nucleic acid nanostructures. The RNA origami and DNA tile were incubated with human plasma at the various time point from 10 minutes up to 24 hours. The 2'-fluoro-modified RNA origami was stable in human plasma over 24 hours as shown in FIGS. 32A-32B. The intensity of RNA appeared at the top bands in FIG. 32A shows some amount of RNA origami still binds with thrombin in human plasma. The non-modified RNA origami was degraded within less than 10 minutes (FIG. 33). The DNA weave tile is stable in human plasma for 6 hours (FIG. 34). These results demonstrate that the 2'-fluoro-modified RNA origami is more stable than DNA tile in human plasma.

The native RNA origami is degraded by ribonuclease within less than 10 minutes. To employ a functional RNA origami for therapeutic application, the stability of RNA origami is important. These results demonstrate that the 2'-fluoro-modified RNA origami is stable in RNase A for at least 6 hours. Additionally, the modified RNA origami is stable in human plasma over 24 hours that is more stable than DNA tiles. The stability of the 2'-fluoro-modified RNA origami in human plasma over 24 hours demonstrate that the RNA origami is a promising biomolecule for using in therapeutic applications.

Figure 46:
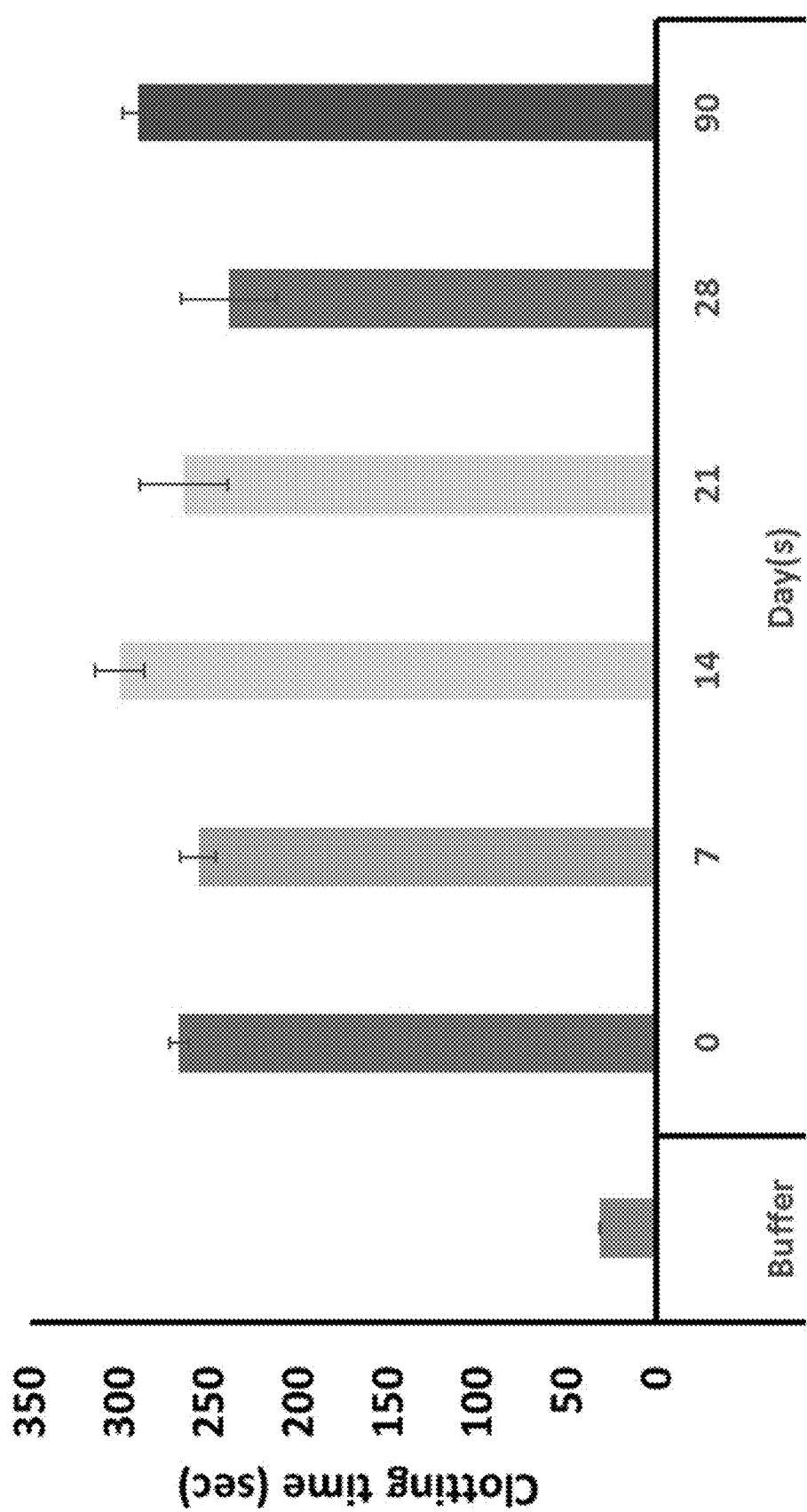
FIG. 46 includes representative results testing long-term storage of RNA origami. The average anticoagulation activity of a freshly prepared 2HF-RNA-2NN1 sample is compared to samples stored at 4° C. up to 90 days. Results demonstrate that RNA origami anticoagulant is stable and active at least for 3 months after stored at 4° C.

The storage stability of the nucleic acid aptamer constructs of the present disclosure was also tested, as shown in FIG. 46. In one embodiment, the storage buffer used included 20 mM HEPES (pH 7.4), 150 mM NaCl, and 2 mM $CaCl_2$. As would be recognized by one of ordinary skill in the art based on the present disclosure, the components of this storage buffer can vary up to ±25%, depending on the context in which the aptamer constructs are stored. For example, as shown in FIG. 46, the average anticoagulation activity of a freshly prepared 2HF-RNA-2NN1 sample was compared to samples stored at 4° C. up to 90 days. Results demonstrate that RNA origami anticoagulant is stable and active at least for 3 months after stored at 4° C.

In accordance with these embodiments, the nucleic acid aptamer constructs of the present disclosure can be stored at temperatures ranging from room temperature to −20° C. without significant loss of anticoagulation activity. In some embodiments, the nucleic acid aptamer constructs of the present disclosure can be dissolved directly in storage buffer and/or lyophilized in water (e.g., ultrapure water) prior to long-term storage. In some embodiments, the nucleic acid aptamer constructs of the present disclosure are dissolved in storage buffer prior or water and then lyophilization and stored. Before use, the nucleic acid aptamer constructs can re-constituted and allowed to properly fold for a certain period of time (e.g., 30 mins) In other embodiments, the nucleic acid aptamer constructs of the present disclosure can be allowed to properly fold in storage buffer prior to lyophilization. Before use, water or buffer can be added to dissolve the lyophilized constructs, which will be generally functional and ready for use.

Example 5

Reversal of Thrombin Inhibition. Control over the coagulation cascade offers benefits for surgical and disease applications. Chemical-based anticoagulants have been developed and are frequently used, but due to their small therapeutic window (narrow concentration difference between therapeutic and toxic doses), patients need to be monitored constantly in order to prevent dangerous side-effect such as hemorrhaging and bleeding. An alternative solution is nucleic acid-based anticoagulants that will never induce hemorrhaging and can be turn off by available antidotes.

Antidotes for aptamer-based anticoagulants can be short strands of single-stranded nucleic acids (DNA and PNA) with nucleotide sequences complementary to the aptamer sequences. Previous studies showed the reversal inhibition and reactivation of thrombin activity by an adding ssDNA antidote. This was also demonstrated with DNA aptamers on DNA tiles. RNA origami bearing RNA aptamers offer high anticoagulation activity compared with free aptamers (as demonstrated herein). The reversal of thrombin inhibition can be challenging due to the need to interrupt tight thrombin binding and stable folding of the aptamers. Here, the recovery of coagulation activity was examined by adding antidotes that are complementary counterparts of exosite-1 and -2 binding aptamers. This antidote mechanism for modulating the coagulation cascade may provide great benefit during medical procedures and disease treatments.

Figures 50A, 50B:
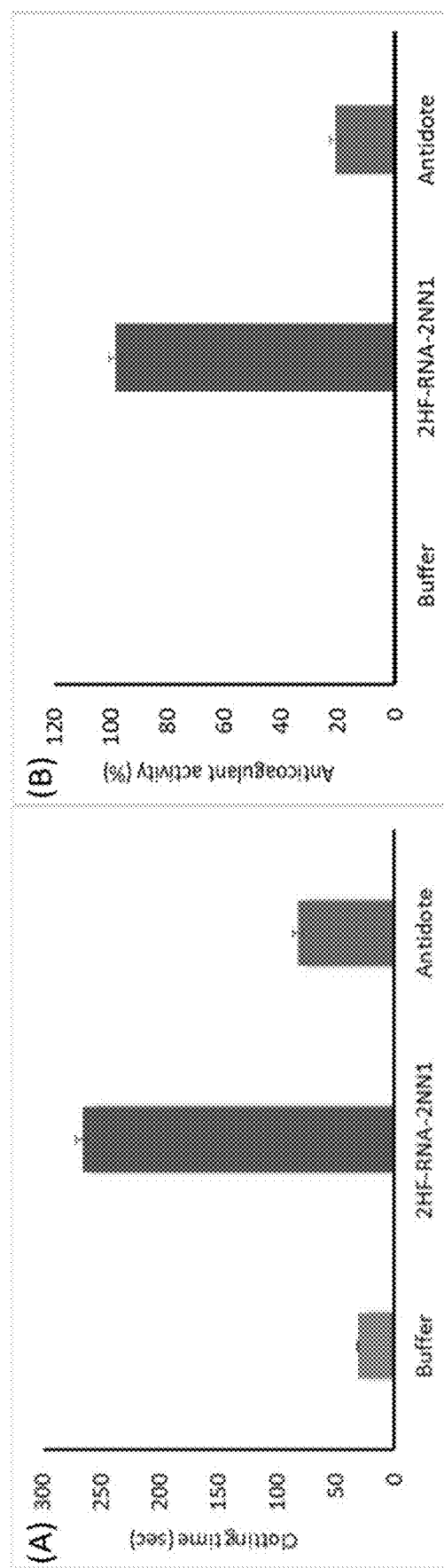
FIGS. 50A-50B include representative results of the reversal of thrombin inhibition. Clotting times (A) anticoagulation activity (B) are shown.

As shown in FIGS. 50A-50B, antidotes for 2HF-RNA-2NN1 were designed that were made of DNA for both aptamers. After the RNA origami was incubated with plasma and other reagents for an aPTT assay, the antidote was added, and the whole sample was incubated for a further 5 minutes.

Figure 51:
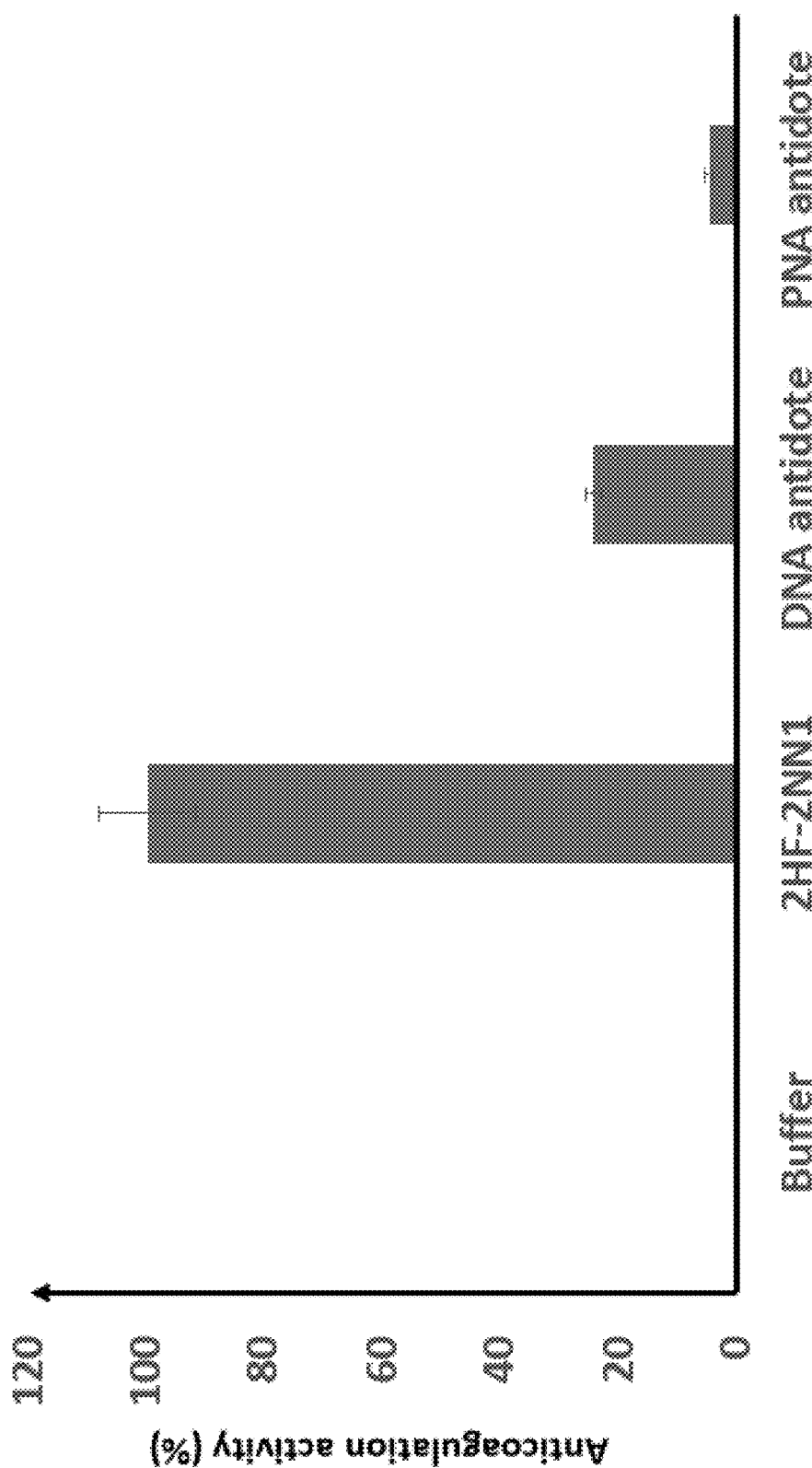
FIG. 51 includes representative results testing the reversal of thrombin activity by the addition of DNA or PNA antidotes. Anticoagulant activity of 2HF-2NN1 origami anticoagulant was used a control sample. DNA or PNA antidotes (9 equivalent) were incubated with RNA origami. The inhibition activity of PNA antidotes was higher than DNA antidotes.

Data showed that a reversal of activity was possible with the addition of the antidote, as the antidote trial revealed an average clotting time of around 85 seconds in which is 80% recovery (thrombin still 20% inhibited). The incomplete reversal could be due to the antidotes being less effective for strand invasion on one of the two aptamers, or a difference in the concentration of antidote needed to counteract the thrombin binding. Additionally, as shown in FIG. 51, peptide nucleic acids (PNA) antidotes against 2HF-RNA-2NN1 were also effective, and significantly more effective than the DNA-based counterparts.

The 2HF-RNA-2NN1 origami has been shown to be effective at inhibiting and delaying coagulation, at concentrations as low as 0.5 µM. However, another benefit of the RNA origami and RNA aptamer design is easy implementation of antidotes to the aptamers, allowing surgeons, for example, to turn off anticoagulation. The activity of thrombin can be about 80% recovered using a ssDNA antidote, or at least 80% recovery using a PNA antidote, as demonstrated.

4. MATERIALS AND METHODS

Amplification of G-Block sequence was performed. Reaction buffer, forward and reverse primers, dNTP, DNA polymerase and nuclease-free water was added to a PCR tube in the concentrations shown in Table 1. DNA Polymerase was added last and the sample was pipetted to mix.

TABLE 1

G-block PCR concentrations and volumes.

|  | Final Concentration |
| --- | --- |
| Reaction Buffer (x) | 1 |
| Forward Primer (µM) | 0.5 |
| Reverse Primer (µM) | 0.5 |
| dNTP (mM) | 0.2 |
| DNA Template (µl/50 µl) | 2 |
| DNA Polymerase (unit/µl) | 0.02 |
| Nuclease-free Water | To desired volume |

The sample was placed into the thermocycler and the following protocol was used for PCR: 98.0° C. for 30 sec; then 30 cycles of 98.0° C. for 10 sec, followed by 63.0° C. for 15 sec, followed by 72.0° C. for 20 sec; then a final extension at 72.0° C. for 2 min.

Following PCR, a small volume of the amplified DNA sample (~2-5 µl) was used for testing in an 1% agarose gel. The DNA was run beside a 1 kb ladder (Promega) at 150V for 30 minutes. The gel was then viewed under UV light (ProteinSimple instrument). If the proper band size was observed, the remaining DNA sample was then used for in-solution purification using the GFX DNA Purification Kit (GE Healthcare). About 1 µl of the purified solution was used for analysis using the Nanodrop 3000c spectrophotometer (ThermoFisher Scientific). The concentration was recorded for further use and the DNA was kept and labeled (2H-XXXX) for later transcription.

Non-modified transcription was then performed. All contents found in Table 2 below, excluding the RNA T7 polymerase, were mixed in a PCR tube. It should be noted that the DTT used was mixed in-lab to ensure freshness. Lastly, the RNA T7 polymerase was added and the sample was pipetted to mix. The sample was synthesized on ice to try and slow down enzymes, such as RNase, which have a negative impact on the production of RNA. Once all components were added and mixed, the sample was placed in the thermocycler and incubated at 37° C. for 4-16 hours and then held at 4° C.

TABLE 2

Non-Modified Transcription contents and concentrations.

|  | Final concentration |
| --- | --- |
| Transcription NEB buffer (x) | 1 |
| Fresh DTT (mM) | 5 |
| NTPs (mM each) | 2.5 |
| DNA Template (ng) | 120 |
| RNA T7 Polymerase (µl/50 µl) | 2.5 |
| Nuclease-free water | To desired volume |

For fluoro-modified transcription, the same protocol as above was followed, but using the contents found in Table 3 below:

TABLE 3

Fluoro-Modified Transcription contents and concentrations.

|  | Final concentration |
| --- | --- |
| Transcription NEB buffer (x) | 1 |
| Fresh DTT (mM) | 10 |
| Modified NTPs (mM each) | 2.5 |
| DNA Template (ng) | 120 |
| Mutant RNA T7 Polymerase (µl/50 µl) | 2.5 |
| Nuclease-free water | To desired volume |

Following transcription, a small volume of the sample (~5 µl) was used for viewing in a 6% acrylamide denaturing gel. The sample was run beside a nucleic acid maker at 20 W for 1 hour. The gel was then viewed under UV light to check for correct length. If the sequence length was correct and a nice band was present, the sample was then purified using the Monarch RNA Clean-Up kit. About 31 µl of elution buffer was used for purification and 1 µl of sample was used for analysis with the Nanodrop 3000c. The optical density (A260) was recorded and Beer's Law was used to calculate the molar concentration of the sample.

The sample was then heat annealed by heating at 95° C. for 5 minutes followed by cooling at –20° C. for 3 minutes. A 5×DNA tile buffer was then added and the sample was heated to 37° C. for 30 minutes. A 1×DNA tile buffer was used to dilute the sample to the desired volume for further use.

APPT coagulation tests evaluated the coagulation times of pooled human blood plasma with DNA/RNA tiles with anti-coagulation aptamers. About 16.67 µL of 5 µM samples of the both the RNA and DNA tiles were tested in 50 µL of Pooled Human Blood Plasma, 50 µL of aPTT reagent, and 50 µl of $CaCl_2$) solution.

For specificity tests, heat-annealed RNA origami or DNA weave tile (5 pmol) was dissolved in 1× annealing buffer and incubated with protein (25 pmol) at 37° C. for 1 hr. The samples were tested by 6% native acrylamide gel electrophoresis in 1×TBE as running buffer at 150 V for 3 hr. The gels were stained with Ethidium bromide for nucleic acid staining and visualized under a UV lamp. Then, the gels were further stained with Coomassie blue for protein staining and imaged with the ProteinSimple instrument.

For folding RNA origami, the non-modified and modified RNA origami were dissolved in nuclease-free water was heated at 95° C. for 5 min and rapidly cooled down at –20° C. for 3 min. Then, the samples were mixed with 5× annealing buffer to get concentration at 1× buffer and annealed at 37° C. for 30 min. Finally, 1× buffer was added into the folded RNA origami to get the desired concentration. The folded RNA origami (1 µl, 5 µM) was mixed with RNase A (1 µl of 10 and 500 µg/ml) or human plasma (3 µl) and incubated at 37° C. for various time course from 10 min to 24 hr. The integrity of RNA origami was characterized by denaturing gel electrophoresis. For the denaturing gel electrophoresis, the gels were pre-run at 20 W for 15 min, and the samples were run at 20 W for 1 hr. Finally, the gels were stained with Ethidium bromide for nucleic acid staining. The nucleic acid bands were visualized under UV lamp of ProteinSimple instrument.

For antidote testing, coagulation tests were run in activated partial thromboplastin time (APTT) assays with a model ST4 coagulometer (Diagnostica Stago). About 50 µL pooled human plasma (George King Bio-Medical) was added in each cuvette, mixed with 50 µL aPTT reagent (TriniClot), and let it incubate at 37° C. for 5 minutes. Then 13.67 µL of 6.09 µM RNA origami samples or buffer was added and incubated for another 5 minutes at 37° C. After the five minutes, 3.00 µL of DNA or PNA antidote were added, and incubated for 5 more minutes at 37° C. To activate clotting, 50 µL CaCl$_2$ solution was added. The final concentration of RNA samples was 0.5 µM. The time to clot was then measured by the machine and recorded.

5. SEQUENCES

The following nucleic acids are provided by the present disclosure, as referenced herein.

```
RNA-NNNN
                                              (SEQ ID NO: 1)
GGGAGAUCGAGCGACUUCCGACUUCGGUCGGGAGUCGGGCUAGUCAU
CUUCGGAUGAUUAGCCGCUGGUGAAGCCUCCACGCCAGCCUCGGUCUCCC
GCAGUAGGAUCGGACUGAAGGAGGCACGGUCCCAGCCGAAGUGUCUUGCU
UCGGCAAGGCACUUUGGCUGCUAGACUGGCUGGCUUCGGCCAGCUAGUUU
AGGAUUCUAUUGC

RNA-12NN
                                              (SEQ ID NO: 2)
GGGAGAUCGAGCGACUUCCGACUUCGGUCGGGAGUCGGGCUAGUCAU
CGGGAACAAAGCUGAAGUACUUACCCGAUGAUUAGCCGCUGGUGAAGCCU
CCACGCCAGCCUCGGUCUCCCGCAGUAGGAUCGGACUGAAGGAGGCACGG
UCCCAGCCGAAGUGUCUGGCGGUCGAUCACACAGUUCAAACGUAAUAAGC
CAAUGUACGAGGCAGACGACUCGCCAGGCACUUUGGCUGCUAGACUGGCU
GGCUUCGGCCAGCUAGUUUAGGAUUCUAUUGC

RNA-1N2N
                                              (SEQ ID NO: 3)
GGGAGAUCGAGCGACUUCCGACGGGAACAAAGCUGAAGUACUUACCC
GUCGGGAGUCGGGCUAGUCAUCUUCGGAUGAUUAGCCGCUGGUGAAGCCU
CCACGCCAGCCUCGGUCUCCCGCAGUAGGAUCGGACUGAAGGAGGCACGG
UCCCAGCCGAAGUGUCUGGCGGUCGAUCACACAGUUCAAACGUAAUAAGC
CAAUGUACGAGGCAGACGACUCGCCAGGCACUUUGGCUGCUAGACUGGCU
GGCUUCGGCCAGCUAGUUUAGGAUUCUAUUGC

RNA-2NN1
                                              (SEQ ID NO: 4)
GGGAGAUCGAGCGACUUCCGACUUCGGUCGGGAGUCGGGCUAGUCAU
CUUCGGAUGAUUAGCCGCUGGUGAAGCCUCCACGCCAGCCUCGGUCUCCC
GCAGUAGGAUCGGACUGAAGGAGGCACGGUCCCAGCCGAAGUGUCUUGCG
GGAACAAAGCUGAAGUACUUACCCGCAAGGCACUUUGGCUGCUAGACUGG
CUGGCGGCGGUCGAUCACACAGUUCAAACGUAAUAAGCCAAUGUACGAGG
CAGACGACUCGCCGCCAGCUAGUUUAGGAUUCUAUUGC

Fss12
                                              (SEQ ID NO: 5)
GGGAACAAAGCUGAAGUACUUACCCACCUUACCACUCCACCUCACUC
ACCUAUUACGGCGGUCGAUCACACAGUUCAAACGUAAUAAGCCAAUGUAC
GAGGCAGACGACUCGCC 2H-2211
                                              (SEQ ID NO: 6)
GGGAGAUCGAGCGACUUCCGACUCUGGCGGUCGAUCACACAGUUCAA
ACGUAAUAAGCCAAUGUACGAGGCAGACGACUCGCCAGAGUCGGGAGUCG
GGCUAGUCAUCAGGCACGGGAACAAAGCUGAAGUACUUACCCGUGCCUGA
UGAUUAGCCGCUGGUGAAGCCUCCACGCCAGCCUCGGUCUCCCGCAGUAG
GAUCGGACUGAAGGAGGCACGGUCCCAGCCGAAGUGUCUUGCGGGAACAA
AGCUGAAGUACUUACCCGCAAGGCACUUUGGCUGCUAGACUGGCUGGCGG
CGGUCGAUCACACAGUUCAAACGUAAUAAGCCAAUGUACGAGGCAGACGA
CUCGCCGCCAGCUAGUUUAGGAUUCUAUUGC 3H-2NN1
                                              (SEQ ID NO: 7)
GGAAAUGAUGCCGAGUUGACGCUUCGGCGUCAGCUCGCCCUGUGGCC
UAGUUCGCUAGGUCACAGACAUCUUGGCGUUCGCGCCAGGAUGUCUCGCC
CAAUUCCGUAGGGCGAGGGUAGCCAAAUCCAGAGGCUAGCAUUAUUUCCG
AUCUAGGAUCGCGUUGAGAACUGGAUACUCAACAGCGGUAAACGGAAAAC
CGCUCAGCCGAAGUGUCUUGCGGGAACAAAGCUGAAGUACUUACCCGCAA
GGCACUUUGGCUGGCCACGCGUCGUAUUCGUACGGCGCGUGCUAGACUGG
CUGGCGGCGGUCGAUCACACAGUUCAAACGUAAUAAGCCAAUGUACGAGG
CAGACGACUCGCCGCCAGCUAGUUUAGGAUUCUAGAUC 4H-2NN1
                                              (SEQ ID NO: 8)
GGAAAUGAUGCCGAGUUGACGCUUCGGCGUCAGCUCGCCCUGUGGCC
UAGUUCGCUAGGUCACAGCCGACCAUUGCGUUUCGACGCAGUGGUCACAU
CUUGGCGUUCGCGCCAGGAUGUCUCGCCCAAUUCCGUAGGGCGAGGGAC
CCAAAUCCCUAGGGUCGGUAGCCAAAUCCAGAGGCUAGCAUUAUUUCCGA
UCUAGGAUCGCGUUGAGAACUGGAUACUCAACCGUGGCAUAAAGGGAUAA
UGCCAAGCGGUAAACGGAAAACCGCUCAGCCGAAGUGUCUUGCGGGAACA
AAGCUGAAGUACUUACCCGCAAGGCACUUUGGCUGCGUGGCGUUACAGUU
CGCUGUGACGCCAGCCACGCGUCGUAUUCGUACGGCGCGUGCUAGACUGG
CUGGCGGCGGUCGAUCACACAGUUCAAACGUAAUAAGCCAAUGUACGAGG
CAGACGACUCGCCGCCAGCUAGUUUAGGAUUCUAGAUC

Gblock sequences are provided below (T7 promoters
are bolded).
2H-DNAGblock-NNNN
                                              (SEQ ID NO: 9)
CACTTTCAGCCCTCTTATCCTCGGCGGATCCTTCTAATACGACTCACTA
TAGGGAGATCGAGCGACTTCCGACTTCGGTCGGGAGTCGGGCTAGTCATC
```

TTCGGATGATTAGCCGCTGGTGAAGCCTCCACGCCAGCCTCGGTCTCCCG

CAGTAGGATCGGACTGAAGGAGGCACGGTCCCAGCCGAAGTGTCTTGCTT

CGGCAAGGCACTTTGGCTGCTAGACTGGCTGGCTTCGGCCAGCTAGTTTA

GGATTCTATTGC

2H-DNAGblock-12NN
(SEQ ID NO: 10)
CACTTTCAGCCCTCTTATCCTCGGCGGATCCTTCTAATACGACTCACTA

TAGGGAGATCGAGCGACTTCCGACTTCGGTCGGGAGTCGGGCTAGTCATC

GGGAACAAAGCTGAAGTACTTACCCGATGATTAGCCGCTGGTGAAGCCTC

CACGCCAGCCTCGGTCTCCCGCAGTAGGATCGGACTGAAGGAGGCACGGT

CCCAGCCGAAGTGTCTGGCGGTCGATCACACAGTTCAAACGTAATAAGCC

AATGTACGAGGCAGACGACTCGCCAGGCACTTTGGCTGCTAGACTGGCTG

GCTTCGGCCAGCTAGTTTAGGATTCTATTGC

2H-DNAGblock-1N2N
(SEQ ID NO: 11)
CACTTTCAGCCCTCTTATCCTCGGCGGATCCTTCTAATACGACTCACTA

TAGGGAGATCGAGCGACTTCCGACGGGAACAAAGCTGAAGTACTTACCCG

TCGGGAGTCGGGCTAGTCATCTTCGGATGATTAGCCGCTGGTGAAGCCTC

CACGCCAGCCTCGGTCTCCCGCAGTAGGATCGGACTGAAGGAGGCACGGT

CCCAGCCGAAGTGTCTGGCGGTCGATCACACAGTTCAAACGTAATAAGCC

AATGTACGAGGCAGACGACTCGCCAGGCACTTTGGCTGCTAGACTGGCTG

GCTTCGGCCAGCTAGTTTAGGATTCTATTGC

2H-DNAGblock-2NN1
(SEQ ID NO: 12)
CACTTTCAGCCCTCTTATCCTCGGCGGATCCTTCTAATACGACTCACTA

TAGGGAGATCGAGCGACTTCCGACTTCGGTCGGGAGTCGGGCTAGTCATC

TTCGGATGATTAGCCGCTGGTGAAGCCTCCACGCCAGCCTCGGTCTCCCG

CAGTAGGATCGGACTGAAGGAGGCACGGTCCCAGCCGAAGTGTCTTGCGG

GAACAAAGCTGAAGTACTTACCCGCAAGGCACTTTGGCTGCTAGACTGGC

TGGCGGCGGTCGATCACACAGTTCAAACGTAATAAGCCAATGTACGAGGC

AGACGACTCGCCGCCAGCTAGTTTAGGATTCTATTGC

DNAGblock-Fss12
(SEQ ID NO: 13)
CACTTTCAGCCCTCTTATCCTCGGCGGATCCTTCTAATACGACTCACTA

TAGGGAACAAAGCTGAAGTACTTACCCACCTTACCACTCCACCTCACTCA

CCTATTACGGCGGTCGATCACACAGTTCAAACGTAATAAGCCAATGTACG

AGGCAGACGACTCGCC

2H-DNAGblock-2211
(SEQ ID NO: 14)
CACTTTCAGCCCTCTTATCCTCGGCGGATCCTTCTAATACGACTCACTA

TAGGGAGATCGAGCGACTTCCGACTCTGGCGGTCGATCACACAGTTCAAA

CGTAATAAGCCAATGTACGAGGCAGACGACTCGCCAGAGTCGGGAGTCGG

GCTAGTCATCAGGCACGGGAACAAAGCTGAAGTACTTACCCGTGCCTGAT

GATTAGCCGCTGGTGAAGCCTCCACGCCAGCCTCGGTCTCCCGCAGTAGG

ATCGGACTGAAGGAGGCACGGTCCCAGCCGAAGTGTCTTGCGGGAACAAA

GCTGAAGTACTTACCCGCAAGGCACTTTGGCTGCTAGACTGGCTGGCGGC

GGTCGATCACACAGTTCAAACGTAATAAGCCAATGTACGAGGCAGACGAC

TCGCCGCCAGCTAGTTTAGGATTCTATTGC

3H-DNAGblock-2NN1
(SEQ ID NO: 15)
CGGCCAGTGAATTCGAGCTCGGTACCCGGGAGATCTCACTTTCAGCCCT

CTTATCCTCGGCCGATCCTTCTAATACGACTCACTATAGGAAATGATGCC

GAGTTGACGCTTCGGCGTCAGCTCGCCCTGTGGCCTAGTTCGCTAGGTCA

CAGACATCTTGGCGTTCGCGCCAGGATGTCTCGCCCAATTCCGTAGGGCG

AGGGTAGCCAAATCCAGAGGCTAGCATTATTTCCGATCTAGGATCGCGTT

GAGAACTGGATACTCAACAGCGGTAAACGGAAAACCGCTCAGCCGAAGTG

TCTTGCGGGAACAAAGCTGAAGTACTTACCCGCAAGGCACTTTGGCTGGC

CACGCGTCGTATTCGTACGGCGCGTGCTAGACTGGCTGGCGGCGGTCGAT

CACACAGTTCAAACGTAATAAGCCAATGTACGAGGCAGACGACTCGCCGC

CAGCTAGTTTAGGATTCTAGATC

4H-DNAGblock-2NN1
(SEQ ID NO: 16)
CGGCCAGTGAATTCGAGCTCGGTACCCGGGAGATCTCACTTTCAGCCCT

CTTATCCTCGGCCGATCCTTCTAATACGACTCACTATAGGAAATGATGCC

GAGTTGACGCTTCGGCGTCAGCTCGCCCTGTGGCCTAGTTCGCTAGGTCA

CAGCCGACCATTGCGTTTCGACGCAGTGGTCACATCTTGGCGTTCGCGCC

AGGATGTCTCGCCCAATTCCGTAGGGCGAGGGGACCCAAATCCCTAGGGT

CGGTAGCCAAATCCAGAGGCTAGCATTATTTCCGATCTAGGATCGCGTTG

AGAACTGGATACTCAACCGTGGCATAAAGGGATAATGCCAAGCGGTAAAC

GGAAAACCGCTCAGCCGAAGTGTCTTGCGGGAACAAAGCTGAAGTACTTA

CCCGCAAGGCACTTTGGCTGCGTGGCGTTACAGTTCGCTGTGACGCCAGC

CACGCGTCGTATTCGTACGGCGCGTGCTAGACTGGCTGGCGGCGGTCGAT

CACACAGTTCAAACGTAATAAGCCAATGTACGAGGCAGACGACTCGCCGC

CAGCTAGTTTAGGATTCTAGATC

DNA and PNA antidote sequences are provided below
Anti_Ex1_A06
(SEQ ID NO: 17)
GTCTGCCTCGTACATTGGCT Anti_Ex2_Full
(SEQ ID NO: 18)
GGGTAAGTACTTCAGCTTTGTTCCC Anti_Ex1_PNA_A06
(SEQ ID NO: 19)
GTCTGCCTCGTACATTGGCT Anti_Ex2_PNA_19nt
(SEQ ID NO: 20)
GTACTTCAGCTTTGTTCCC It will be readily apparent to those skilled in the art that other suitable modifications It is understood that the foregoing detailed description and accompanying examples are merely illustrative and are not to be taken as limitations upon the scope of the disclosure, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the disclosure, may be made without departing from the spirit and scope thereof.

What is claimed is:

1. A single-stranded RNA molecule comprising:

at least one A-form double-helical structure and at least one crossover region;

at least one kissing-loop region; and four tetra-loop regions;

wherein the at least one A-form double-helical structure, the at least one crossover region, the at least one kissing-loop region, and the four tetra-loop regions have at least 80% sequence identity to SEQ ID NO: 1; and wherein at least one of the four tetra-loop regions is replaced by a nucleic acid aptamer having anti-coagulant activity.

2. The RNA molecule according to claim 1, further comprising at least one nucleoside with a 2'-modification.

3. The RNA molecule according to claim 1, wherein each of the four tetra-loop regions comprises a four-nucleotide motif.

4. The RNA molecule according to claim 1, wherein the at least one kissing-loop region is a 180° kissing loop region.

5. The RNA molecule according to claim 1, wherein at least two of the four tetra-loop regions are replaced by a nucleic acid aptamer having anti-coagulant activity.

6. The RNA molecule according to claim 1, wherein the anti-coagulation activity of the at least one nucleic acid aptamer comprises thrombin inhibition.

7. The RNA molecule according to claim 1, wherein the anti-coagulation activity of the at least one nucleic acid aptamer comprises inhibition of one or more of Factor XIIa, Factor XIIIa, Factor XIa, Factor IXa, Factor Xa, and von Willebrand factor.

8. The RNA molecule according to claim 6, wherein the at least one nucleic acid aptamer comprises an anti-thrombin $RNA_{R9D-14T}$ aptamer or a derivative thereof.

9. The RNA molecule according to claim 1, wherein the RNA molecule comprises from about 100 to about 600 nucleotides.

10. The RNA molecule according to claim 1, wherein the RNA molecule comprises:
    a nucleic acid aptamer capable of binding exosite 1 of thrombin that replaces tetra-loop region 1 of the RNA molecule; and
    a nucleic acid aptamer capable of binding exosite 2 of thrombin that replaces tetra-loop region 2 of the RNA molecule.

11. The RNA molecule according to claim 1, wherein the RNA molecule comprises:
    a nucleic acid aptamer capable of binding exosite 1 of thrombin that replaces tetra-loop region 1 of the RNA molecule; and
    a nucleic acid aptamer capable of binding exosite 2 of thrombin that replaces tetra-loop region 3 of the RNA molecule.

12. An anticoagulant composition comprising:
    the single-stranded RNA molecule of claim 1; and
    a pharmaceutically acceptable excipient, solvent, carrier, or diluent.

13. The RNA molecule according to claim 1, wherein the RNA molecule comprises:
    a nucleic acid aptamer capable of binding exosite 1 of thrombin that replaces tetra-loop region 4 of the RNA molecule; and
    a nucleic acid aptamer capable of binding exosite 2 of thrombin that replaces tetra-loop region 1 of the RNA molecule.

14. The RNA molecule according to claim 13, wherein the RNA molecule has at least 80% sequence identity to SEQ ID NO: 4.

15. The RNA molecule according to claim 1, wherein the RNA molecule comprises:
    a nucleic acid aptamer capable of binding exosite 1 of thrombin that replaces tetra-loop regions 3 and 4 of the RNA molecule; and
    a nucleic acid aptamer capable of binding exosite 2 of thrombin that replaces tetra-loop regions 1 and 2 of the RNA molecule.

16. The RNA molecule according to claim 13, wherein the RNA molecule has at least 80% sequence identity to SEQ ID NO: 6.

* * * * *

```
                              SEQUENCE LISTING

<160> NUMBER OF SEQ ID NOS: 27

<210> SEQ ID NO 1
<211> LENGTH: 210
<212> TYPE: RNA
<213> ORGANISM: Artificial sequence
<220> FEATURE:
<223> OTHER INFORMATION: Synthetic

<400> SEQUENCE: 1
gggagaucga gcgacuuccg acuucggucg ggagucgggc uagucaucuu cggaugauua      60
gccgcuggug aagccuccac gccagccucg gucucccgca guaggaucgg acugaaggag     120
gcacgguccc agccgaagug ucuugcuucg gcaaggcacu uggcugcua  gacuggcugg     180 cuucggccag cuaguuuagg auucuauugc                                     210

<210> SEQ ID NO 2
<211> LENGTH: 279
<212> TYPE: RNA
<213> ORGANISM: Artificial sequence
<220> FEATURE:
<223> OTHER INFORMATION: Synthetic

<400> SEQUENCE: 2
gggagaucga gcgacuuccg acuucggucg ggagucgggc uagucaucgg gaacaaagcu      60
gaaguacuua cccgaugauu agccgcuggu gaagccucca cgccagccuc ggucucccgc     120
aguaggaucg gacugaagga ggcacggucc cagccgaagu gucuggcggu cgaucacaca     180
guucaaacgu aauaagccaa uguacgaggc agacgacucg ccaggcacuu ggcugcuag     240 acuggcuggc uucggccagc uaguuuagga uucuauugc                           279

<210> SEQ ID NO 3
<211> LENGTH: 279
<212> TYPE: RNA
<213> ORGANISM: Artificial sequence
<220> FEATURE:
<223> OTHER INFORMATION: Synthetic

<400> SEQUENCE: 3
gggagaucga gcgacuuccg acgggaacaa agcugaagua cuuacccguc gggagucggg      60
cuagucaucu ucggaugauu agccgcuggu gaagccucca cgccagccuc ggucucccgc     120
aguaggaucg gacugaagga ggcacggucc cagccgaagu gucuggcggu cgaucacaca     180
guucaaacgu aauaagccaa uguacgaggc agacgacucg ccaggcacuu ggcugcuag     240 acuggcuggc uucggccagc uaguuuagga uucuauugc                           279

<210> SEQ ID NO 4
<211> LENGTH: 285
<212> TYPE: RNA
<213> ORGANISM: Artificial sequence
<220> FEATURE:
<223> OTHER INFORMATION: Synthetic

<400> SEQUENCE: 4
gggagaucga gcgacuuccg acuucggucg ggagucgggc uagucaucuu cggaugauua      60
```

| | |
|---|---|
| gccgcuggug aagccuccac gccagccucg gucucccgca guaggaucgg acugaaggag | 120 |
| gcacggcccc agccgaagug ucuugcggga acaaagcuga aguacuuacc cgcaaggcac | 180 |
| uuuggcugcu agacuggcug gcggcggucg aucacacagu ucaaacguaa uaagccaaug | 240 |
| uacgaggcag acgacucgcc gccagcuagu uuaggauucu auugc | 285 |

<210> SEQ ID NO 5
<211> LENGTH: 114
<212> TYPE: RNA
<213> ORGANISM: Artificial sequence
<220> FEATURE:
<223> OTHER INFORMATION: Synthetic

<400> SEQUENCE: 5

| | |
|---|---|
| gggaacaaag cugaaguacu uacccaccuu accacuccac cucacucacc uauuacggcg | 60 |
| gucgaucaca caguucaaac guaauaagcc aauguacgag gcagacgacu cgcc | 114 |

<210> SEQ ID NO 6
<211> LENGTH: 378
<212> TYPE: RNA
<213> ORGANISM: Artificial sequence
<220> FEATURE:
<223> OTHER INFORMATION: Synthetic

<400> SEQUENCE: 6

| | |
|---|---|
| gggagaucga gcgacuuccg acucuggcgg ucgaucacac aguucaaacg uaauaagcca | 60 |
| auguacgagg cagacgacuc gccagagucg ggagucgggc uagucaucag gcacgggaac | 120 |
| aaagcugaag uacuuacccg ugccugauga uuagccgcug gugaagccuc cacgccagcc | 180 |
| ucggucuccc gcaguaggau cggacugaag gaggcacggu cccagccgaa gugucuugcg | 240 |
| ggaacaaagc ugaaguacuu acccgcaagg cacuuuggcu gcuagacugg cuggcggcgg | 300 |
| ucgaucacac aguucaaacg uaauaagcca auguacgagg cagacgacuc gccgccagcu | 360 |
| aguuuaggau ucuauugc | 378 |

<210> SEQ ID NO 7
<211> LENGTH: 385
<212> TYPE: RNA
<213> ORGANISM: Artificial sequence
<220> FEATURE:
<223> OTHER INFORMATION: Synthetic

<400> SEQUENCE: 7

| | |
|---|---|
| ggaaaugaug ccgaguugac gcuucggcgu cagcucgccc uguggccuag uucgcuaggu | 60 |
| cacagacauc uuggcguucg cgccaggaug ucucgcccaa uuccguaggg cgagggguagc | 120 |
| caaauccaga ggcuagcauu auuuccgauc uaggaucgcg uugagaacug gauacucaac | 180 |
| agcgguaaac ggaaaaccgc ucagccgaag ugucuugcgg gaacaaagcu gaaguacuua | 240 |
| cccgcaaggc acuuuggcug gccacgcguc guauucguac ggcgcgugcu agacuggcug | 300 |
| gcggcggucg aucacacagu ucaaacguaa uaagccaaug uacgaggcag acgacucgcc | 360 |
| gccagcuagu uuaggauucu agauc | 385 |

<210> SEQ ID NO 8
<211> LENGTH: 485
<212> TYPE: RNA
<213> ORGANISM: Artificial sequence
<220> FEATURE:
<223> OTHER INFORMATION: Synthetic

<400> SEQUENCE: 8

```
ggaaaugaug ccgaguugac gcuucggcgu cagcucgccc uguggccuag uucgcuaggu    60
cacagccgac cauugcguuu cgacgcagug gucacaucuu ggcguucgcg ccaggauguc   120
ucgcccaauu ccguagggcg aggggaccca aaucccuagg gucgguagcc aaauccagag   180
gcuagcauua uuuccgaucu aggaucgcgu ugagaacugg auacucaacc guggcauaaa   240
gggauaaugc caagcgguaa acggaaaacc gcucagccga agugucuugc gggaacaaag   300
cugaaguacu uacccgcaag gcacuuuggc ugcguggcgu acaguucgc ugugacgcca    360 gccacgcguc guauucguac ggcgcgugcu agacuggcug gcggcgguc aucacacagu    420 ucaaacguaa uaagccaaug uacgaggcag acgacucgcc gccagcuagu uuaggauucu   480
agauc                                                              485

<210> SEQ ID NO 9
<211> LENGTH: 261
<212> TYPE: DNA
<213> ORGANISM: Artificial sequence
<220> FEATURE:
<223> OTHER INFORMATION: Synthetic

<400> SEQUENCE: 9
cactttcagc cctcttatcc tcggcggatc cttctaatac gactcactat agggagatcg    60
agcgacttcc gacttcggtc gggagtcggg ctagtcatct tcggatgatt agccgctggt   120
gaagcctcca cgccagcctc ggtctcccgc agtaggatcg gactgaagga ggcacggtcc   180
cagccgaagt gtcttgcttc ggcaaggcac tttggctgct agactggctg gcttcggcca   240
gctagtttag gattctattg c                                            261

<210> SEQ ID NO 10
<211> LENGTH: 330
<212> TYPE: DNA
<213> ORGANISM: Artificial sequence
<220> FEATURE:
<223> OTHER INFORMATION: Synthetic

<400> SEQUENCE: 10
cactttcagc cctcttatcc tcggcggatc cttctaatac gactcactat agggagatcg    60
agcgacttcc gacttcggtc gggagtcggg ctagtcatcg gaacaaagc tgaagtactt   120 acccgatgat tagccgctgg tgaagcctcc acgccagcct cggtctcccg cagtaggatc   180
ggactgaagg aggcacggtc ccagccgaag tgtctggcgg tcgatcacac agttcaaacg   240
taataagcca atgtacgagg cagacgactc gccaggcact ttggctgcta gactggctgg   300
cttcggccag ctagtttagg attctattgc                                   330

<210> SEQ ID NO 11
<211> LENGTH: 330
<212> TYPE: DNA
<213> ORGANISM: Artificial sequence
<220> FEATURE:
<223> OTHER INFORMATION: Synthetic

<400> SEQUENCE: 11
cactttcagc cctcttatcc tcggcggatc cttctaatac gactcactat agggagatcg    60
agcgacttcc gacgggaaca agctgaagt acttacccgt cgggagtcgg gctagtcatc   120
ttcggatgat tagccgctgg tgaagcctcc acgccagcct cggtctcccg cagtaggatc   180
ggactgaagg aggcacggtc ccagccgaag tgtctggcgg tcgatcacac agttcaaacg   240
```

| | |
|---|---|
| taataagcca atgtacgagg cagacgactc gccaggcact ttggctgcta gactggctgg | 300 |
| cttcggccag ctagtttagg attctattgc | 330 |

<210> SEQ ID NO 12
<211> LENGTH: 336
<212> TYPE: DNA
<213> ORGANISM: Artificial sequence
<220> FEATURE:
<223> OTHER INFORMATION: Synthetic

<400> SEQUENCE: 12

| | |
|---|---|
| cactttcagc cctcttatcc tcggcggatc cttctaatac gactcactat agggagatcg | 60 |
| agcgacttcc gacttcggtc gggagtcggg ctagtcatct tcggatgatt agccgctggt | 120 |
| gaagcctcca cgccagcctc ggtctcccgc agtaggatcg gactgaagga ggcacggtcc | 180 |
| cagccgaagt gtcttgcggg aacaaagctg aagtacttac ccgcaaggca ctttggctgc | 240 |
| tagactggct ggcggcggtc gatcacacag ttcaaacgta ataagccaat gtacgaggca | 300 |
| gacgactcgc cgccagctag tttaggattc tattgc | 336 |

<210> SEQ ID NO 13
<211> LENGTH: 165
<212> TYPE: DNA
<213> ORGANISM: Artificial sequence
<220> FEATURE:
<223> OTHER INFORMATION: Synthetic

<400> SEQUENCE: 13

| | |
|---|---|
| cactttcagc cctcttatcc tcggcggatc cttctaatac gactcactat agggaacaaa | 60 |
| gctgaagtac ttacccacct taccactcca cctcactcac ctattacggc ggtcgatcac | 120 |
| acagttcaaa cgtaataagc caatgtacga ggcagacgac tcgcc | 165 |

<210> SEQ ID NO 14
<211> LENGTH: 429
<212> TYPE: DNA
<213> ORGANISM: Artificial sequence
<220> FEATURE:
<223> OTHER INFORMATION: Synthetic

<400> SEQUENCE: 14

| | |
|---|---|
| cactttcagc cctcttatcc tcggcggatc cttctaatac gactcactat agggagatcg | 60 |
| agcgacttcc gactctggcg gtcgatcaca cagttcaaac gtaataagcc aatgtacgag | 120 |
| gcagacgact cgccagagtc gggagtcggg ctagtcatca ggcacgggaa caaagctgaa | 180 |
| gtacttaccc gtgcctgatg attagccgct ggtgaagcct ccacgccagc ctcggtctcc | 240 |
| cgcagtagga tcggactgaa ggaggcacgg tcccagccga agtgtcttgc gggaacaaag | 300 |
| ctgaagtact tacccgcaag gcactttggc tgctagactg gctggcggcg gtcgatcaca | 360 |
| cagttcaaac gtaataagcc aatgtacgag gcagacgact cgccgccagc tagtttagga | 420 |
| ttctattgc | 429 |

<210> SEQ ID NO 15
<211> LENGTH: 472
<212> TYPE: DNA
<213> ORGANISM: Artificial sequence
<220> FEATURE:
<223> OTHER INFORMATION: Synthetic

<400> SEQUENCE: 15

| | |
|---|---|
| cggccagtga attcgagctc ggtacccggg agatctcact ttcagccctc ttatcctcgg | 60 |

```
ccgatccttc taatacgact cactatagga aatgatgccg agttgacgct tcggcgtcag    120
ctcgccctgt ggcctagttc gctaggtcac agacatcttg gcgttcgcgc caggatgtct    180
cgcccaattc cgtagggcga gggtagccaa atccagaggc tagcattatt tccgatctag    240
gatcgcgttg agaactggat actcaacagc ggtaaacgga aaaccgctca gccgaagtgt    300
cttgcgggaa caaagctgaa gtacttaccc gcaaggcact ttggctggcc acgcgtcgta    360
ttcgtacggc gcgtgctaga ctggctggcg gcggtcgatc acacagttca aacgtaataa    420
gccaatgtac gaggcagacg actcgccgcc agctagttta ggattctaga tc            472
```

<210> SEQ ID NO 16
<211> LENGTH: 572
<212> TYPE: DNA
<213> ORGANISM: Artificial sequence
<220> FEATURE:
<223> OTHER INFORMATION: Synthetic

<400> SEQUENCE: 16

```
cggccagtga attcgagctc ggtacccggg agatctcact ttcagccctc ttatcctcgg     60
ccgatccttc taatacgact cactatagga aatgatgccg agttgacgct tcggcgtcag    120
ctcgccctgt ggcctagttc gctaggtcac agccgaccat tgcgtttcga cgcagtggtc    180
acatcttggc gttcgcgcca ggatgtctcg cccaattccg tagggcgagg gacccaaat    240 ccctagggtc ggtagccaaa tccagaggct agcattattt ccgatctagg atcgcgttga    300
gaactggata ctcaaccgtg gcataaaggg ataatgccaa gcggtaaacg gaaaaccgct    360
cagccgaagt gtcttgcggg aacaaagctg aagtacttac ccgcaaggca ctttggctgc    420
gtggcgttac agttcgctgt gacgccagcc acgcgtcgta ttcgtacggc gcgtgctaga    480
ctggctggcg gcggtcgatc acacagttca aacgtaataa gccaatgtac gaggcagacg    540
actcgccgcc agctagttta ggattctaga tc                                   572
```

<210> SEQ ID NO 17
<211> LENGTH: 20
<212> TYPE: DNA
<213> ORGANISM: Artificial sequence
<220> FEATURE:
<223> OTHER INFORMATION: Synthetic

<400> SEQUENCE: 17

```
gtctgcctcg tacattggct                                                  20
```

<210> SEQ ID NO 18
<211> LENGTH: 25
<212> TYPE: DNA
<213> ORGANISM: Artificial sequence
<220> FEATURE:
<223> OTHER INFORMATION: Synthetic

<400> SEQUENCE: 18

```
gggtaagtac ttcagctttg ttccc                                            25
```

<210> SEQ ID NO 19
<211> LENGTH: 20
<212> TYPE: DNA
<213> ORGANISM: Artificial sequence
<220> FEATURE:
<223> OTHER INFORMATION: Synthetic

<400> SEQUENCE: 19
gtctgcctcg tacattggct                                          20

<210> SEQ ID NO 20
<211> LENGTH: 19
<212> TYPE: DNA
<213> ORGANISM: Artificial sequence
<220> FEATURE:
<223> OTHER INFORMATION: Synthetic

<400> SEQUENCE: 20
gtacttcagc tttgttccc                                           19

<210> SEQ ID NO 21
<211> LENGTH: 58
<212> TYPE: RNA
<213> ORGANISM: Artificial sequence
<220> FEATURE:
<223> OTHER INFORMATION: Synthetic

<400> SEQUENCE: 21
ggcggucgau cacacaguuc aaacguaaua agccaaugua cgaggcagac gacucgcc    58

<210> SEQ ID NO 22
<211> LENGTH: 25
<212> TYPE: RNA
<213> ORGANISM: Artificial sequence
<220> FEATURE:
<223> OTHER INFORMATION: Synthetic

<400> SEQUENCE: 22
gggaacaaag cugaaguacu uaccc                                    25

<210> SEQ ID NO 23
<211> LENGTH: 26
<212> TYPE: DNA
<213> ORGANISM: Artificial sequence
<220> FEATURE:
<223> OTHER INFORMATION: Synthetic

<400> SEQUENCE: 23
cgcctaggtt gggtagggtg gtggcg                                   26

<210> SEQ ID NO 24
<211> LENGTH: 29
<212> TYPE: DNA
<213> ORGANISM: Artificial sequence
<220> FEATURE:
<223> OTHER INFORMATION: Synthetic

<400> SEQUENCE: 24
agtccgtggt agggcaggtt ggggtgact                                29

<210> SEQ ID NO 25
<211> LENGTH: 209
<212> TYPE: RNA
<213> ORGANISM: Artificial sequence
<220> FEATURE:
<223> OTHER INFORMATION: Synthetic
<220> FEATURE:
<221> NAME/KEY: misc_feature
<222> LOCATION: (8)..(10)
<223> OTHER INFORMATION: n is a, c, g, or u
<220> FEATURE:
<221> NAME/KEY: misc_feature
<222> LOCATION: (13)..(16)
<223> OTHER INFORMATION: n is a, c, g, or u
<220> FEATURE:
<221> NAME/KEY: misc_feature

```
<222> LOCATION: (18)..(21)
<223> OTHER INFORMATION: n is a, c, g, or u
<220> FEATURE:
<221> NAME/KEY: misc_feature
<222> LOCATION: (28)..(31)
<223> OTHER INFORMATION: n is a, c, g, or u
<220> FEATURE:
<221> NAME/KEY: misc_feature
<222> LOCATION: (33)..(36)
<223> OTHER INFORMATION: n is a, c, g, or u
<220> FEATURE:
<221> NAME/KEY: misc_feature
<222> LOCATION: (39)..(42)
<223> OTHER INFORMATION: n is a, c, g, or u
<220> FEATURE:
<221> NAME/KEY: misc_feature
<222> LOCATION: (44)..(47)
<223> OTHER INFORMATION: n is a, c, g, or u
<220> FEATURE:
<221> NAME/KEY: misc_feature
<222> LOCATION: (54)..(57)
<223> OTHER INFORMATION: n is a, c, g, or u
<220> FEATURE:
<221> NAME/KEY: misc_feature
<222> LOCATION: (59)..(62)
<223> OTHER INFORMATION: n is a, c, g, or u
<220> FEATURE:
<221> NAME/KEY: misc_feature
<222> LOCATION: (65)..(69)
<223> OTHER INFORMATION: n is a, c, g, or u
<220> FEATURE:
<221> NAME/KEY: misc_feature
<222> LOCATION: (83)..(87)
<223> OTHER INFORMATION: n is a, c, g, or u
<220> FEATURE:
<221> NAME/KEY: misc_feature
<222> LOCATION: (90)..(92)
<223> OTHER INFORMATION: n is a, c, g, or u
<220> FEATURE:
<221> NAME/KEY: misc_feature
<222> LOCATION: (100)..(104)
<223> OTHER INFORMATION: n is a, c, g, or u
<220> FEATURE:
<221> NAME/KEY: misc_feature
<222> LOCATION: (106)..(109)
<223> OTHER INFORMATION: n is a, c, g, or u
<220> FEATURE:
<221> NAME/KEY: misc_feature
<222> LOCATION: (112)..(114)
<223> OTHER INFORMATION: n is a, c, g, or u
<220> FEATURE:
<221> NAME/KEY: misc_feature
<222> LOCATION: (128)..(130)
<223> OTHER INFORMATION: n is a, c, g, or u
<220> FEATURE:
<221> NAME/KEY: misc_feature
<222> LOCATION: (133)..(136)
<223> OTHER INFORMATION: n is a, c, g, or u
<220> FEATURE:
<221> NAME/KEY: misc_feature
<222> LOCATION: (138)..(140)
<223> OTHER INFORMATION: n is a, c, g, or u
<220> FEATURE:
<221> NAME/KEY: misc_feature
<222> LOCATION: (164)..(166)
<223> OTHER INFORMATION: n is a, c, g, or u
<220> FEATURE:
<221> NAME/KEY: misc_feature
<222> LOCATION: (168)..(171)
<223> OTHER INFORMATION: n is a, c, g, or u
<220> FEATURE:
<221> NAME/KEY: misc_feature
<222> LOCATION: (174)..(177)
<223> OTHER INFORMATION: n is a, c, g, or u
<220> FEATURE:
<221> NAME/KEY: misc_feature
<222> LOCATION: (179)..(182)
<223> OTHER INFORMATION: n is a, c, g, or u
<220> FEATURE:
```

```
<221> NAME/KEY: misc_feature
<222> LOCATION: (189)..(192)
<223> OTHER INFORMATION: n is a, c, g, or u
<220> FEATURE:
<221> NAME/KEY: misc_feature
<222> LOCATION: (194)..(197)
<223> OTHER INFORMATION: n is a, c, g, or u
<220> FEATURE:
<221> NAME/KEY: misc_feature
<222> LOCATION: (200)..(203)
<223> OTHER INFORMATION: n is a, c, g, or u
<220> FEATURE:
<221> NAME/KEY: misc_feature
<222> LOCATION: (205)..(209)
<223> OTHER INFORMATION: n is a, c, g, or u

<400> SEQUENCE: 25
gggagaknnn cgnnnnknnn ncuucggnnn nknnnnccnn nnknnnncuu cggnnnnknn     60
nngcnnnnnu gaagccucca cgnnnnnggn nnkucucccn nnnnknnnng cnnnugaagg    120
aggcacgnnn ggnnnnknnn ggaacaaagc ugaaguacuu accnnnknnn ncgnnnnknn    180
nncuucggnn nnknnnnccn nnnknnnnn                                      209

<210> SEQ ID NO 26
<211> LENGTH: 209
<212> TYPE: RNA
<213> ORGANISM: Artificial sequence
<220> FEATURE:
<223> OTHER INFORMATION: Synthetic

<400> SEQUENCE: 26
gggagagccg cgccgugcag acuucggucu guacggccug gcggcggcuu cggccgcugc     60
cagcugcggu gaagccucca cgccgcaggc gguucucccg ccgggccggg ccggugaagg    120
aggcacgccg gggaguuaua ggaacaaagc ugaaguacuu accuaugacu ccggcgcugc    180
ggcuucggcc gcggcgcccc cgguccggc                                      209

<210> SEQ ID NO 27
<211> LENGTH: 209
<212> TYPE: RNA
<213> ORGANISM: Artificial sequence
<220> FEATURE:
<223> OTHER INFORMATION: Synthetic

<400> SEQUENCE: 27
gggagaguau cgaauaguuu gcuucggcaa aguauuccga ucuuaaccuu cggguuagga     60
ucgcgaaugu gaagccucca cgcauucgga uauucucccu guacucgugg cccgugaagg    120
aggcacgcgg ggguaaguag ggaacaaagc ugaaguacuu acccuaguua ccggacauag    180
cccuucgggg cugugucccc acggguaca                                      209
```